（12）United States Patent
Wassermann et al.

US012448617B2

(10) Patent No.: US 12,448,617 B2
(45) Date of Patent: Oct. 21, 2025

(54) SPECIFIC ELECTROPORATION AND LYSIS OF EUKARYOTIC CELLS

(71) Applicant: AIT AUSTRIAN INSTITUTE OF TECHNOLOGY GMBH, Vienna (AT)

(72) Inventors: Klemens Wassermann, Korneuburg (AT); Terje Wimberger, Vienna (AT); Johannes Peham, Vienna (AT)

(73) Assignee: AIT AUSTRIAN INSTITUTE OF TECHNOLOGY GMBH, Vienna (AT)

( * ) Notice: Subject to any disclaimer, the term of this patent is extended or adjusted under 35 U.S.C. 154(b) by 892 days.

(21) Appl. No.: 17/312,837

(22) PCT Filed: Dec. 12, 2019

(86) PCT No.: PCT/EP2019/084793
§ 371 (c)(1),
(2) Date: Jun. 10, 2021

(87) PCT Pub. No.: WO2020/120651
PCT Pub. Date: Jun. 18, 2020

(65) Prior Publication Data
US 2022/0049239 A1   Feb. 17, 2022

(30) Foreign Application Priority Data

Dec. 12, 2018   (EP) .................................... 18211969

(51) Int. Cl.
*C12N 13/00*    (2006.01)
*C12M 1/00*    (2006.01)
*C12M 1/42*    (2006.01)

(52) U.S. Cl.
CPC ............. *C12N 13/00* (2013.01); *C12M 35/02* (2013.01); *C12M 47/06* (2013.01)

(58) Field of Classification Search
None
See application file for complete search history.

(56) References Cited

U.S. PATENT DOCUMENTS 10,954,546 B2 *   3/2021   Wassermann .......... G01N 33/02

FOREIGN PATENT DOCUMENTS

| CA | 2025022 A1 | 9/1991 |
|---|---|---|
| WO | 0063408 A2 | 10/2000 |
| WO | 2007/056027 A1 | 5/2007 |
| WO | 2011/135294 A1 | 11/2011 |
| WO | 2015/044191 A1 | 4/2015 |
| WO | 2018/015936 A2 | 1/2018 |

OTHER PUBLICATIONS

Scott, Keith; Thermopedia, "Permittivity;" DOI: 10.1615/AtoZ.p.permittivity; 2011 (Year: 2011).*
European Search Report received for Application No. 18211969.3 dated May 23, 2019.
International Search Report and Written Opinion received for PCT/EP2019/084793, mailed Jan. 31, 2020.
Bender, J., et al., "Identification and Comparison of CD34-Positive Cells and their Subpopulations From Normal Peripheral Blood and Bone Marrow Using Multicolor Flow Cytometry," Blood, 1991, vol. 77, No. 12, pp. 2591-2596.
Eppich, H., et al., "Pulsed electric fields for selection of hematopoietic cells and depletion of tumor cell contaminants," Nature Biotechnology, 2000, vol. 18, pp. 882-887.
Schindelin, J., et al., "Fiji: an open-source platform for biological-image analysis," Nature Methods, Jul. 2012, vol. 9, No. 7, pp. 676-682.
Second Office Action received for Chinese Application No. 201980087281.X, dated Oct. 29, 2024.
Wassermann, K., et al., "High-k Dielectric Passivation: Novel Considerations Enabling Cell Specific Lysis Induced by Electric Fields", ACS Applied Materials & Interfaces, Jul. 28, 2016, pp. 1-27.

* cited by examiner

*Primary Examiner* — David W Berke-Schlessel
(74) *Attorney, Agent, or Firm* — Greer, Burns & Crain, Ltd

(57) ABSTRACT

A method of targeted electroporation and/or lysis of eukaryotic cellular bodies in a biological sample with at least two subgroups of eukaryotic cellular bodies, wherein each subgroup has a different susceptibility to electroporation and/or lysis in electric fields, including the following steps: transferring the biological sample in a chamber, exposing the biological sample to an electric field in the chamber, wherein the electric field is generated by at least two electrodes which are coated with a dielectric material with a relative permittivity greater than 3.9, and selecting the electric parameters of the electric field such as the field strength, the frequency or the wave form so that the subgroups are differently affected by said electric field for electroporation and/or lysis; as well as devices for the method.

17 Claims, 48 Drawing Sheets

B

C

D

DNA picogreen nanodrop (from 10k HEK cells, 160µS/cm)

E

SPECIFIC ELECTROPORATION AND LYSIS OF EUKARYOTIC CELLS

BACKGROUND

The present invention relates to the field of electroporation and lysis of cells.

Electroporation, also known as electropermeabilization, is commonly used for introducing compounds, such as chemicals, drugs or DNA, into biological cells. For this purpose, cells of a biological sample are exposed to an electrical field which is generated by electrodes that are disposed opposite to each other. If the electrical field strength of the applied electrical field is high enough, the membranes of the cells become porous and allow the compounds to cross the membranes of the cells. If the compound is a foreign DNA and the cell is eukaryotic, this process is also widely known as transfection.

Depending on the field strength of the electrical field, electroporation can either be a reversible or an irreversible process. If the electrical field strength is kept below a certain threshold, most of the cells are still alive after exposure to the electrical field, which means that the electroporation is reversible. On the other hand, if the electrical field strength exceeds a certain value, the electroporation process leads to the destruction of the cells and thus becomes irreversible. By means of irreversible electroporation the inner elements of the cells can be released. This process is also known as lysis.

In comparison to viral and chemical approaches for permeabilization and thermal or chemical approaches for lysis, electroporation has several advantages, such as superior control over relevant variables, high transfection rate and the absence of contaminants.

In the prior art, lysis and electroporation of cells in biological samples are known. From WO 2015/044191 A1 it is known to perform lysis to non-pathogenic cells in a suspension of cells for further examination of pathogenic cells. In WO 2015/044191 A1, the non-pathogenic cells are eukaryotic host cells while the pathogenic cells are foreign cells, such as bacteria, a fungus or protozoa. Thus, the teaching of WO 2015/044191 A1 does not allow to distinguish between cells of the same host material, in particular between eukaryotic cellular bodies of the same host material.

Besides that, it is known from WO 2007/056027 A1 to use electrical fields instead of applying heat to liquids for the reduction of cells. The electrodes used in WO 2007/056027 A1 are made of a rather thick dielectric material, which is covered with electrically conductive material for connection to a power supply.

A disadvantage of the assembly in WO 2007/056027 A1 is the requirement of relatively high potential differences between the electrodes due to the large distance between the electrodes. The large distance between the electrodes also causes inhomogeneities in the applied electric fields, which leads to irregular lysis along the electrodes. Additionally, the dielectric material makes up the main part of the electrode, as the dielectric material has to be rather thick in order to be coated with electrically conductive material. Thus, microfluidic applications, such as a tip for a pipette, cannot be realized with the teaching of WO 2007/056027 A1.

Another disadvantage of the known methods is that larger cells are more easily lysed than smaller cells due to their size. Therefore, if one desires to lyse small cells in a biological sample made up of small and large cells, the larger cells are inevitably lysed as well.

Accordingly, it is an objective of the present invention to eliminate or at least alleviate the disadvantages of the known methods and devices of the prior art.

In particular, it is an objective of the present invention to provide a method for specific electroporation and/or lysis of eukaryotic cellular bodies in a biological sample with at least two subgroups of eukaryotic cellular bodies for microfluidic applications, which method allows the specific electroporation and/or lysis of a subgroup, preferably of only one subgroup, of eukaryotic cellular bodies in a sample with at least two subgroups of eukaryotic cellular bodies.

Further, it is an objective of the present invention to provide a device for specific electroporation and/or lysis of eukaryotic cellular bodies in a biological sample for microfluidic applications. In another aspect it is an objective of the present invention to provide a method for manufacturing a device suitable for specific electroporation and/or lysis cellular bodies in a biological sample. In another aspect it is an objective of the present invention to provide a method for specific electroporation and/or lysis of eukaryotic cellular bodies in a biological sample using the device.

SUMMARY

The invention provides a method of targeted electroporation and/or lysis of eukaryotic cellular bodies in a biological sample with at least two subgroups of eukaryotic cellular bodies, wherein each subgroup has a different susceptibility to electroporation and/or lysis in electric fields, comprising the following steps:
  transferring the biological sample in a chamber,
  exposing the biological sample to an electric field in the chamber, wherein the electric field is generated by at least two electrodes which are coated with a dielectric material with a relative permittivity greater than 3.9, preferably greater than 9, more preferably 60 or more and
  choosing the electric parameters of the electric field such as the field strength, the frequency or the wave form so that the subgroups are differently affected by said electric field for electroporation and/or lysis.

Also provided is a method of targeted electroporation and/or lysis of eukaryotic cellular bodies in a biological sample, comprising the following steps:
  transferring the biological sample in a chamber,
  exposing the biological sample to an electric field in the chamber, wherein the electric field is generated by at least two electrodes which are coated with a dielectric material with a relative permittivity greater than 3.9, preferably greater than 9, more preferably 60 or more, and
  choosing the electric parameters of the electric field such as the field strength, the frequency or the wave form so that eukaryotic cellular bodies in a biological sample are affected by said electric field for electroporation and/or lysis.

In other words, the invention provides a method of targeted electroporation and/or lysis of eukaryotic cellular bodies in a biological sample with at least a first and a second group or subgroup of eukaryotic cellular bodies, each group or subgroup having an electroporation and/or a lysis rate, wherein the biological sample is transferred into a chamber and exposed to an electric field in the chamber which is generated by at least two electrodes which are coated with a dielectric material with a relative permittivity greater than 3.9, preferably greater than 9, more preferably 60 or more, wherein for isolating and/or delivering a compound into the cells of the first group or subgroup the electric parameters such as the field strength, the frequency or the wave form of the electric field are chosen to conduct electroporation and/or lysis the first group or subgroup with a different electroporation and/or a lysis rate than the second group or subgroup.

In another aspect, the invention provides a device, preferably handheld device, suitable for targeted electroporation and/or lysis of eukaryotic cellular bodies in a biological sample with at least subgroups of eukaryotic cellular bodies, wherein cellular bodies of each subgroup have a different susceptibility to electroporation and/or lysis in electrical fields, comprising at least one chamber for receiving the biological sample and at least two electrodes for generating an electric field in the chamber, which electrodes are coated with a dielectric material with a permittivity greater than 3.9, preferably greater than 9, more preferably 60 or more, wherein the distance between the electrodes is below 1 mm, preferably below 550 µm, more preferably below 100 µm, wherein the device further comprises an adjustment unit that enables the adjustment of electric parameters of the electric field such as the field strength, the frequency or the wave form so that the subgroups are differently affected with electroporation and/or lysis.

In other words, the invention provides a device, preferably handheld device, for targeted electroporation and/or lysis of cellular bodies that comprises a tip for a pipette with at least one chamber for receiving a biological sample and at least two electrodes for generating an electric field in the chamber, which electrodes form an inner surface of the chamber and which electrodes are coated with a dielectric material with a relative permittivity greater than 3.9, preferably greater than 9, more preferably 60 or more, wherein the distance between the electrodes is below 1 mm, preferably below 550 µm, more preferably below 100 µm, wherein the device further comprises an adjustment unit that enables the adjustment of electric parameters of the electric field such as the field strength, the frequency or the wave form.

In another aspect, the invention provides a device that is an air displacement pipette with a suction and pressure means for creating a reduced pressure in a receiving chamber, wherein receiving chamber is suitable for receiving a biological sample, wherein the chamber has at least two electrodes for generating an electric field in the chamber, which electrodes are each on an inner surface of the chamber and which electrodes are coated with a dielectric material with a relative permittivity greater than 3.9, preferably greater than 9, more preferably 60 or more, wherein the distance between the electrodes is below 1 mm, preferably below 550 µm, more preferably below 100 µm. Preferably the device further is connected to or comprises an adjustment unit that enables the adjustment of electric parameters of the electric field such as electric field strength, electric pulse frequency or electric pulse wave form of the electric field.

In another aspect the invention provides a method of targeted electroporation and/or lysis of cellular bodies in a biological sample, comprising the following steps:

actuating the suction and pressure means of an air displacement pipette such that the biological sample is transferred into a chamber within a tip of the pipette exposing the biological sample to an electric field in the chamber, wherein the electric field is generated by at least two electrodes which are coated with a dielectric material with a relative permittivity greater than 3.9, preferably greater than 9, more preferably 60 or more, wherein the distance between the electrodes is below 1 mm, preferably below 550 µm, more preferably below 100 µm, and choosing the electric parameters of the electric field such as the field strength, the frequency or the wave form so that the cellular bodies are lysed and/or electroporated.

In another aspect the invention provides a method for manufacturing a device, preferably handheld device, particularly a tip for a pipette, for targeted electroporation and/or lysis of eukaryotic cellular bodies, wherein at least two electrodes are coated with a layer of dielectric material with a permittivity greater than 3.9, preferably greater than 9, more preferably 60 or more, wherein the electrodes are arranged such that the distance between the electrodes is below 1 mm, preferably below 550 µm, more preferably below 100 µm.

All aspects relate to each other and any embodiment described for one aspect commensurately also relates to all other aspects and embodiments. E.g. the biological sample described for the method or the means for the method can be included or can be part of the device. The device or any part thereof can be used in the inventive methods.

DETAILED DESCRIPTION

The present invention provides a method that allows the targeted electroporation and/or lysis of a subgroup of eukaryotic cellular bodies in a biological sample with at least two subgroups of eukaryotic cellular bodies. In this disclosure, eukaryotic cellular bodies comprise nucleated eukaryotic cells, such as lymphocytes, as well as non-nucleated bodies stemming from eukaryotic cells, such as erythrocytes. Alternative terms for eukaryotic cellular bodies are eukaryotic cellular vessels or eukaryotic cellular corpuscles. The eukaryotic cellular bodies may stem from the same organism, e.g. mammals, humans or animals. The various types of eukaryotic cellular bodies have in common that they comprise an eukaryotic cell membrane that encloses an intracellular cavity, usually filled with an aqueous medium. The cell membrane is usually from an eukaryotic cell. The term eukaryotic cellular bodies is mostly associated with eukaryotic cells herein, but also includes bodies without a nucleus, such as erythrocytes. Without being limited to a particular theory, it appears that the eukaryotic cell wall is specifically susceptible for manipulation by the inventive methods for electroporation or lysis, i.e. inducing leakiness or rupture of the cell membrane, respectively. Surprisingly, it was found out by the inventors that eukaryotic cells and their non-nucleated cellular bodies each have particular discernible susceptibilities to the electric parameters in a chamber with coated electrodes according to the invention so that different eukaryotic cellular bodies can be individually targeted without affecting other eukaryotic cellular bodies. This allows specific treatments and manipulation in a selected type of cells (subgroups in the sample). In particular surprising was that the size of eukaryotic cellular bodies is not a relevant factor. In prior art, only the larger cells in a mixture could be targeted. According to the invention, also targeting the smaller eukaryotic cellular bodies in a sample of larger eukaryotic cellular bodies is possible, wherein the larger ones remain unaffected or less affected. Cells that can be distinguished (i.e. differently affected by said electric field) are for example tumor cells and non-tumor cells (each forming a different subgroup). With a suitable electric field parameter, also cells within these group can be distinguished, such as cells from different tissue origins, such as leukocytes, liver cells, kidney cells, erythrocytes, neuronal cells, fat cells, bone cells, cartilage cells, skin cells, epithelial cells, muscular cells etc.. Also, the organism can be distinguished, such as animals, like vertebrate, and non-vertebrate or mammals, fish, amphibians, birds, reptiles, insects etc and eukaryotic bacteria. Preferably the cells of all subgroups are from an animal or human. Human cells are particularly preferred, e.g. preferably tumor cells from a human are distinguished from non-tumor cells from a human, e.g. but not necessarily the same human providing the tumor cells.

Among other applications, the inventive method or the inventive device allows the isolation of a subgroup in a biological sample for further examination. If a subgroup is lysed, while another subgroup is kept whole, i.e. or unaffected or less effected by electroporation or lysis, the DNA, RNA, proteins, other molecules or organelles of the lysed or electroporated subgroup can be specifically collected for further examination. In the light of the disclosure, a subgroup is a type of cells or other cellular bodies with essentially the same properties in view of susceptibility to electroporation and/or lysis in an electrical field, in particular, the subgroup can be a particular cell type, such as leukocytes or tumor cells, including suspended or circulating tumor cells. Typically, a subgroup comprises the same type of cells or other eukaryotic cellular bodies in the biological sample, e.g. leukocytes or erythrocytes. The biological sample can be a blood, saliva, urine sample or any other sample containing eukaryotic cellular bodies.

According to the present invention, the method of targeted electroporation and/or lysis of eukaryotic cellular bodies in a biological sample, preferably with at least two subgroups of eukaryotic cellular bodies, wherein each subgroup has a different susceptibility to electroporation and/or lysis in electric fields, comprises the following steps:

transferring the biological sample in a chamber, exposing the biological sample to an electric field in the chamber, wherein the electric field is generated by at least two electrodes which are coated with a dielectric material with a relative permittivity greater than 3.9, preferably greater than 9, more preferably 60 or more, and choosing the electric parameters of the electric field such as the field strength, the frequency or the wave form so that eukaryotic cellular bodies are electroporated or lysed, preferably so that the subgroups are differently affected by said electric field for electroporation and/or lysis.

Based on the knowledge that each subgroup of eukaryotic cellular bodies has different susceptibilities to electroporation and/or lysis, the present invention allows the specific lysis and/or electroporation of a subgroup, even only one subgroup, of eukaryotic cellular bodies within a sample with at least two subgroups of eukaryotic cellular bodies. As already mentioned above, the cells or cellular bodies of a subgroup essentially have the same susceptibility to electroporation and/or lysis. Thus, a subgroup usually refers to cells or cellular bodies of the same type, e.g. leukocytes or erythrocytes. However, subgroups can also be defined as subtypes of cells, for example T-lymphocytes and other lymphocytes, which both belong to leukocytes. In this case, T-lymphocytes would represent the first subgroup, while other lymphocytes would represent the second subgroup. Of course, the second subgroup could be further divided into several subgroups, if needed. From this it can be concluded, the definition of subgroups strongly depends on the application. Surprisingly, it has been found that by selecting particular electric field parameters, eukaryotic cellular bodies can be specifically electroporated or lysed in the electrode assembly of the present invention. In any case, it is important that the subgroups can be distinguished by their susceptibility to electroporation and/or lysis. The different susceptibilities to electroporation of cells depend on the electrical parameters of the applied electrical field, such as the field strength, the pulse frequency of the electric field, the wave form of pulses of the electric field or the exposure time of the subgroups to the electrical field. The generated electrical field can be an electrical field with a constant field strength over time. However, in a preferred embodiment, the electrical field changes over time or alternates in pulses, in particular with a given wave form, for example a rectangular or sinusoidal wave form of electric field pulses.

It is an advantage of the present invention that even a subgroup of smaller cellular bodies can be electroporated and/or lysed while another subgroup of larger cellular bodies is present and remains essentially unaffected. In the prior art, only lysis of larger cells could be achieved, since with the known methods larger cells are more affected than smaller cells. Thus, lysis and/or electroporation of cellular bodies of a small size in the presence of cellular bodies of large size could previously not be achieved. The present invention solves this problem and allows selection of subgroups independent of body size, i.e. smaller bodies can be targeted based on the membrane properties of these cells.

The specific nature of the electric parameters (strength, potential (voltage), pulse frequency, shape, duration, pulse amount or exerted energy on the cells by the electric field) not only depends on the subgroup of bodies that are differently affected by the electric field. The absolute values also depend on the shape of the chamber—in particular the distance of the electrodes, the thickness of the dielectric material and the medium in which the bodies are suspended. Different dielectric constants in the medium, different salt types etc. further affect the efficiency of the electric field so that the electric parameters need adjustment. However, it is possible to select a suitable set of parameters within the guidance provided herein without undue burden due to easy of adjusting electric properties and ease of testing cells. Effects of electroporation and lysis can be easily monitored by e.g. determining leakage of a marker that leaks out of or into the cells when the electric field is applied. The following description of parameters are preferred parameters within which cellular bodies can usually be distinguished due to their susceptibility to the electric field.

In many cases, the electroporation of cells or other cellular bodies of a subgroup depends on the electrical field strength of the applied electrical field, which in the present invention lies between 50 V/cm and 50 kV/cm, preferably the applied electrical field is from 100 V/cm to 30 kV/cm, from 500 V/cm to 20 kV/cm, or 1 kV/cm to 10 kV/cm, preferably from 2 kV/cm to 5 kV/cm. Especially preferred is a range of 5 kV/cm to 8 kV/cm or 25 kV/cm to 50 kV/cm (especially for lysis). Further preferred is a range of 50 V/cm to 400 V/cm (especially for reversible electroporation). If the electrical field is a periodic field, the subgroups may also be distinguished by their sensitivity to the frequency or the wave form of the applied electrical field. The subgroups may also be distinguished by their sensitivity to the duration of the exposure time they are exposed to the electrical field. Of course, combinations of these electrical parameters, e.g. electrical field strength, exposure time and frequency, can be used to distinguish the subgroups more precisely. These disclosed ranges for the applied electrical field may also represent ranges for the electrical field in the sample, especially cells or cellular bodies in the sample. Reversible electroporation may be used to transfer compounds into cells, e.g. transfection.

Also relevant, and proportional to the electrical field strength, is the ratio of the potential difference between the electrodes and the distance between the electrodes. This ratio is preferably in the range of 500 V/cm to 50 kV/cm, especially preferred between 50 V/cm and 50 kV/cm, preferably the applied electrical field is from 100 V/cm to 30 kV/cm, from 500 V/cm to 20 kV/cm, or 1 kV/cm to 10 kV/cm, preferably from 2 kV/cm to 5 kV/cm. Especially preferred is a range of 5 kV/cm to 8 kV/cm or 25 kV/cm to 50 kV/cm (especially for lysis). Further preferred is a range of 50 V/cm to 400 V/cm (especially for reversible electroporation). This ratio is easier to determine than the field strength—any may be a preferred parameter to characterize the invention.

According to the invention, the electric field is generated by at least two electrodes which are coated with electrically non-conductive dielectric material. The coating at least covers the surface of the electrodes that faces the interior of the chamber. By consequence, it protects the conductive part of the electrode that is behind the coating from contact with the sample. The dielectric material is solid. The dielectric coating is considered to be part of the electrodes. Thus, the electrodes comprise an electrically conductive part, preferably a metallic part, and a dielectric coating. Thus, the distances between the electrodes actually refers to the distance between the coatings. Preferably, the electrodes form a part of the chamber's periphery. The electrodes can be a part of or form an inner surface of the chamber, which inner surface is in contact with the biological sample. The electrodes can be essentially flat, flush with the rest of the inner surface or form a structure of any kind. In another embodiment, the electrodes protrude from the chamber's inner surface or form a recess of the chamber's inner surface so as to provide a homogenous electric field between the electrodes. Preferably, the electrodes are sheets that are parallel to each other. In still another embodiment, the electrodes are located outside the chamber. However, it is important that the generated electric field penetrates the chamber and hence the sample. Thus at least two electrodes are supplied with different electrical potentials. Preferably, the electrodes are disposed essentially opposite to each other. In a preferred embodiment, the electrodes are essentially flat and form two opposite inner surfaces of the chamber. In order to avoid or minimize an electrical current flow between the electrodes and other disadvantageous chemical reactions, the electrodes are coated with the dielectric material, such that only the dielectric material is in contact with the sample. Electrical current flow would lead to unfavourable side effects, such as (Joule) heating of the sample, electrolyse, pH changes or electrochemical processes which might negatively influence the sample. These side effects would interfere with the actual electroporation and/or lysis process and thereby aggravate specific electroporation and/or lysis. In order to reduce an unwanted potential drop in the coatings, the dielectric material has a relative permittivity greater than 3.9, preferably greater than 9, more preferably 60 or more. In literature, such a dielectric material is referred to high-k materials. Even higher relative permittivity is favourable, preferably 80 and higher. In particular preferred embodiments, the permittivity is from 3.9 to 20000, preferably 8 to 10000, in particular preferred 10 to 5000, or 50 to 1000, or even 40 to 500. As dielectric material any suitable dielectric material can be used, e.g. Titanium dioxide $TiO_2$, Silicon dioxide $SiO_2$, Barium titanate, strontium titanate, aluminium oxide or Niobium pentoxide, etc. Preferably, a dielectric material with semiconductive properties is used, so as to form a Schottkydiode between the metallic part of the electrode and the dielectric material. Titanium dioxide $TiO_2$ is an example for such a material. As the electrodes are coated with the dielectric material, the dielectrical material can be a thin layer on the electrodes. The material for the electrodes can be copper, gold, silver, platinum, titanium, aluminium, carbon or any other conducting material.

The inventive chamber for receiving the biological sample can be a cavity or a flow-through chamber. If the chamber is a flow-through chamber, the chamber has at least one inlet and one outlet for the sample. Thus, the chamber can be referred to as channel. Of course, several chambers or channels can be provided. If the chamber is a channel, electroporation and/or lysis can be performed while the sample is flowing through the channel. As already mentioned, the biological sample can be a blood sample, a saliva sample, a urine sample or any other sample that contains eukaryotic cellular bodies. During electroporation and/or lysis, compounds can be added to the biological sample. For example, a subgroup can be loaded with markers, stainings or DNA while another subgroup remains unloaded.

For the purpose of further reducing unfavourable side effects in connection with the electrodes, it is advantageous, if the dielectric material has a thickness below 1 μm, preferably in the range of 50 nm to 850 nm, more preferably in the range of 100 nm to 750 nm or in the range of 150 nm to 500 nm, especially preferred 200 nm to 400 nm. Also larger ranges are possible, e.g. 600 nm to 2000 nm or 700 nm to 1000 nm or 750 nm to 800 nm. Due to the small thickness of the dielectric material, which is coated on the electrodes, the potential drop along the dielectric material is kept low. Thus, the use of high electrical potential differences, which entail negative side effects, is avoided. Furthermore, the whole assembly can be realized as micro fluidic structure.

In order to generate a high electrical field strength of the electrical field with a relatively small potential difference between the electrodes, the distance between the electrodes can be below 1 mm, preferably below 550 μm, more preferably below 100 μm or even below 50 μm, but greater than 5 μm. Preferably the distance between the electrodes is at 5 μm to 1 mm, preferably 10 μm to 800 μm, or 20 μm to 700 μm, or 30 μm to 600 μm or 40 μm to 550 μm, or 50 μm to 90 μm or 60 to 85 μm. Further preferred distances between the electrodes are 120 μm to 2 mm, 150 μm to 1750 μm, 250 μm to 1500 μm, 550 μm to 1200 μm, 600 μm to 1 mm or any combination of these ranges. This facilitates the implementation of the inventive method in a handheld device since small potential differences can be easily achieved by means of batteries. Additionally, due to the small distances between the electrodes, homogeneity of the electrical field is enhanced.

In one embodiment of the invention, the potential difference between the electrodes is in the range of 1 V to 100 V, preferably in the range of 5 V to 80 V or even 7 V to 70 V, more preferably in the range of 10 V to 55 V, 11.8 V to 45 V, 12 V to 40 V, or even 15 V to 35 V. These potential differences can be easily generated by batteries preferably in combination with a voltage transducer, e.g. a DC/DC converter.

Preferably, the electric field is a periodic field with a frequency in the range of 0.1 Hz to 10 kHz, preferably in the range of 10 Hz to 1 kHz or even 20 Hz to 1 kHz, especially 50 Hz to 900 Hz, or 100 Hz to 800 Hz, or 150 Hz to 700 Hz or 200 Hz to 600 Hz, wherein the wave form of the electric field is preferably a square wave, a sinusoidal wave or at least one pulse. Frequencies around 100 HZ, such as 80 Hz to 200 Hz are especially preferred. The periodic field can be unipolar or bipolar. Further, the field can be alternating periodically. The pulses are preferably unipolar, with a determined on-time and a determined off-time. In one embodiment, the pulses are rectangular. In another embodiment, the pulses are exponential decay pulses, wherein the rising edge has a step form, i.e. a vertical slope with a very short rise time, and the falling edge is exponentially falling, i.e. has a fall time longer than the rise time, such as multiple times longer, e.g. 5 times, 10 times, 20 times, 100 times or more or any range between these values. By means of exponential decay pulses, unwanted current pulses due to capacitive discharging in the sample can be avoided with the falling edge. The wave form can also have a positive or negative offset.

The wave form can also be cut off partially. Any other methods for shaping the wave form can be used, such as pulse-width modulation. Experiments have shown, that frequencies higher than 1 kHz can lead to unwanted heating of the electrodes due to capacitive currents. Thus, frequencies below 1 kHz are preferred. The above explanations are applicable for the potential difference between the electrodes and the electrical field strength, as the potential difference is related to the electrical field strength.

In another embodiment, the exposure time of the biological sample lies in the range of 1 second to 20 seconds, preferably in the range of 2 seconds to 12 seconds, more preferably 3 to 7 seconds or essentially 6 seconds. If electroporation should be conducted and the exposure time is too long, too many cells may die during the process.

In another embodiment, the number of pulses is kept in the range from 1 to 40000 or 10 to 30000, preferably in the range from 50 to 20000, more preferably in the range from 100 to 10000 or 150 to 8000, in particular preferably in the range from 200 to 8000 or 400 to 7000. Other favourable ranges, particularly for delivering compounds into cellular bodies, are 1 to 100 pulses, 1 to 70 pulses, 1 to 40 pulses, 1 to 15 pulses or 1 to 7 pulses. Other favourable ranges are 1000 to 20000 pulses, 1000 to 15000 pulses, 1000 to 10000 pulses, 1000 to 5000 pulses or 1000 to 3000 pulses. Similar to the exposure time, too many pulses adversely have negative impact on the survival rate of the cells when reversible electroporation is desired. The frequency at which the above mentioned number of pulses are applied is in the range of 10 Hz to 5 kHz, preferably, 100 Hz to 2 kHz, more preferably 800 Hz to 1.5 kHz. "Pulse" refers to one monopolar excitation to a maximum (such as at the indicated potential/voltages discussed above) that drops towards to baseline excitation, such as one-half sinusoid period or one square pulse, or one exponentially falling pulse.

For further processing the biological sample, the sample can be filtered for concentrating cellular bodies of a subgroup after lysis and/or electroporation. For instance, the chamber can comprise a filter to concentrate and purify particles or cells un-/affected from electroporation and/or lysis.

Since by means of lysis DNA or RNA material from the cellular interior is set free, in a preferred embodiment, after lysis of a subgroup, organelles and/or biomolecules from said subgroup, preferably genetic material such as DNA or RNA or proteins, are collected. Other biomolecules are lipids of the lysed cells.

Electroporation can be used to collect material from or introduce material into the cellular body. Such material can be compounds of the cell, such as RNA or proteins. Material introduced into the cells is usually nucleotides, especially RNA or DNA or small molecule compounds of a size of up to 1 kDa. Preferably markers, labels or dyes are introduced into the cell, such as radiolabels or fluorescent labels.

Through experiments it has been shown that a reduced electrical conductivity in the sample leads to a reduction of the required field strength for electroporation and/or lysis when using the inventive chamber. Therefore, it is favourable if prior to exposing the biological sample to the electric field, an electrical conductivity reduction of the sample below 1 mS/cm, preferably in the range of 10 µS/cm to 800 µS/cm or 60 µS/cm to 560 µS/cm, by means of ionic exchange, transversal diffusion, filtering, dilution, buffer exchange or electrophoretic separation is conducted. The conductivity reduction can be conducted in a separate or in the same device as the inventive method. In experiments, it could be shown that by means of conductivity reduction, the rate of electroporation and/or lysis could be enhanced. In the prior art, usually $MgCl_2$ is added to the sample for electroporation. According to the invention, it is preferred to add alkali metal ions, especially $Li^+$ or $Na^+$ or $PO_4^{3-}$ ions, lysis and/or electroporation rate could be improved. Preferably the alkali metal ions are with a halogen counterion, such as $Cl^-$. Preferably, the concentration of the added molecules or salts lies in the range of 0.001 mM to 100 mM, preferably 0.01 mM to 50 mM, more preferably in the range of 0.05 mM to 10 mM for Li, Na, such as LiCl, NaCl, $MgCl_2$, $H_xPO_4$ or combinations thereof. "mM" refers to the unit millimolar. In case of combinations, these indicated concentrations refer to a sum concentration of these (alkali) metals combined.

For the purpose of examining cells or cellular bodies, it is advantageous if prior to and/or after exposing the biological sample to the electrical field, flow cytometry is conducted. In flow cytometry applications, cells are passed by an electrical potential or a light beam and thereby lead to different measurable effects depending on the size, shape or colour of the cells. In embodiments of flow cytometry after exposing the sample to the electrical field, it can be useful to load the cells of a certain subgroup of the biological sample with markers, stainings or other compounds prior to flow cytometry. Thus, prior to flow cytometry, the biological sample can be exposed to the electrical field in the inventive chamber for electroporation and loaded with markers, stainings or other compounds. In embodiments of flow cytometry prior to exposing the sample to the electrical field, after flow cytometry, the biological sample can be transferred in the inventive chamber for exposing the biological sample to the electrical field. Both embodiments (electric field treatment prior and after flow cytometry) can be combined. In a preferred embodiment, two inventive chambers with electrodes are used, wherein the chambers are in fluid connection with the flow cytometry unit. One of the chambers is arranged upstream to the cytometry device and the other chamber is arranged downstream to the cytometry device. This arrangement can be accommodated in a single device or separated from each other. In this preferred embodiment, the sample is loaded with markers, stainings or other compounds in the first chamber, then transferred to the flow cytometry unit via fluid connection. After analysis or identification of specific subgroups in the flow cytometry unit, the sample is transferred to the second chamber via fluid connection. On the basis of the analysis or identification of the flow cytometry unit, the identified subgroups can be electroporated or lysed in the second chamber.

In the following, it is assumed that the chamber comprises two planar electrodes which are spaced apart with a distance of 81.3 µm. Thus, for a given electrical field strength of the generated electrical field, the potential difference can be calculated by means of a multiplication of the distance by the electrical field strength. On the other side, the electrical field strength can be calculated from the distance and the potential difference between the electrodes (potential difference divided by distance). Thus, with these two parameters given, the electrical field strength can be determined (neglecting the potential drop in the coating of the electrodes by approximation). Therefore, the electrical field strength can be unambiguously exchanged with the specification of the distance between the electrodes and the potential difference and vice versa without any restriction. Of course, the distance could also be greater or smaller than 81.3 µm as discussed above.

For specific lysis of erythrocytes and for the isolation of leukocytes in a blood sample, it is advantageous if the electric field has a field strength of at least 2.2 kV/cm, preferably of at least 2.5 kV/cm, more preferably 3.0 kV/cm, but not more than 6 kV/cm or even not more than 4.5 kV/cm. The electric field can be a periodic field and the frequency can be in the range of 10 Hz to 1 kHz, preferably 50 Hz to 200 Hz. In the most preferred embodiment, the wave form of the electrical field is an alternating square wave or unipolar rectangular pulses and the frequency is preferably about 100 Hz. The exposure time of the sample in the electrical field lies between 12 seconds and 0.5 seconds. Assuming that the distance between the electrodes is 81.3 µm, the corresponding potential difference is at least about 17.8 V, preferably at least about 20 V, more preferably about 25 V, but not more than about 50 V or even not more than 36.6 V. With the above parameters, leukocytes can be isolated from erythrocytes. The erythrocytes are thereby lysed.

For specific lysis of leukocytes and for the isolation of hematopoetic stem cells, the electric field has a field strength of at least essentially 3.0 kV/cm, preferably 4.5 kV/cm. The electric field can be a periodic field and the frequency can be in the range of 10 Hz to 500 Hz, preferably 100 Hz to 200 Hz. Preferably the wave form of the electric field is an alternating square wave or unipolar rectangular pulses and the frequency is preferably about 100 Hz. The exposure time of the sample in the electrical field lies between 12 seconds and 0.5 seconds. Assuming that the distance between the electrodes is 81.3 µm, the corresponding potential difference is at least essentially 25 V, preferably 36.6 V, but preferably not more than 45 V. With the above parameters, hematopoetic stem cells can be isolated from different leukocytes. In this case, the subgroups are subtypes of leukocytes.

The step of choosing the electric parameters of the electric field such as the field strength, the frequency or the wave form is easy within the above described parameters. As has been found according to the present invention (see examples), these parameters can be varied to identify a parameter combination that is able to lyse or electroporate cells, in particular, so that selected subgroups of cells are differently affected by said electric field for electroporation and/or lysis. The choosing step may include a brief screening step. E.g. it is possible to provide two subgroup of cells and select a pulse shape and pulse frequency and treatment duration, e.g. within the ranges described herein. Then a potential is varied, e.g. within the ranges disclosed herein, to identify a value of different susceptibility between the subgroups of cells. If in the selected pulse shape and pulse frequency and treatment duration no suitable potential (voltage) is found, then the pulse frequency and treatment duration shall be varied and again the voltage is tested for a value of different susceptibility between the subgroups of cells. This simple procedure can be repeated for all electric parameters of the electric field as described herein.

For specific lysis of cancer cells and isolation of non-cancerous cells, preferably for specific lysis of cancerous Leukocytes or circulating tumour cells, preferably breast cancer cells, and isolation of healthy leukocytes, the electric field has a field strength of at least 1.8 kV/cm, preferably 2.4 kV/cm. The electric field can be a periodic field and the frequency can be in the range of 10 Hz to 1000 Hz, more preferably 100 Hz to 200 Hz. Preferably the wave form of the electrical field is an alternating square wave or unipolar rectangular pulses and the frequency is preferably about 100 Hz. The exposure time of the sample in the electrical field lies between 12 seconds and 0.5 seconds. Assuming that the distance between the electrodes is 81.3 µm, the corresponding potential difference is at least about 14.6 V, preferably at least about 20 V, more preferably about 19.6 V, but preferably not more than 45 V. For instance, Jurkat T lymphocytes can be cancerous Leukocytes.

Alternatively, the above method can be described as a method of targeted electroporation and/or lysis of eukaryotic cellular bodies in a biological sample with at least a first and a second group or subgroup of eukaryotic cellular bodies, each group or subgroup having an electroporation and/or a lysis rate, wherein the biological sample is transferred into a chamber and exposed to an electric field in the chamber which is generated by at least two electrodes which are coated with a dielectric material with a relative permittivity greater than 3.9, preferably greater than 9, more preferably 60 or more, wherein for isolating and/or delivering a compound into the cells of the first group or subgroup the electric parameters such as the field strength, the frequency or the wave form of the electric field are chosen to conduct electroporation and/or lysis the first group or subgroup with a different electroporation and/or a lysis rate than the second group or subgroup.

In another aspect, the invention relates to a device, preferably handheld device, for targeted electroporation and/or lysis of eukaryotic cellular bodies in a biological sample, comprising at least one chamber for receiving the biological sample and at least two electrodes for generating an electric field in the chamber, which electrodes are coated with a dielectric material with a permittivity greater than 3.9, preferably greater than 9, more preferably 60 or more, wherein the distance between the electrodes is below 1 mm, preferably below 550 µm, more preferably below 100 µm, but more than 5 µm, wherein the device further comprises an adjustment unit that enables the adjustment of electric parameters of the electric field such as the field strength, the frequency or the wave form.

With the inventive device, the above described method can be conducted. According to the invention the distance between the electrodes is kept below 1 mm. Preferably the distance between the electrodes is at 5 µm to 1 mm, preferably 10 µm to 800 µm, or 20 µm to 700 µm, or 30 µm to 600 µm or 40 µm to 550 µm, or 50 µm to 90 µm or 60 to 85 µm. Further preferred distances between the electrodes are 120 µm to 2 mm, 150 µm to 1750 µm, 250 µm to 1500 µm, 550 µm to 1200 µm, 600 µm to 1 mm or any combination of these ranges. Thus, the potential difference between the electrodes can be kept low and the homogeneity of the electrical field is improved. The chamber can be a cavity as well as a flow-through chamber with an inlet and an outlet. If the chamber is a flow-through chamber, it is also referred to as channel. It is important to note that parts of the electrodes that are in contact with the biological sample in the filled state of the chamber are coated with the electrically non-conductive dielectric material. As the device is intended for implementing the above described method, reference is made to the above remarks.

For the purpose of further reducing unfavourable side effects in connection with the electrodes, it is advantageous, if the dielectric material has a thickness below 1 µm, preferably in the range of 50 nm to 850 nm, more preferably in the range of 100 nm to 750 nm or in the range of 150 nm to 500 nm, especially preferred 200 nm to 400 nm. Also larger ranges are possible, e.g. 600 nm to 2000 nm or 700 nm to 1000 nm or 750 nm to 800 nm.

In order to efficiently use the device in laboratory environment, the chamber forms a part of an air displacement pipette, particularly a part of a tip of such a pipette, wherein the pipette has suction and pressure means for creating a reduced pressure within the pipette. Air displacement pipettes are also known as micropipettes. The tip is considered to form a part of the pipette, even when the tip is exchangeable. The electrodes can be arranged in the longitudinal direction of the tip. By means of the suction and pressure means the sample can be sucked into the tip and then be exposed to the electrical field within the tip. The reduced pressure is thus directly or indirectly generated within the tip. The suction and pressure means are preferably formed by a piston, which can be actuated by hand or by an actuator, such as an electrical actuator. The chamber can have a size in the range of 0.001 to 30 ml, preferably 0.01 to 25 ml, or 0.1 ml to 20 ml, 0.2 ml to 15 ml, 0.5 ml to 12 ml, 1 ml to 10 ml or 1 ml to 5 ml. After lysis and/or electroporation is conducted, the sample can be released again by means of the suction and pressure means. It is preferred when the tip is removable from the pipette and hence exchangeable. In a preferred embodiment, all units of the device, including the adjustment unit and batteries, are integrated into the pipette. In an alternative embodiment, the adjustment unit of the device is separated from the pipette. The electrodes can be connected to the adjustment unit via electrical wires.

It is favourable if the electrodes of the chamber form an inner surface of the chamber and lie opposite to each other. In another embodiment, the chamber has a longitudinal extension and the electrodes are ring electrodes that encircle the chamber from outside, wherein the electrical field penetrates the chamber. In another embodiment, the device is an air displacement pipette with a suction and pressure means for creating a reduced pressure in a receiving chamber, wherein receiving chamber is suitable for receiving a biological sample, wherein the chamber has at least two electrodes for generating an electric field in the chamber, which electrodes are each on an inner surface of the chamber and which electrodes are coated with a dielectric material with a relative permittivity greater than 3.9, preferably greater than 9, more preferably 60 or more, wherein the distance between the electrodes is below 1 mm, preferably below 550 µm, more preferably below 100 µm. Preferably the device further is connected to or comprises an adjustment unit that enables the adjustment of electric parameters of the electric field such as electric field strength, electric pulse frequency or electric pulse wave form of the electric field.

Air displacement pipettes are also known as micropipettes. Preferably, the suction and pressure means are formed by a piston, which can be actuated by hand or by an actuator, such as an electrical actuator. Preferably, the chamber is accommodated within a tip of the pipette. The electrodes can be arranged in the longitudinal direction of the tip. The tip is preferably exchangeable. The tip is considered to form a part of the pipette, even when the tip is exchangeable. By means of the suction and pressure means the sample can be sucked into the tip and then be exposed to the electrical field within the tip. After lysis and/or electroporation is conducted, the sample can be released again by means of the suction and pressure means. The chamber can have a size in the range of 0.001 to 30 ml, preferably 0.01 to 25 ml, or 0.1 ml to 20 ml, 0.2 ml to 15 ml, 0.5 ml to 12 ml, 1 ml to 10 ml or 1 ml to 5 ml.

In a preferred embodiment, all units of the device are integrated into the pipette. In this case, the power supply, e.g. batteries, can also be integrated into the device. In an alternative embodiment, the adjustment unit of the device is separated from the pipette. The electrodes can be connected to the adjustment unit via electrical wires. The adjustment unit directly supplies the electrodes with voltage to generate the electrical field.

In another aspect, the invention provides a method of targeted electroporation and/or lysis of cellular bodies in a biological sample, comprising the following steps:

actuating the suction and pressure means of an air displacement pipette such that the biological sample is transferred into a chamber within a tip of the pipette exposing the biological sample to an electric field in the chamber, wherein the electric field is generated by at least two electrodes which are coated with a dielectric material with a relative permittivity greater than 3.9, preferably greater than 9, more preferably 60 or more, wherein the distance between the electrodes is below 1 mm, preferably below 550 µm, more preferably below 100 µm, and choosing the electric parameters of the electric field such as the field strength, the frequency or the wave form so that the cellular bodies are lysed and/or electroporated.

This method may be used for lysis of cells or transfection. To this end, the biological sample is transferred into the tip of the pipette and the parameters are chosen such that the cells are still alive after exposure to the field (reversible electroporation). During the procedure, material or a component that may be added to the biological sample is transferred into the cells. Of course, with the above method, lysis can be conducted as well. In a preferred embodiment, the suction and pressure means are formed by a piston, which can be actuated by hand or by an actuator, such as an electrical actuator. The chamber can have a size in the range of 0.001 to 30 ml, preferably 0.01 to 25 ml, or 0.1 ml to 20 ml, 0.2 ml to 15 ml, 0.5 ml to 12 ml, 1 ml to 10 ml or 1 ml to 5 ml. As the method is intended to be applied by the above device, reference is made to the above remarks.

Preferably the electrodes are flat sheets or metallic material (with a passivation layer as described above). The surface facing the chamber that is able to be in contact with the sample in the chamber is preferably 50 $mm^2$ to 1000 $mm^2$, especially preferred 75 $mm^2$ to 750 $mm^2$, 100 $mm^2$ to 300 $mm^2$. According to all embodiments of the invention, preferably the pipette tip or chamber has not more than two electrodes for treatment of the sample. The chamber is preferably rectangular with the electrodes provided in parallel arrangement therein, forming the rectangular space. The electrodes in this size are preferably adapted for smaller voltages, such as 1 V to 45 V or preferably 5 V to 40 V. In particular in case of a pipette tip, the electrodes are preferably spaced so as to cover the entire chamber. Related thereto, so that the entire sample in the pipette tip is treated, preferably the chamber volume between the electrodes is substantially equal or bigger than the volume sucked in to the pipette tip and/or the volume of the piston of the pipette that defines said suction volume per tip. Preferably, the electrodes extend substantially to the chamber opening at the tip of the pipette.

In preferred embodiments the invention is defined as follows:

1. A method of targeted electroporation and/or lysis of eukaryotic cellular bodies in a biological sample with at least two subgroups of eukaryotic cellular bodies, wherein each subgroup has a different susceptibility to electroporation and/or lysis in electric fields, comprising the following steps:
   transferring the biological sample in a chamber,
   exposing the biological sample to an electric field in the chamber, wherein the electric field is generated by at least two electrodes which are coated with a dielectric material with a relative permittivity greater than 3.9, preferably greater than 9, more preferably 60 or more, and
   choosing the electric parameters of the electric field such as the field strength, the frequency or the wave form so that the subgroups are differently affected by said electric field for electroporation and/or lysis;
   OR
   a method of targeted electroporation and/or lysis of eukaryotic cellular bodies in a biological sample, comprising the following steps:
   transferring the biological sample in a chamber,
   exposing the biological sample to an electric field in the chamber, wherein the electric field is generated by at least two electrodes which are coated with a dielectric material with a relative permittivity greater than 3.9, preferably greater than 9, more preferably 60 or more, and
   choosing the electric parameters of the electric field such as the field strength, the frequency or the wave form so that eukaryotic cellular bodies in a biological sample are affected by said electric field for electroporation and/or lysis.

2. The method according to 1, wherein the dielectric material has a thickness below 1 μm, preferably in the range of 50 nm to 650 nm, more preferably in the range of 100 nm to 500 nm.

3. The method according to 1 or 2, wherein the distance between the electrodes is below 1 mm, preferably below 550 μm, more preferably below 100 μm or even below 50 μm, but greater than 5 μm, and the electric field strength is in the range of 500 V/cm to 50 kV/cm, preferably 1 kV/cm to 10 kV/cm, more preferably 2 kV/cm to 5 kV/cm.

4. The method according to 1 to 3, wherein the potential difference between the electrodes is in the range of 1 V to 100 V, preferably in the range of 5 V to 80 V or even 7 V to 70 V, more preferably in the range of 10 V to 45 V or even 15 V to 40 V.

5. The method according to 1 to 4, wherein the electric field is a periodic field with a frequency in the range of 0.1 Hz to 10 kHz, preferably in the range of 10 Hz to 1 kHz or even 50 Hz to 1 kHz, wherein the wave form of the electric field is preferably a square wave, a sinusoidal wave or at least one pulse per period.

6. The method according to 1 to 5, wherein the sample is filtered for concentrating cellular bodies of a subgroup after lysis and/or electroporation.

7. The method according to 1 to 6, wherein after lysis of a subgroup, organelles and/or biomolecules from said lysed subgroup, preferably genetic materials such as DNA or RNA or proteins, are collected.

8. The method according to 1 to 7, wherein prior to exposing the biological sample to the electric field, an electrical conductivity reduction of the sample below 1 mS/cm, preferably in the range of 10 μS/cm to 800 μS/cm or 60 μS/cm to 560 μS/cm, by means of dilution, buffer exchange, ionic exchange, transversal diffusion, filtering or electrophoretic separation is conducted.

9. The method according to 1 to 8, wherein prior to and/or after exposing the biological sample to the electrical field, flow cytometry is conducted.

10. The method according to 1 to 9, wherein for specific lysis of erythrocytes and for the isolation of leukocytes, the electric field has a field strength of at least 2.2 kV/cm, preferably of at least 2.5 kV/cm, more preferably 3.0 kV/cm, but not more than 6 kV/cm or even not more than 4.5 kV/cm.

11. The method according to 10, wherein the electric field is a periodic field with a frequency in the range of 10 Hz to 1 kHz.

12. The method according to 1 to 11, wherein for specific lysis of leukocytes and for the isolation of hematopoietic stem cells, the electric field has a field strength of at least essentially 3.0 kV/cm, preferably 4.5 kV/cm.

13. The method according to 12, wherein the electric field is a periodic field with a frequency in the range of 1 Hz to 1 kHz, preferably 10 Hz to 500 Hz.

14. The method according to 1 to 13, wherein for specific lysis of cancer cells and isolation of non-cancerous cells, preferably for specific lysis of cancerous Leukocytes or circulating tumour cells, preferably breast cancer cells, and isolation of healthy leukocytes, the electric field has a field strength of at least 1.8 kV/cm, preferably 2.4 kV/cm.

15. The method according to 14, wherein the electric field is a periodic field with a frequency in the range of 10 Hz to 1000 Hz.

16. Method for manufacturing a device, preferably handheld device, particularly an air displacement pipette, for targeted electroporation and/or lysis of eukaryotic cellular bodies, wherein at least two electrodes are coated with a layer of dielectric material with a permittivity greater than 1, preferably greater than 3.9, more preferably 60 or more, wherein the electrodes are arranged such that the distance between the electrodes is below 1 mm, preferably below 550 μm, more preferably below 100 μm, but greater than 5 μm.

17. Device, preferably handheld device, suitable for targeted electroporation and/or lysis of eukaryotic cellular bodies in a biological sample, comprising at least one chamber for receiving the biological sample and at least two electrodes for generating an electric field in the chamber, which electrodes are coated with a dielectric material with a permittivity greater than 1, preferably greater than 3.9, more preferably 60 or more, wherein the distance between the electrodes is below 1 mm, preferably below 550 μm, more preferably below 100 μm, but greater than 5 μm, wherein the device further comprises an adjustment unit that enables the adjustment of electric parameters of the electric field such as the field strength, the frequency or the wave form.

18. Device according to 17, wherein the chamber forms a part of an air displacement pipette, particularly a part of a tip of such a pipette, wherein the pipette has suction and pressure means for creating a reduced pressure within the pipette such that the biological sample is transferred into the pipette.

19. An air displacement pipette device with a suction and pressure means for creating a reduced pressure in a receiving chamber, wherein the receiving chamber is suitable for receiving a biological sample, wherein the chamber has at least two electrodes for generating an electric field in the chamber, which electrodes are each on an inner surface of the chamber and which electrodes are coated with a dielectric material with a relative permittivity greater than 3.9, preferably greater than 9, more preferably 60 or more, wherein the distance between the electrodes is below 1 mm, preferably below 550 μm, more preferably below 100 μm. Preferably the device further is connected to or comprises an adjustment unit that enables the adjustment of electric parameters of the electric field such as electric field strength, electric pulse frequency or electric pulse wave form of the electric field.

20. The device according to 17 to 19, wherein the dielectric material has a thickness below 1 μm, preferably in the range of 50 nm to 650 nm, more preferably in the range of 100 nm to 500 nm.

21. The device according to 17 to 20, wherein the distance between the electrodes is below 1 mm, preferably below 550 μm, more preferably below 100 μm or even below 50 μm, but greater than 5 μm, and the electric field strength is in the range of 500 V/cm to 50 kV/cm, preferably 1 kV/cm to 10 kV/cm, more preferably 2 kV/cm to 5 kV/cm.

22. The device according to 17 to 21, wherein the potential difference between the electrodes is in the range of 1 V to 100 V, preferably in the range of 5 V to 80 V or even 7 V to 70 V, more preferably in the range of 10 V to 45 V or even 15 V to 40 V.

23. The device according to 17 to 22, wherein the electric field is a periodic field with a frequency in the range of 0.1 Hz to 10 kHz, preferably in the range of 10 Hz to 1 kHz or even 50 Hz to 1 kHz, wherein the wave form of the electric field is preferably a square wave, a sinusoidal wave or at least one pulse per period.

24. The device of any one of 17 to 23 wherein the chamber has a size of 0.001 to 30 ml, preferably 0.01 to 25 ml, or 0.1 ml to 20 ml, 0.2 ml to 15 ml, 0.5 ml to 12 ml, 1 ml to 10 ml or 1 ml to 5 ml.

25. The device of any one of 17 to 24, wherein the surface of an electrode, preferably the surface of each of the at least two electrodes, facing the chamber that is able to be in contact the sample in the chamber is 50 mm² to 1000 mm², especially preferred 75 mm² to 750 mm² or 100 mm² to 300 mm².

26. The device according to 17 to 25, wherein the chamber volume between the electrodes is substantially equal or bigger than the volume sucked in to the pipette tip and/or smaller than the volume of the piston of the pipette.

27. The method of using the device of 17 to 26 in the electroporation or lysis of cells in a sample, which is placed between the electrodes and an electric field is applied to electroporate or lyse the cells in a sample.

28. The method according to 27, wherein the sample is filtered for concentrating cellular bodies of a subgroup after lysis and/or electroporation.

29. The method according to 27 or 28, wherein after lysis of a subgroup, organelles and/or biomolecules from said lysed subgroup, preferably genetic materials such as DNA or RNA or proteins, are collected.

30. The method of any one of claims 1 to 15, wherein a device of any one of claims 17 to 26 is used in said method to provide the chamber and the electrodes used in said methods.

In the following, illustrative examples are given, to which the invention shall not be restricted to. In the examples, the distance between the electrodes is 81.3 μm. Of course, this distance can be varied. In order to maintain the same electromagnetic field strength, the potential (voltage) can be equally adapted according to electric field strength=potential/distance. Further it is assumed, that the term "passivation" is equal to coating and that "being passivated" means being coated with dielectric material.

BRIEF DESCRIPTION OF THE DRAWINGS

FIGURES

Figure 1:
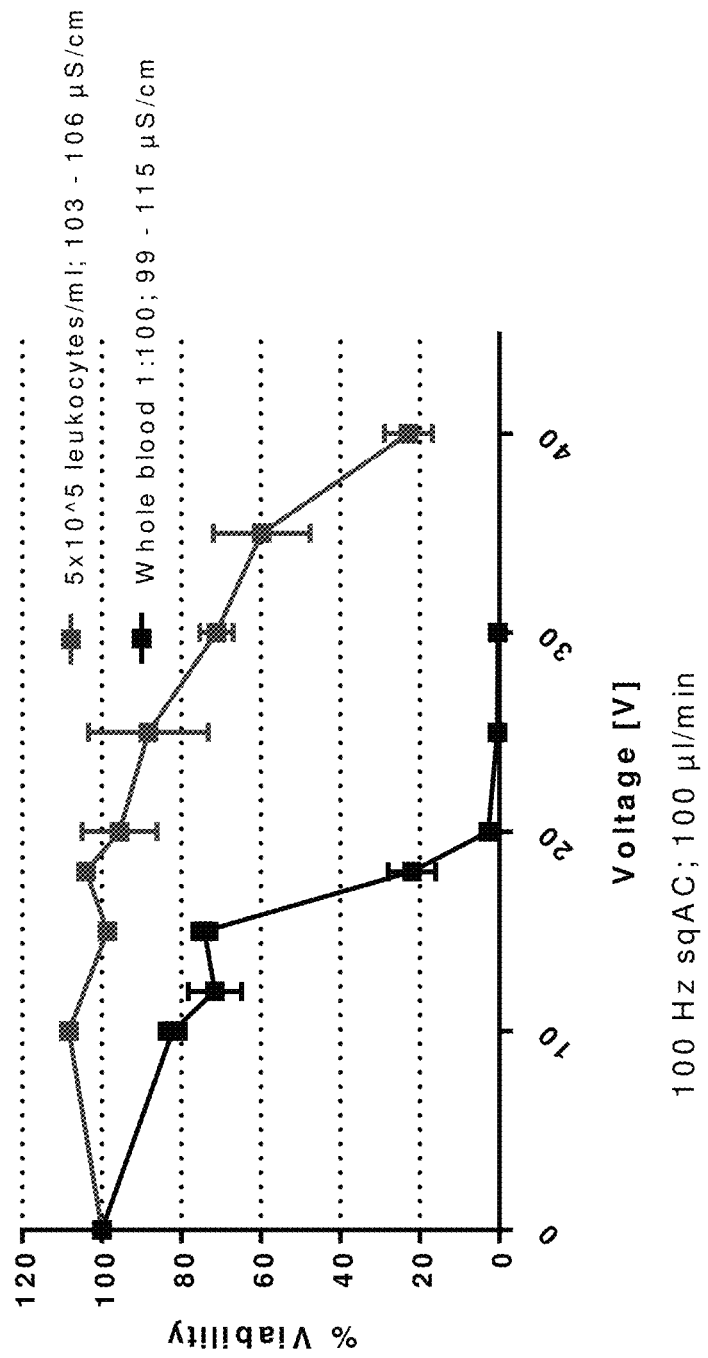

FIG. 1 shows a comparison of lysis curves of diluted whole blood and leukocyte suspension.

Figure 2:
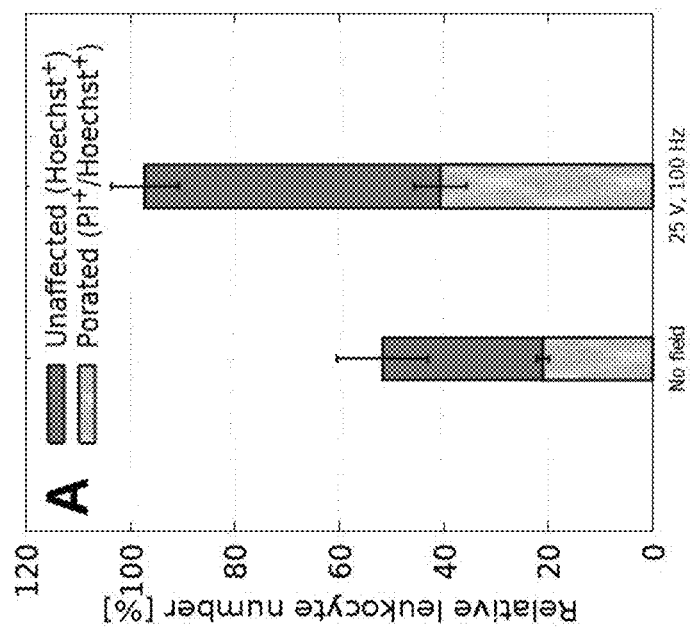

FIG. 2 refers to the enrichment of leukocytes in a leukocyte-spiked whole blood dilution.

Figure 3:
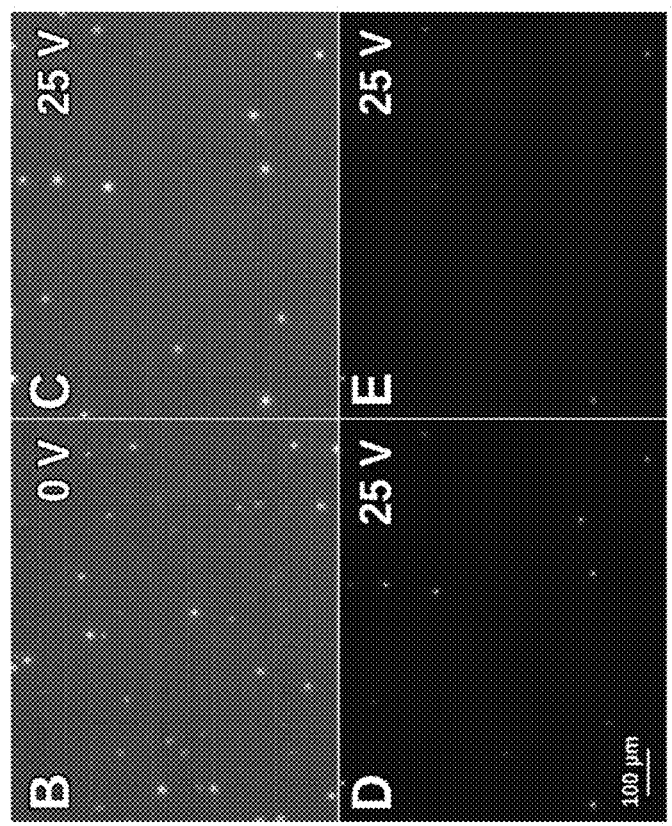

FIG. 3 shows microscopy images of leukocyte-spiked diluted blood before and after application of an electric field.

Figure 4:
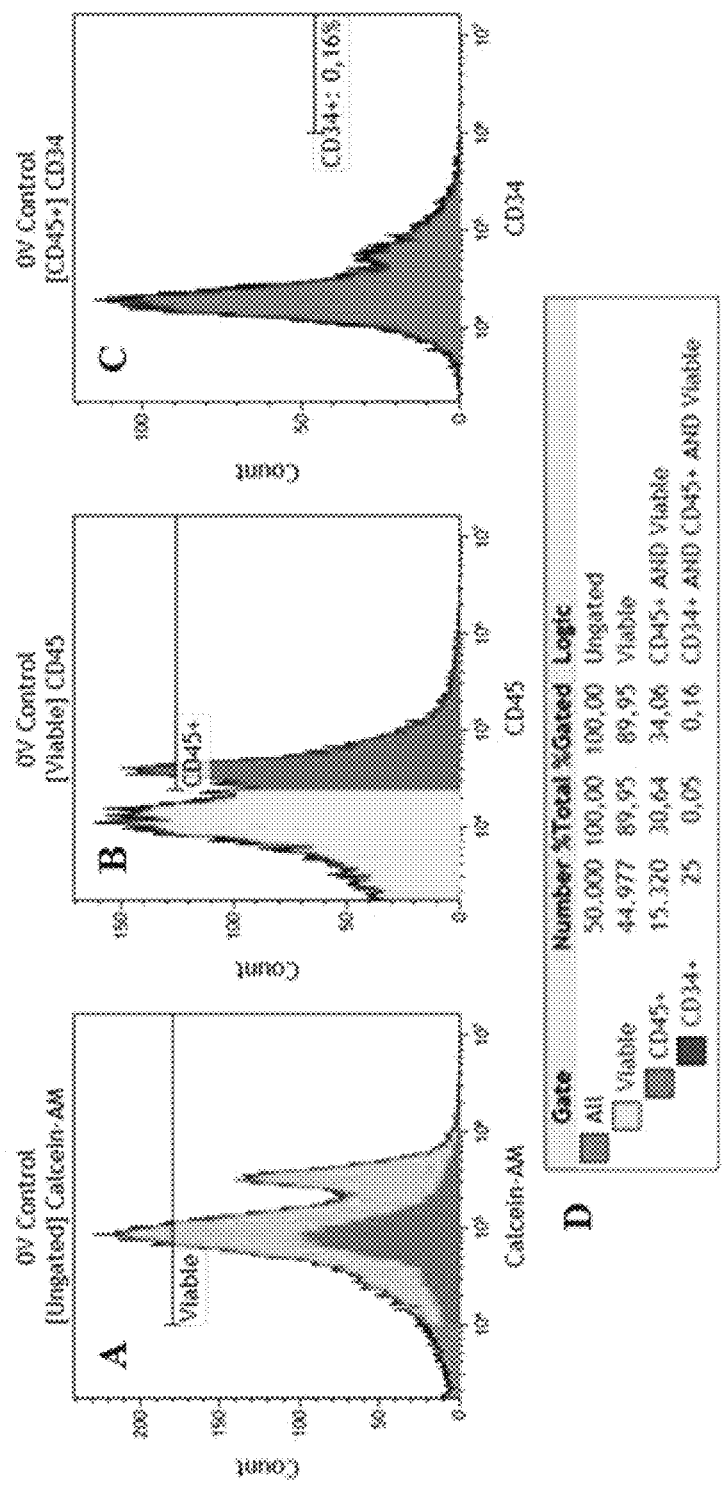
Figure 4:
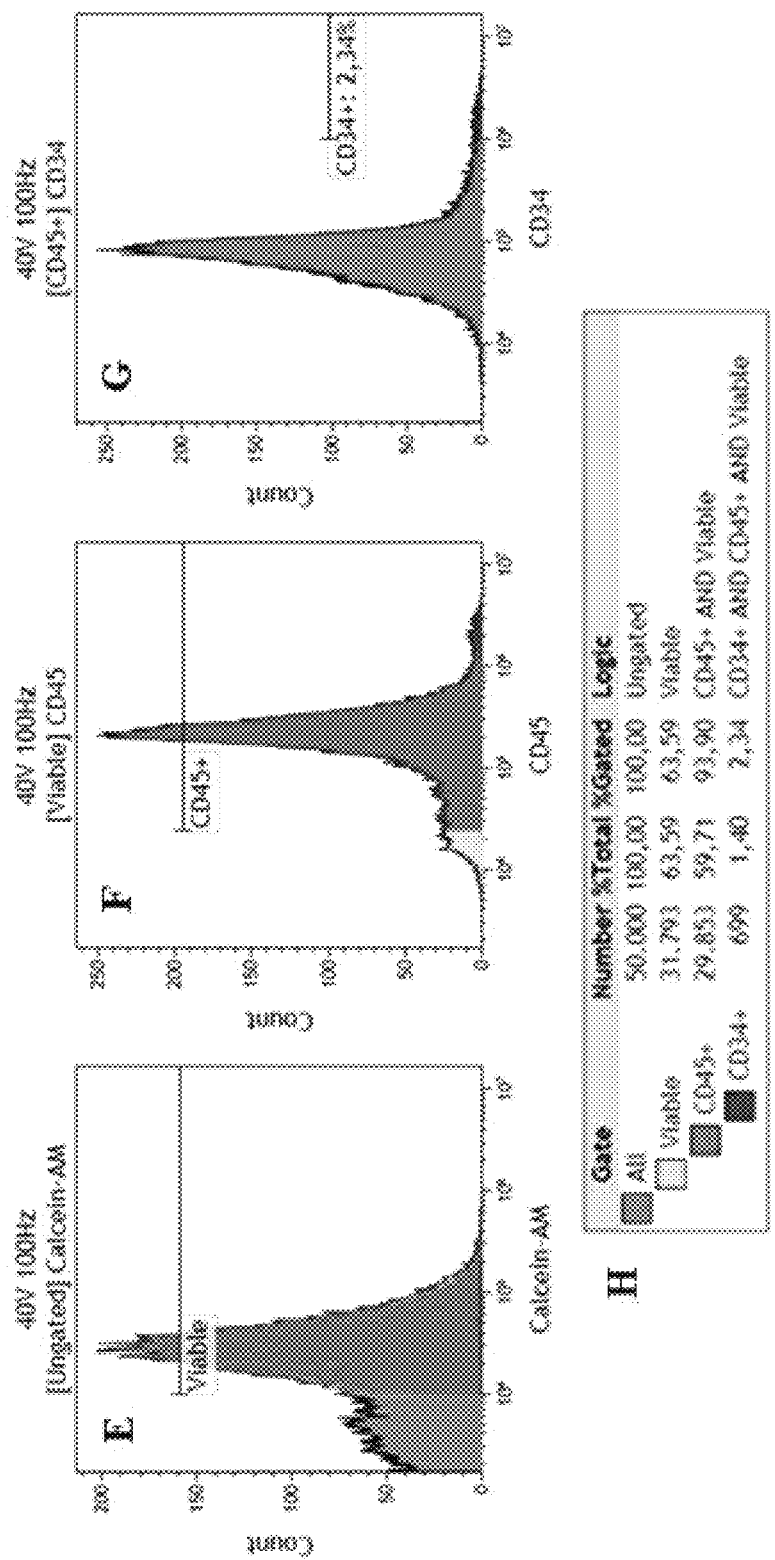

FIG. 4 shows the results of flow cytometric analysis for isolated leukocytes with no field (images A to D) and after 40 V square waves applied at 100 Hz (images E to H). Histograms show cell viability via Calcein-AM fluorescence (images A, E), CD45 fluorescence shows cells other than erythrocytes (images B, F) and cells stained for CD34 account for the fraction of HSCs (images C, G). Images D and H refer to gate statistics and logic.

Figure 5:
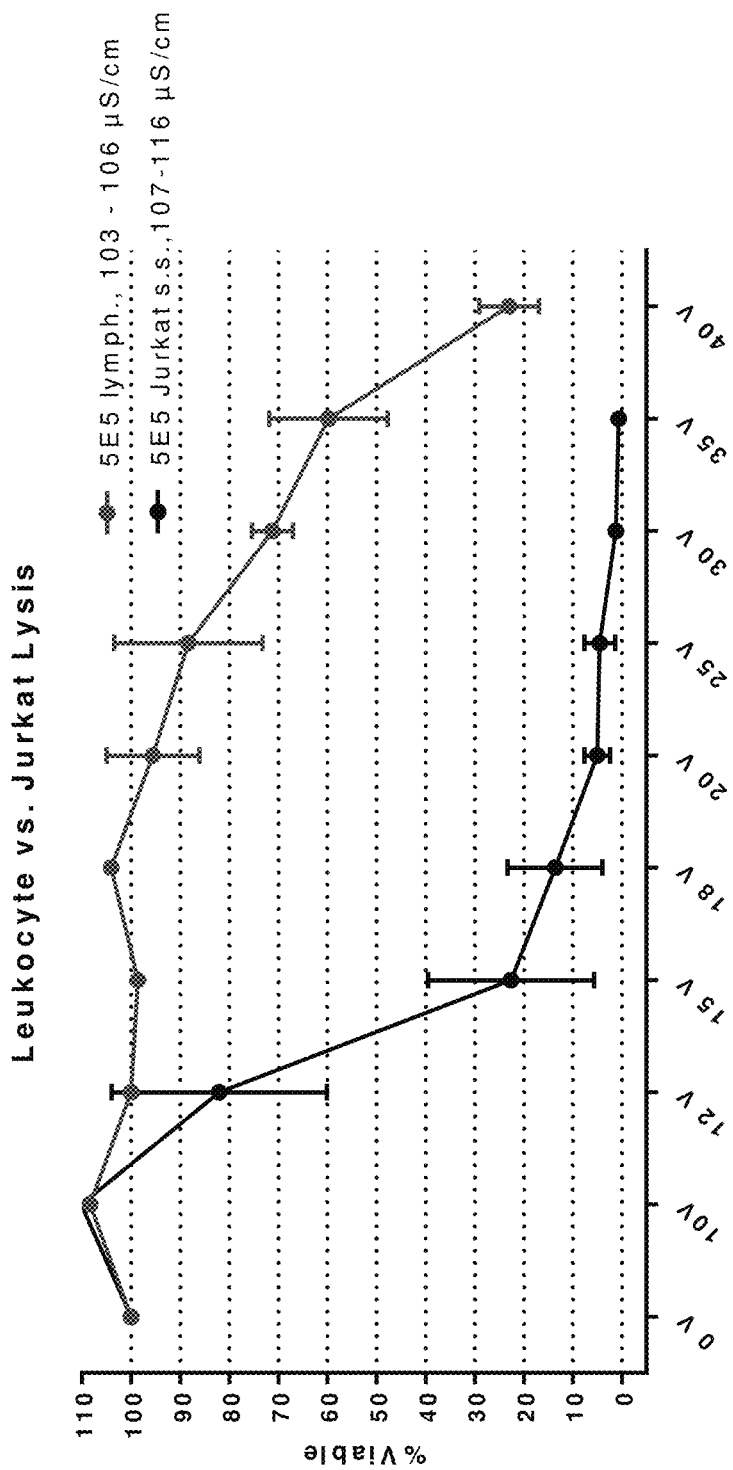

FIG. 5 shows the voltage-dependence of Jurkat T lymphocyte cells and healthy leukocyte lysis. Data points represent the mean of four technical replicates, error bars indicate standard deviation.

Figure 6:
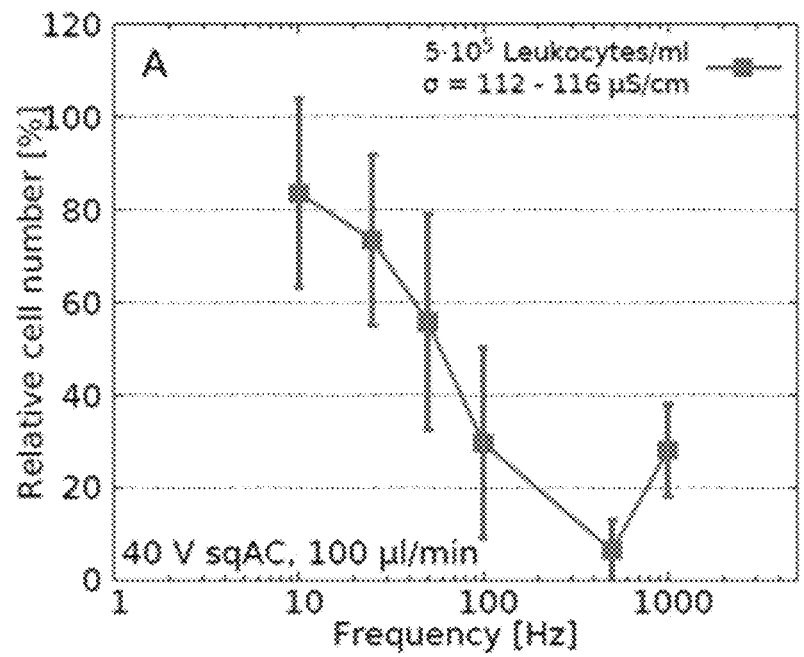
Figure 6:
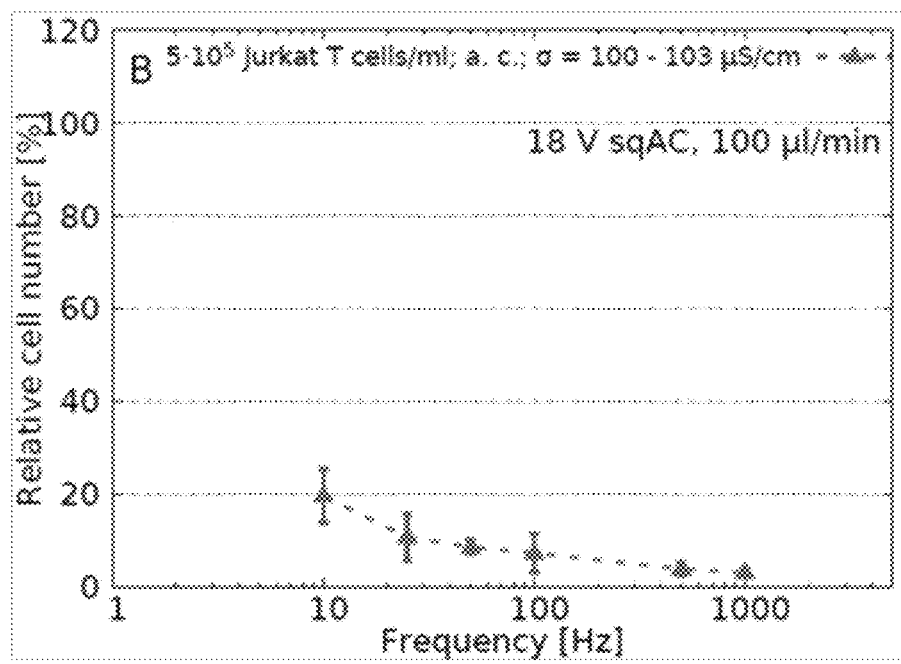

FIG. 6 shows the frequency dependent viability of Leukocytes (image A) and Jurkat T lymphocytes (image B). Conductivity values refer to measurements before and after the experiment. Data points represent the mean of three technical replicates, error bars indicate standard deviation.

Figure 7:
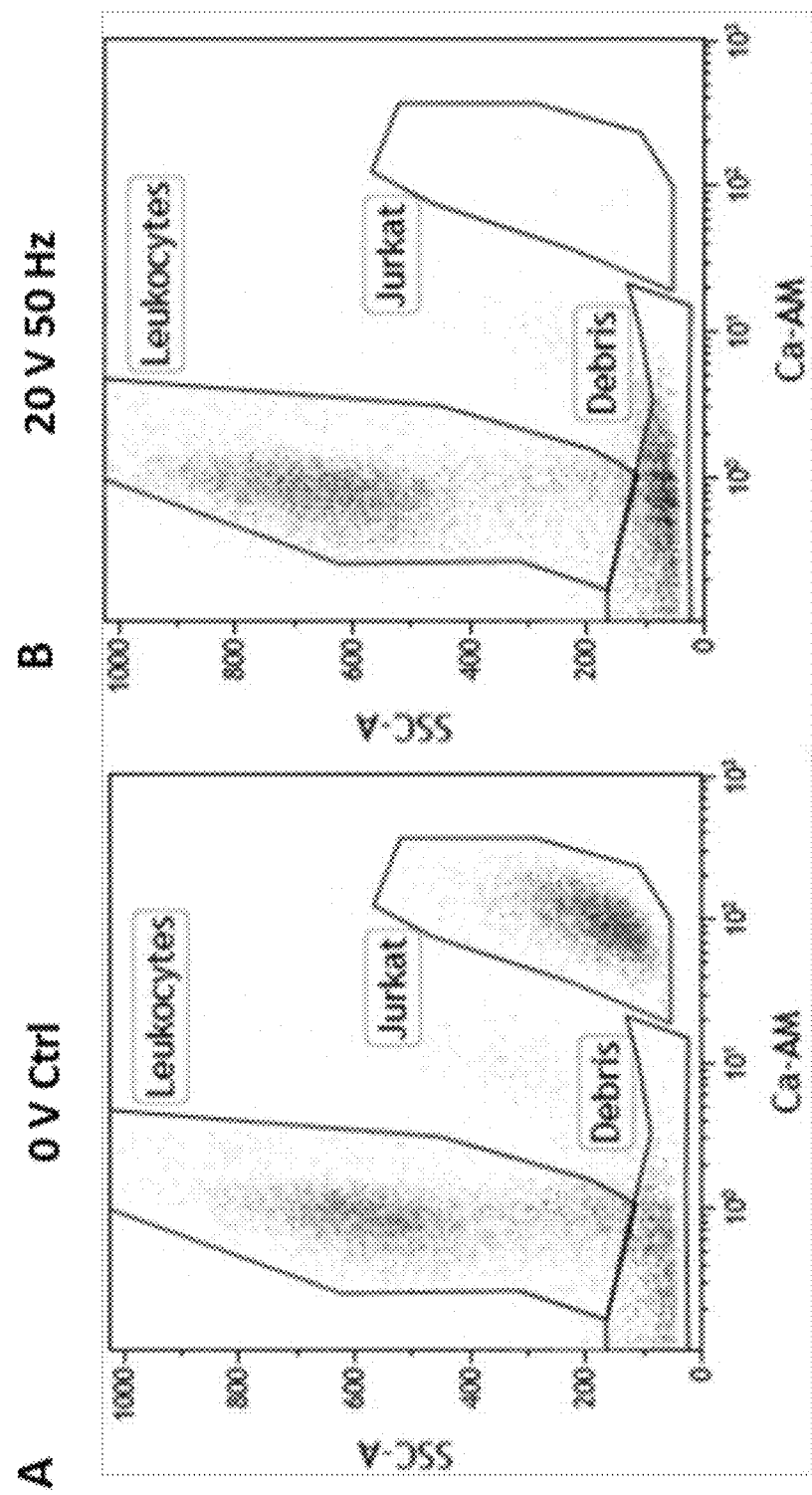
Figure 7:
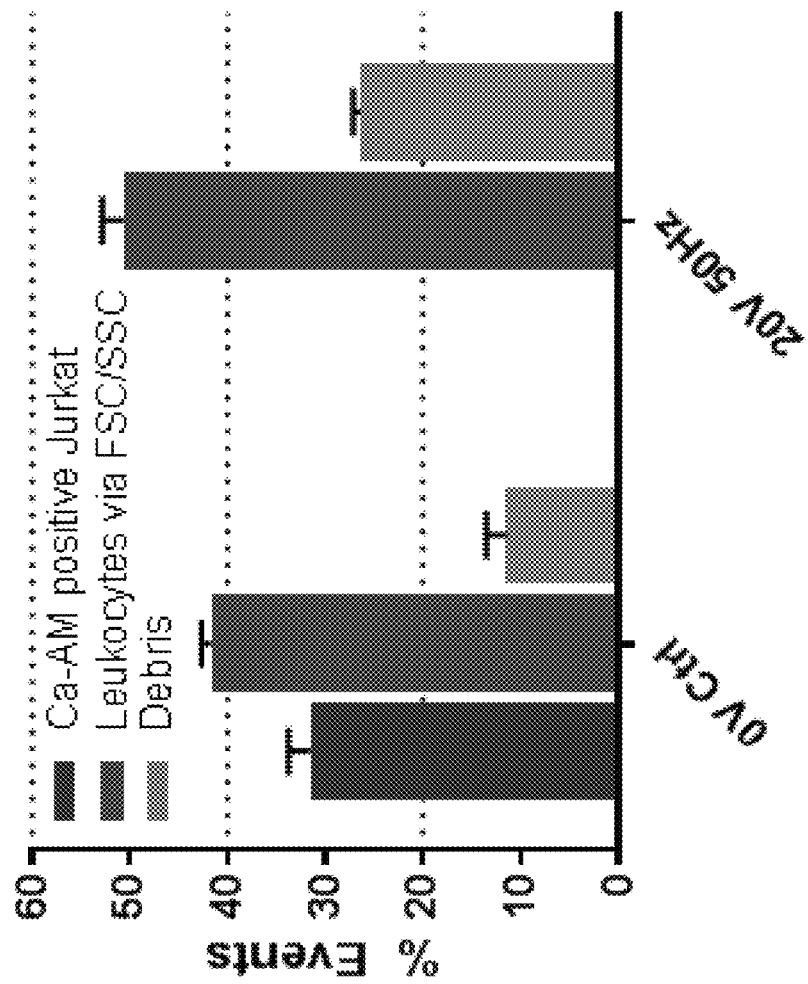

FIG. 7 concerns the selective elimination of Jurkat T lymphocyte population spiked to lymphocyte suspension. Jurkat T lymphocytes were incubated with Calcein-AM prior to data acquisition and have high FITC fluorescence. Image A shows mixed cell population without electric field application. Image B shows the mixed cell population after application of 20 V square wave pulses at 50 Hz. Image C shows the event statistics showing percentage of respective events. Conductivity: 97 μS/cm. Events: 10 000; N=3.

Figure 8:
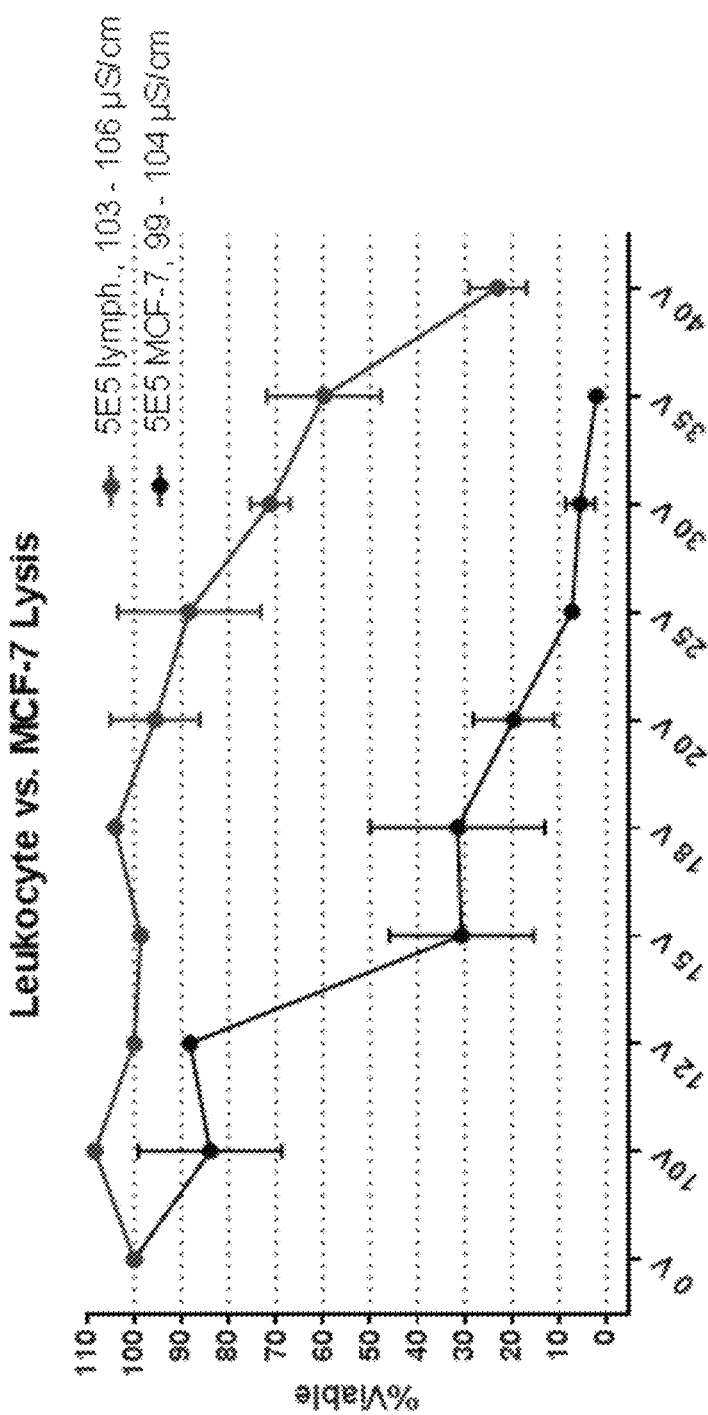

FIG. 8 shows the Voltage-dependent viability of MCF-7 breast cancer cells and healthy leukocyte lysis. Data points represent the mean of four technical replicates, error bars indicate standard deviation.

Figure 9:
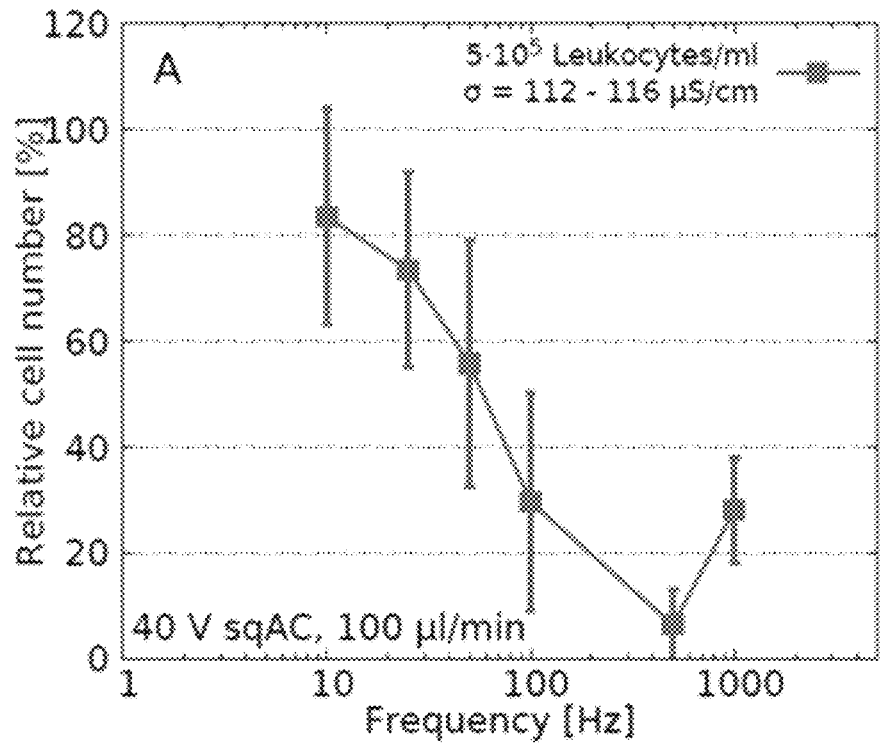
Figure 9:
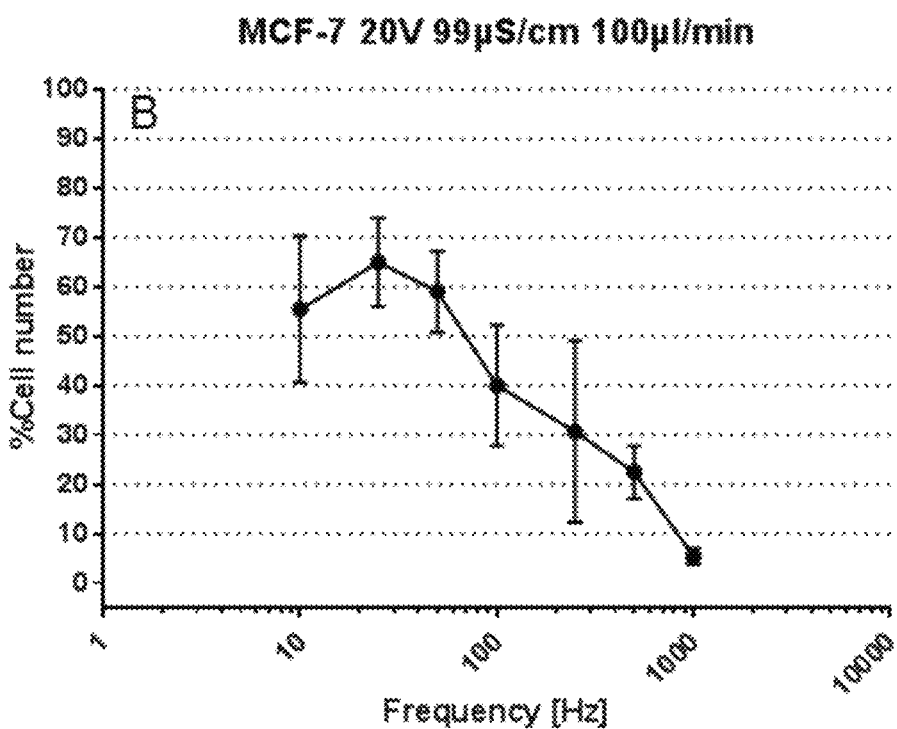

FIG. 9 refers to frequency dependent viability of Leukocytes (image A) and MCF-7 breast cancer cells (image B). Conductivity values refer to measurements before and after the experiment. Data points represent the mean of three technical replicates, error bars indicate standard deviation.

Figure 10:
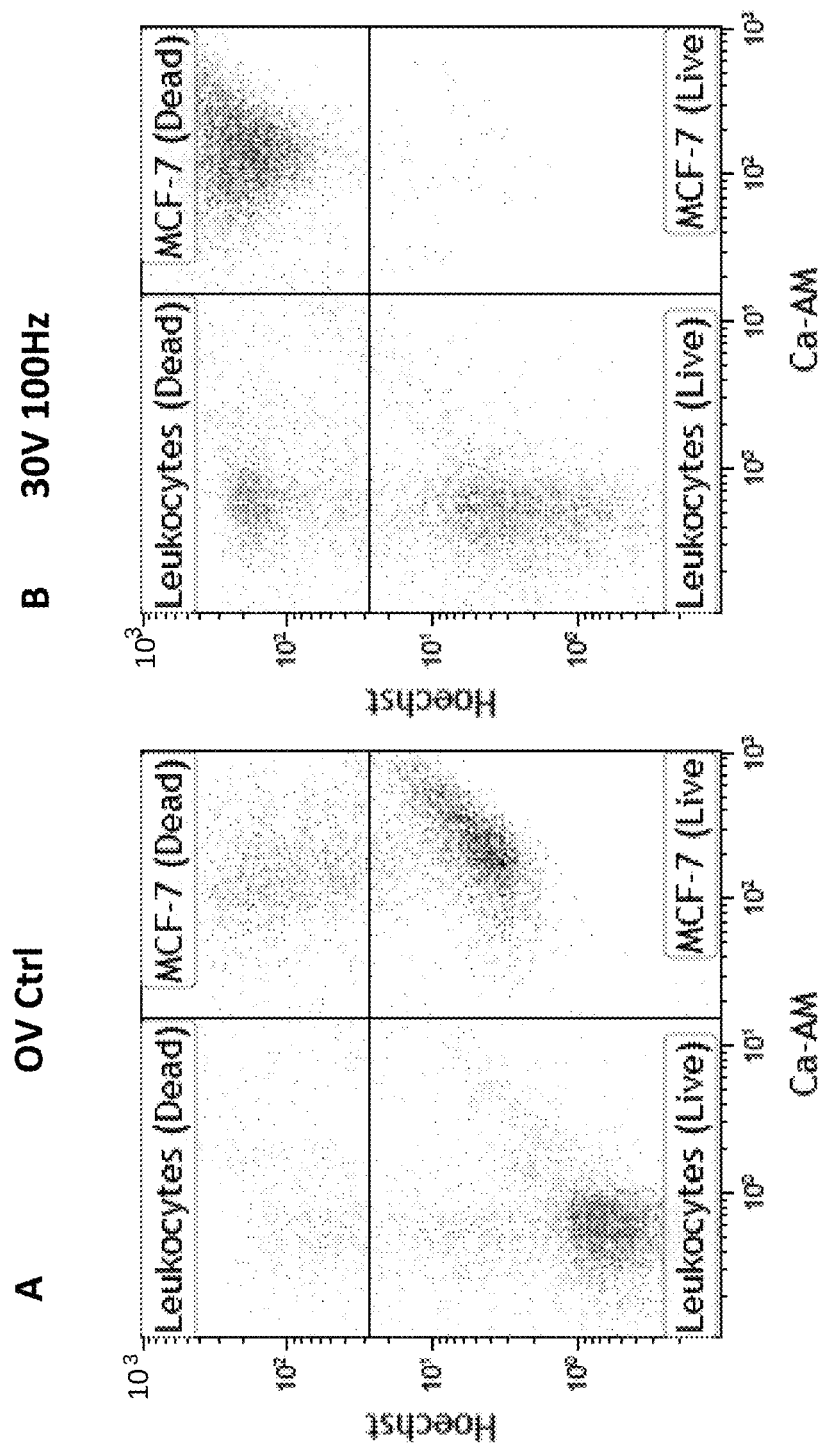
Figure 10:
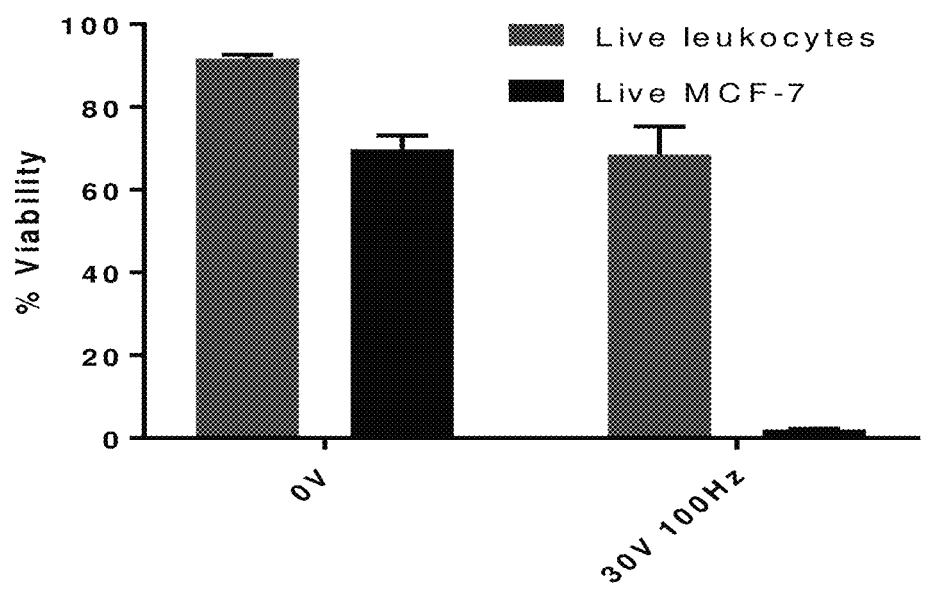
Figure 11A:
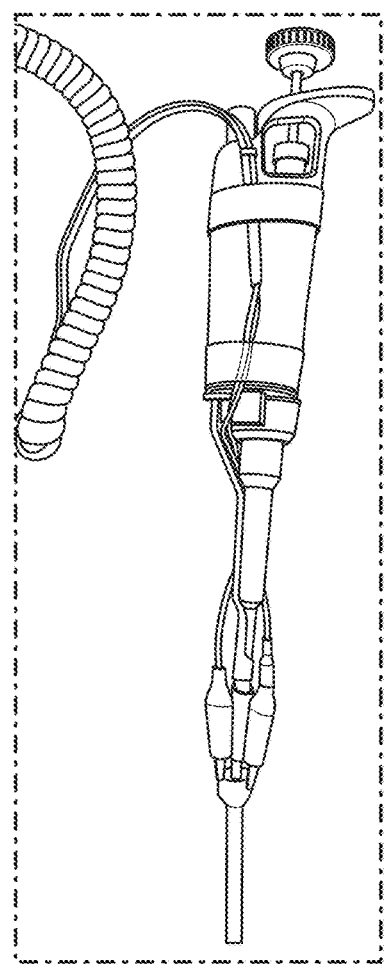
Figure 11B:
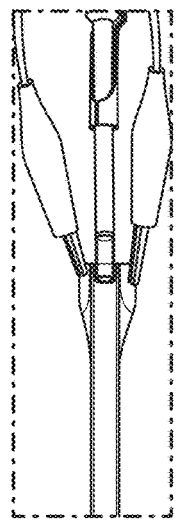
Figure 11C:
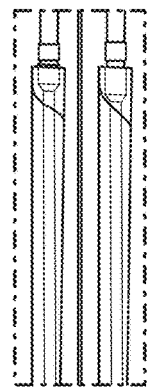
Figure 11D:
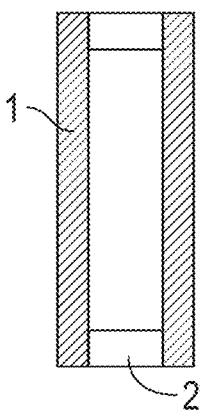
Figure 11E:
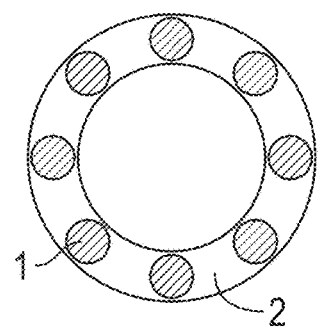

FIG. 10 refers to the selective elimination of FITC-Antibody stained MCF-7 cells spiked to leukocyte suspension. Hoechst 33342 viability stain was added prior to flow cytometry data acquisition. Image A shows mixed cell population without electrical field. Image B shows mixed cell suspension after application of 30 V at 100 Hz. Image C concerns statistics on viability after field application. Conductivity: 100-103 μS/cm. Events: 10 000. N=2.

FIG. 11 shows the inventive device. Image A shows a multifunctional pipette as inventive device with attached pipette tip comprising electrodes. Image B shows a pipette tip connected to a 20 μl pipette with electrical circuit connection. Image C shows a transparent version of the pipette tip showing microfluidic properties. Image D gives a cross sectional view of the chamber. Image D gives a cross sectional view of the chamber in an alternative embodiment, wherein 8 electrodes are located in the chamber's circumferential surface.

Figure 12:
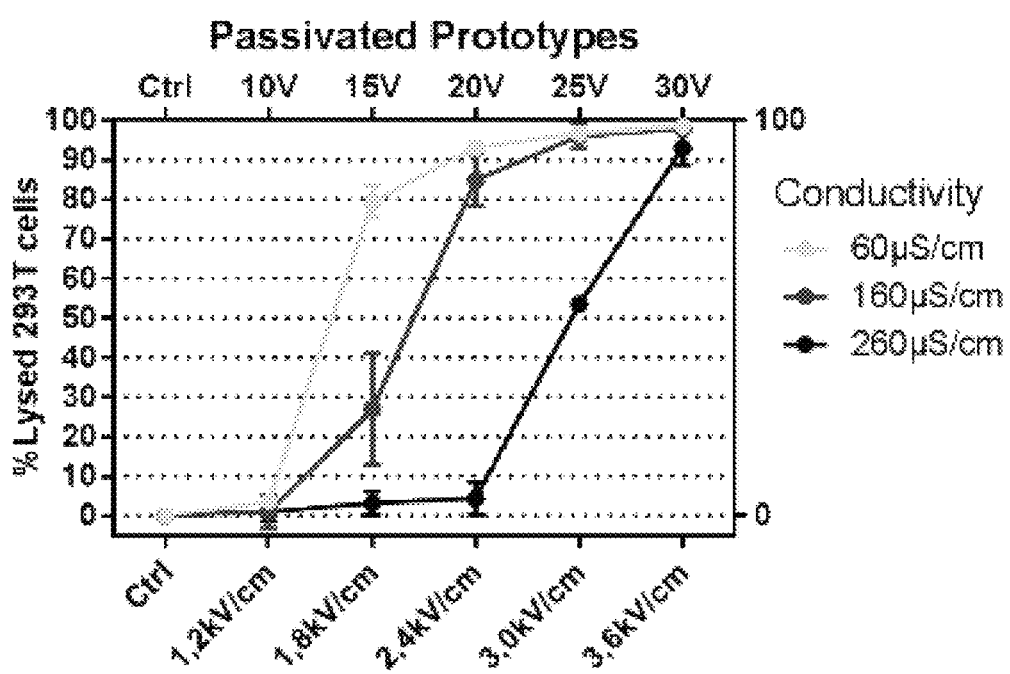
Figure 12:
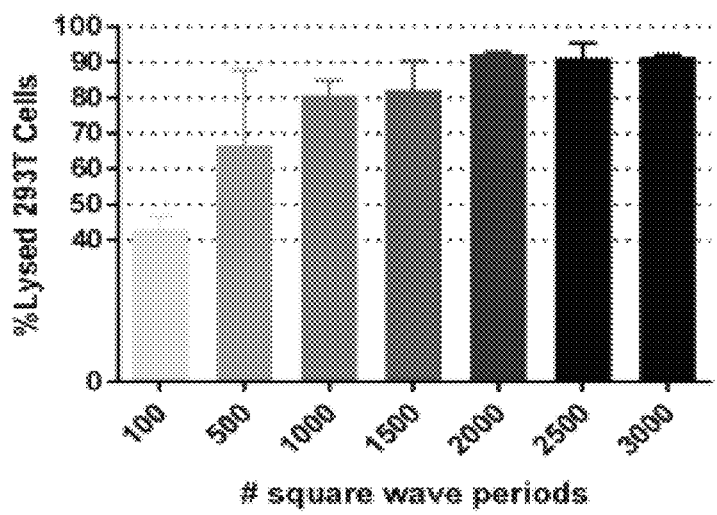
Figure 12:
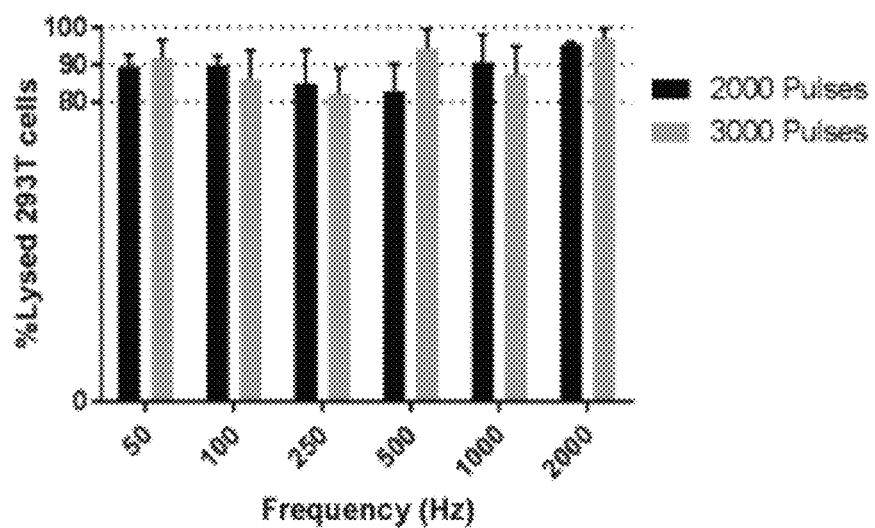
Figure 12:
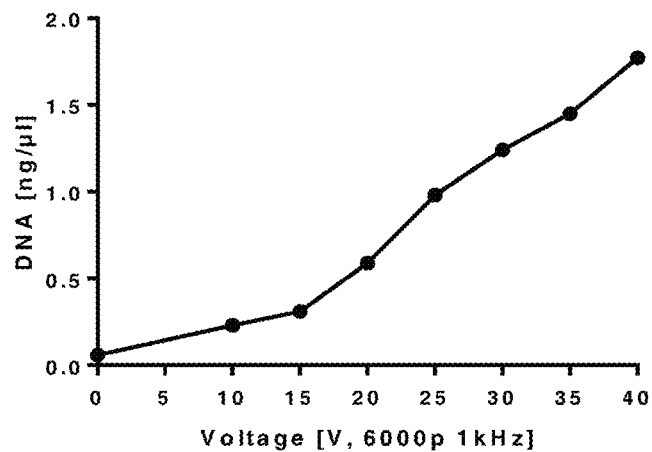
Figure 12:
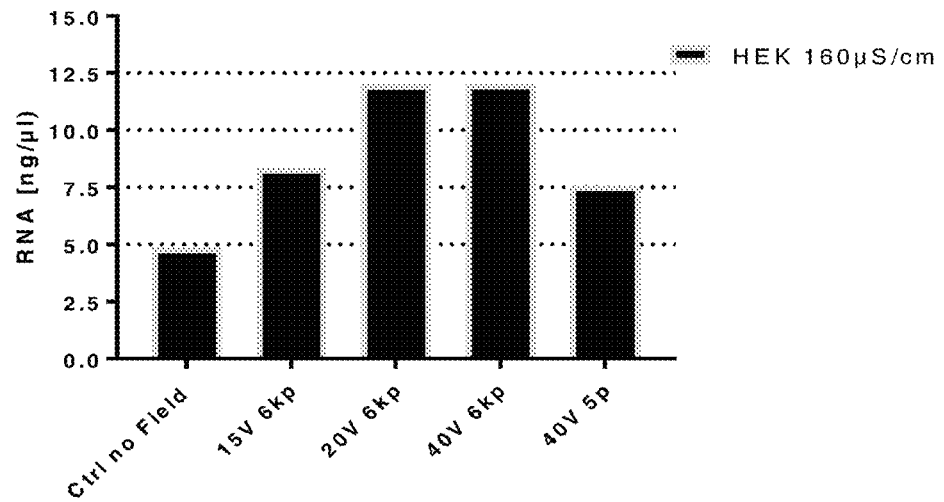

FIG. 12: Image A shows the lysis efficiencies for 293T cells using coated electrodes and buffers with different conductivities (60, 160 and 260 μS/cm). Cells were exposed to 6 seconds of AC square wave pulses at a frequency of 1 kHz (n=3). Image b shows the lysis efficiency of different pulse numbers at 1 kHz. Image C shows the frequency dependency at equal pulse numbers. In the images A to D the wave form refers to full square waves. Conductivities range between 160-170 μS/cm. n=3. Image D refers to measurement of cell-free DNA after lysis of HEK cells in a pipette tip. Image E refers to the measurement of cell-free RNA after lysis of HEK cells in the pipette tip.

Figure 13:
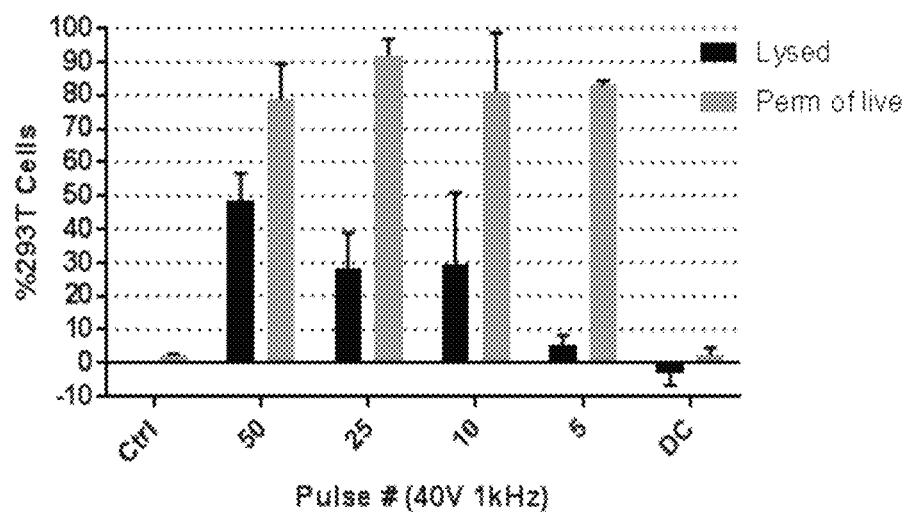
Figure 13:
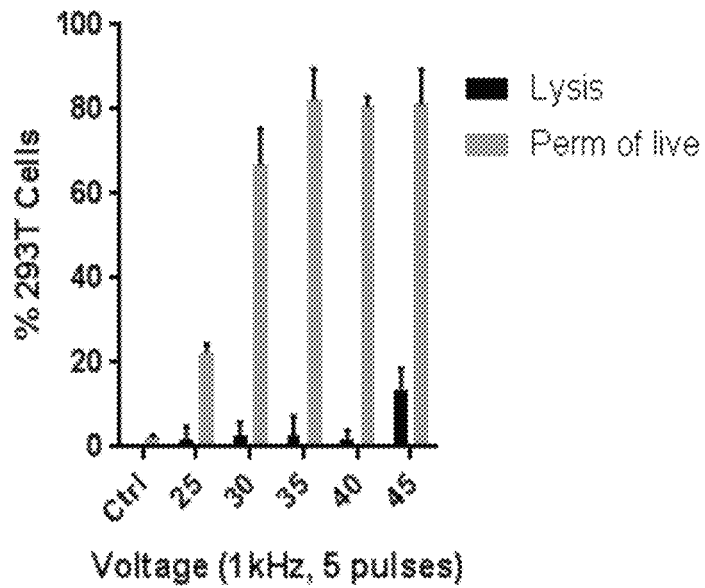
Figure 13:
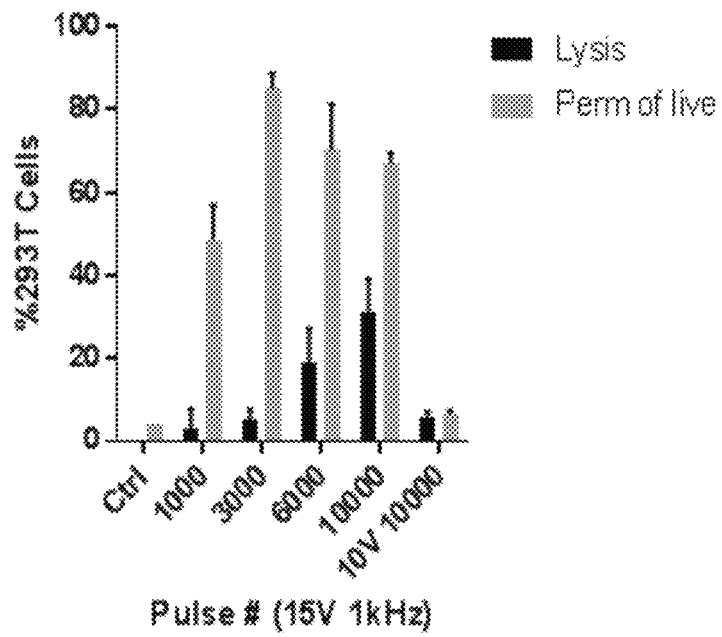
Figure 13:
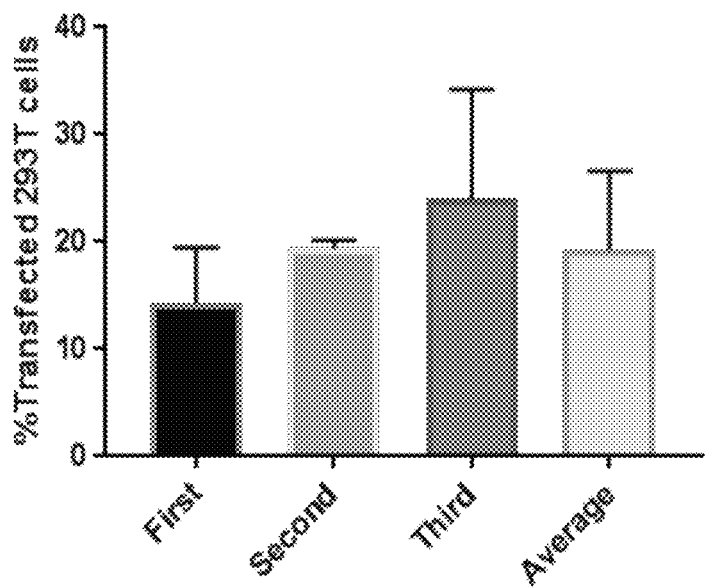

FIG. 13 refers to 293T cell lysis and permeabilization after exposure to an electrical field. Image A shows 293T cell lysis and permeabilization after exposure to decreasing pulse number of 40 V square waves, Image B shows 5 square wave pulses of increasing voltage. Image C shows an increasing number of 15V square wave pulses. (D) Technical replicates of 293T transfection with pTurboRFP plasmid upon exposure to 10 exponential decay pulses of 40V at 50 Hz and 1000 exponential decay transfer pulses of 15 V at 50 Hz. Bars show percentage of cells expressing RFP 48 hours after treatment as detected by fluorescence microscopy.

Figure 14:
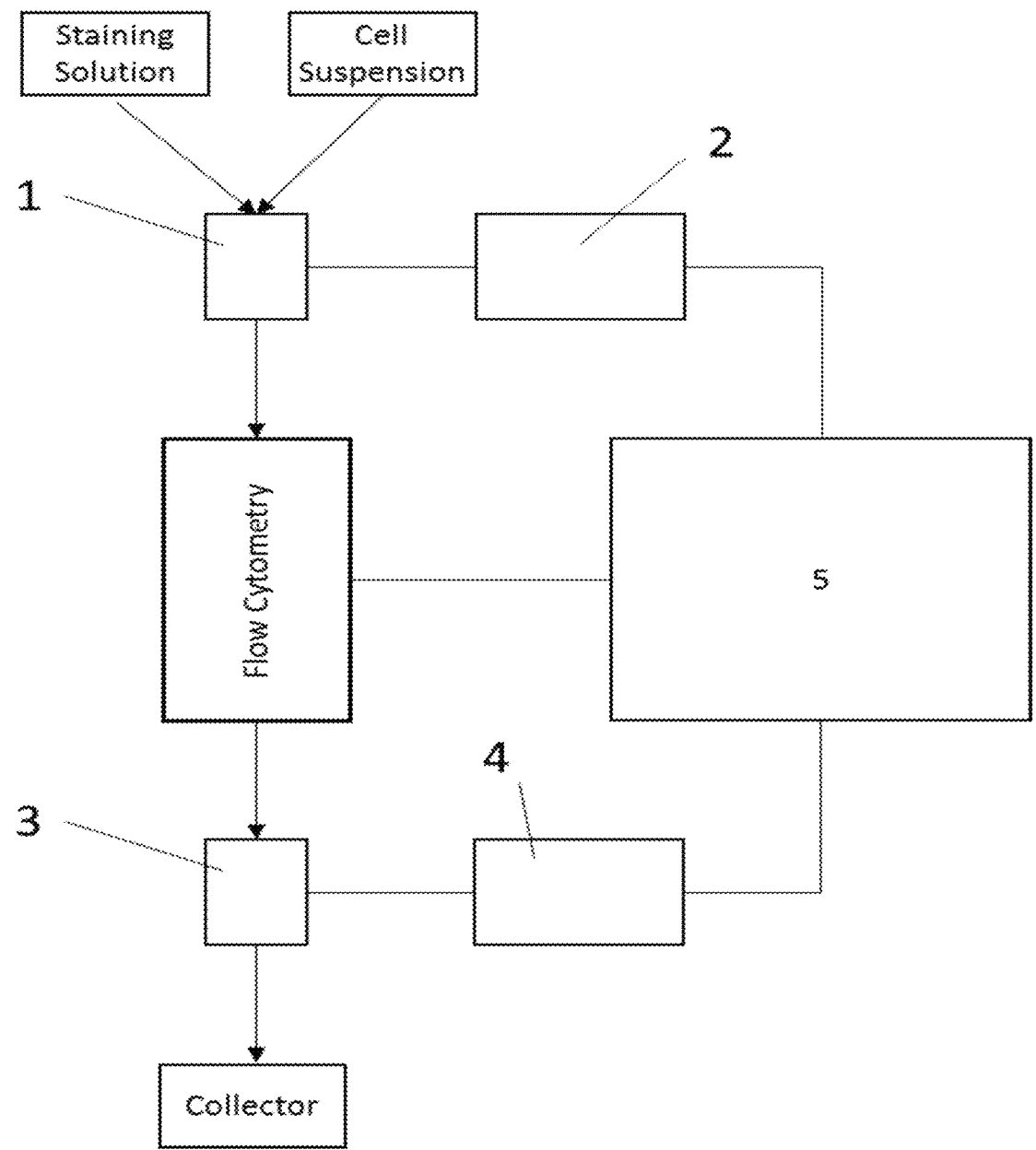

FIG. 14 shows a flow cytometry application in connection with the inventive method and device for specific electroporation and/or lysis.

Figure 15:
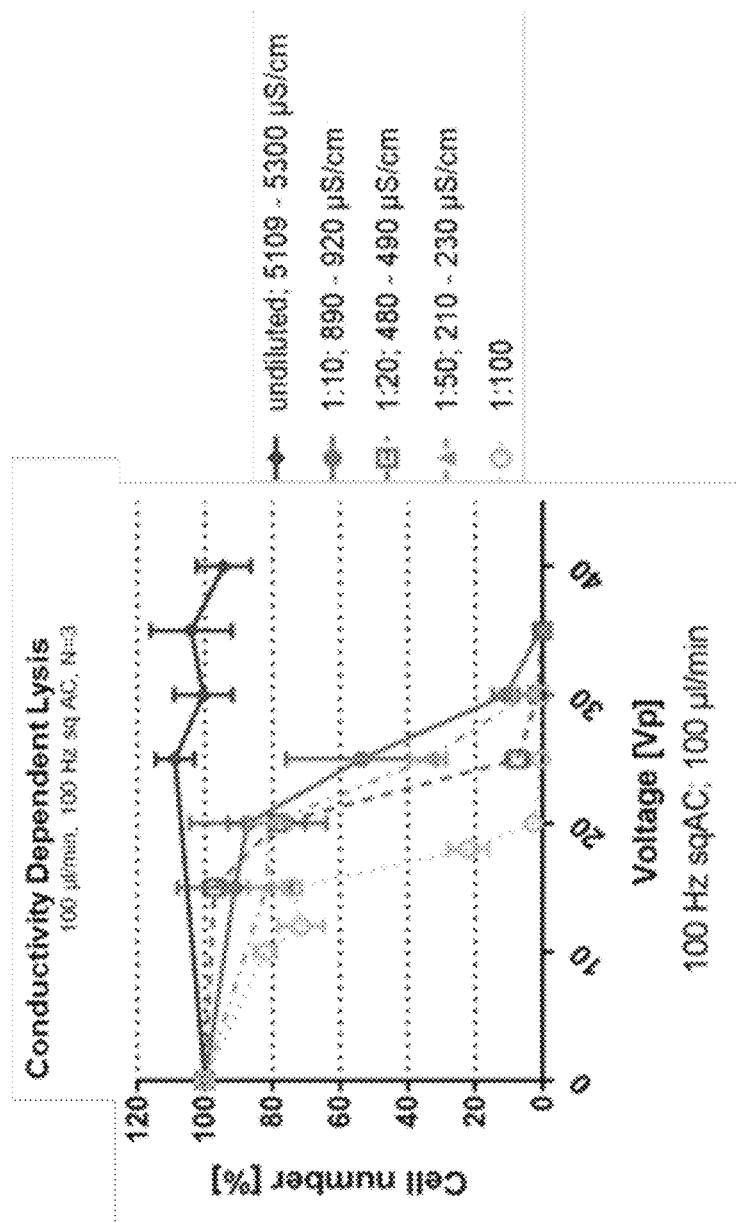
Figure 16A:
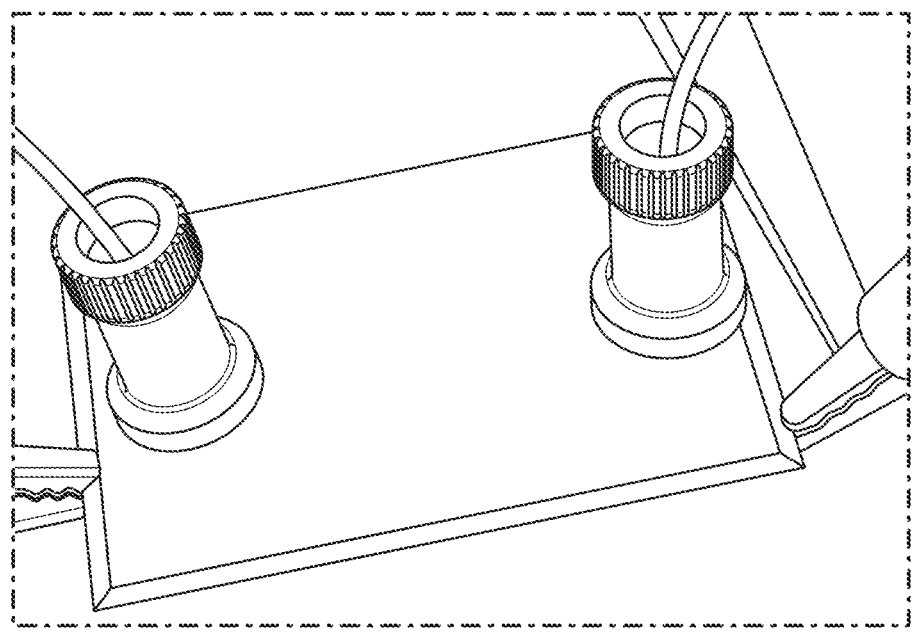
Figure 16B:
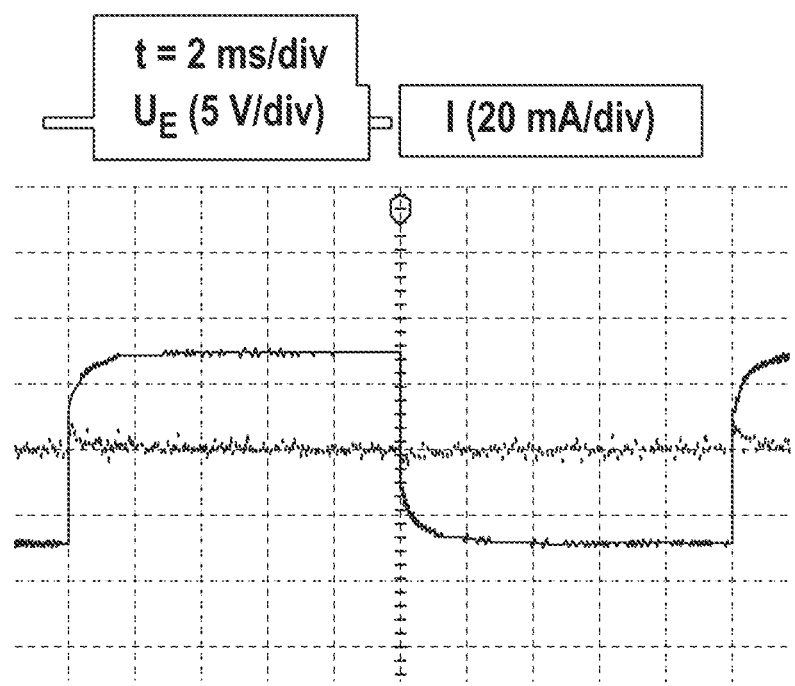
Figure 16C:
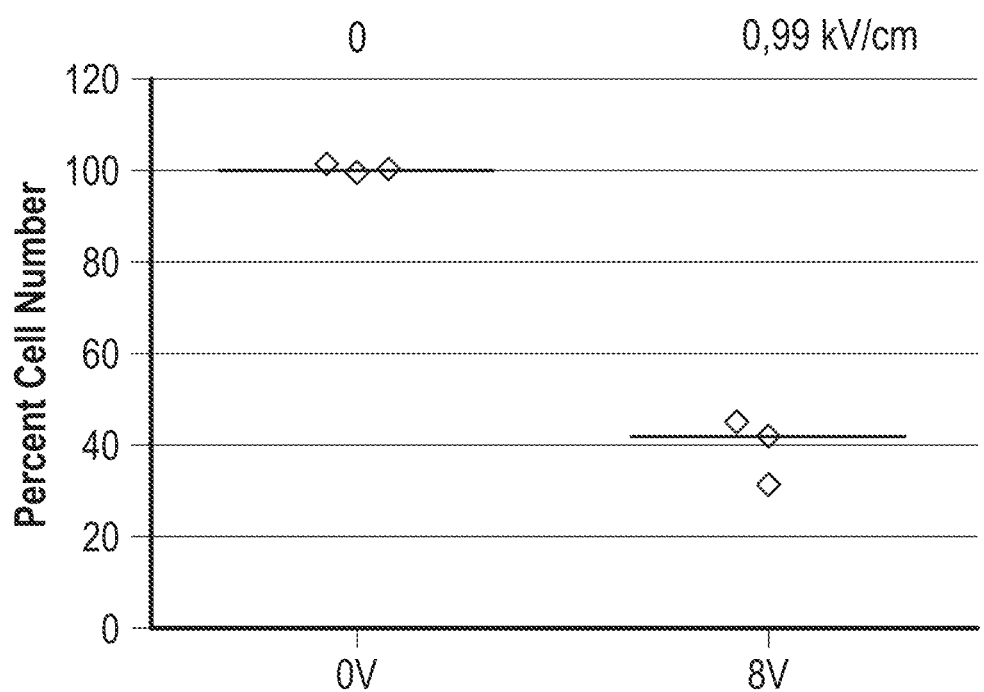

FIG. 15 shows conductivity dependent whole blood lysis in a lab-scale flow-through prototype. Data points represent the mean of three technical replicates, error bars indicate standard deviation FIG. 16 shows: (a) Lab-scale flow-through prototype comprising anodic oxidized titanium electrodes. (b) I/V plot during application of 8 V 50 Hz square wave. (c) Lysis efficiency of whole blood cells when applying 8 V, 50 Hz square wave with 100 μl/min to a 1:100 whole blood dilution.

Figure 17:
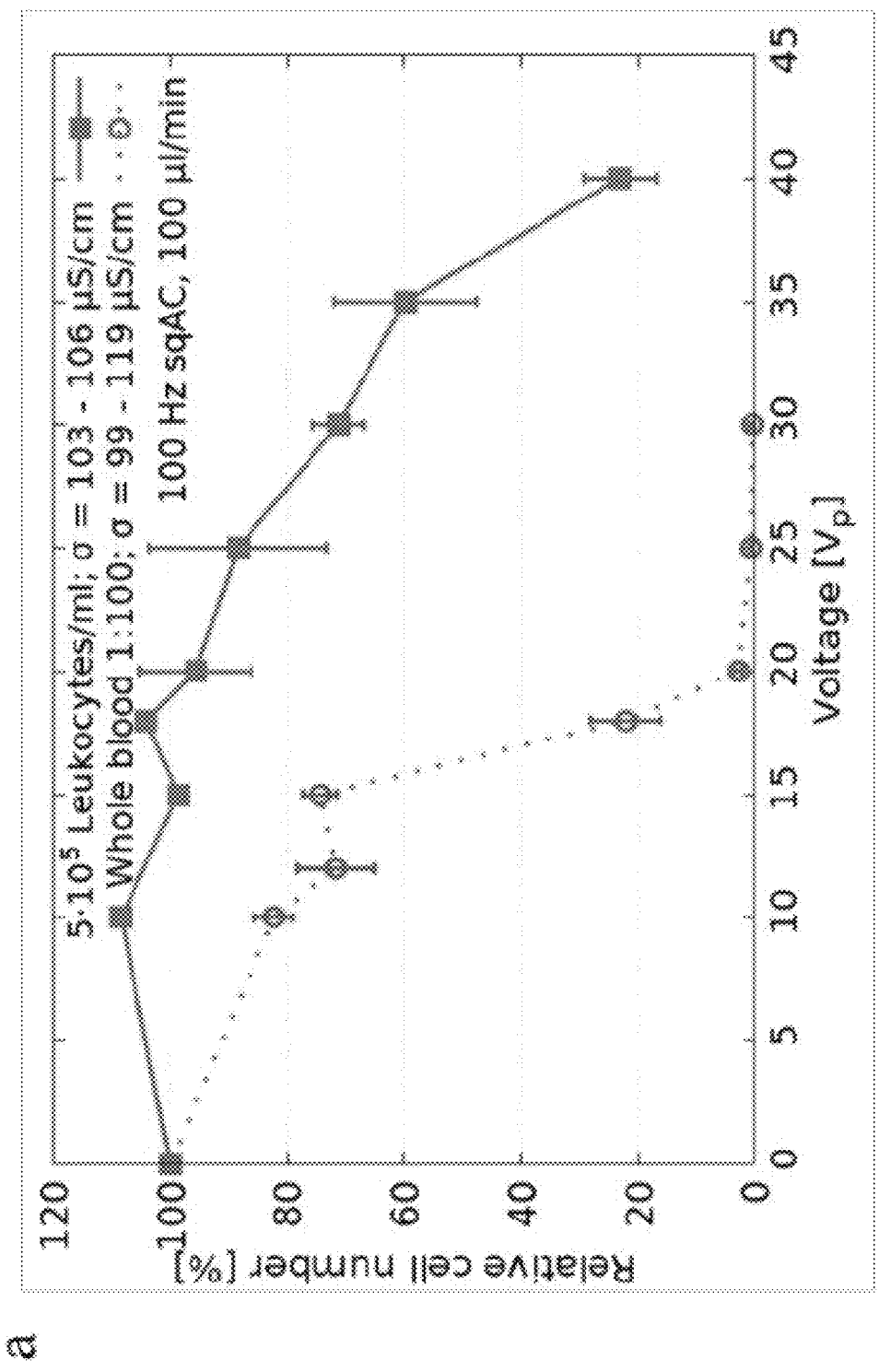
Figure 17:
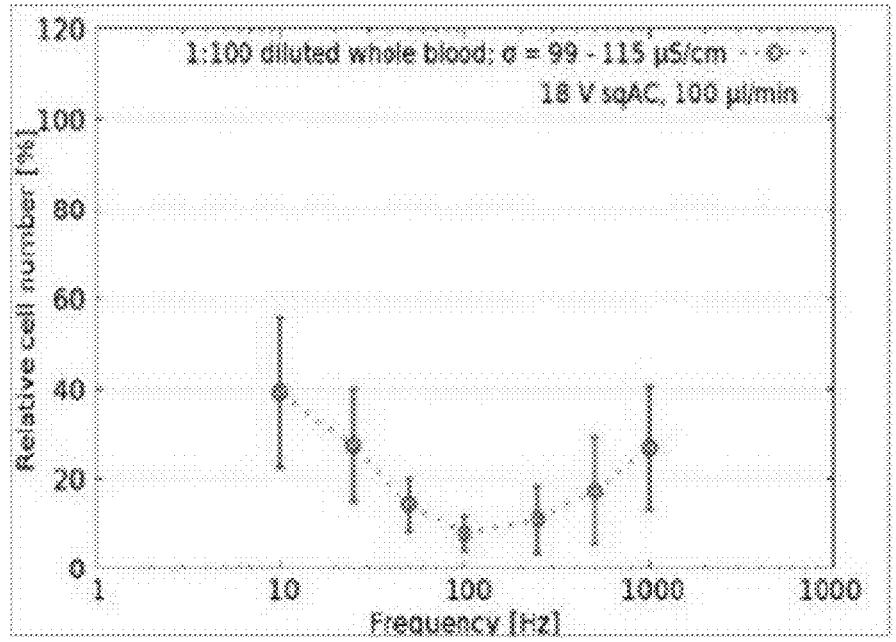
Figure 17:
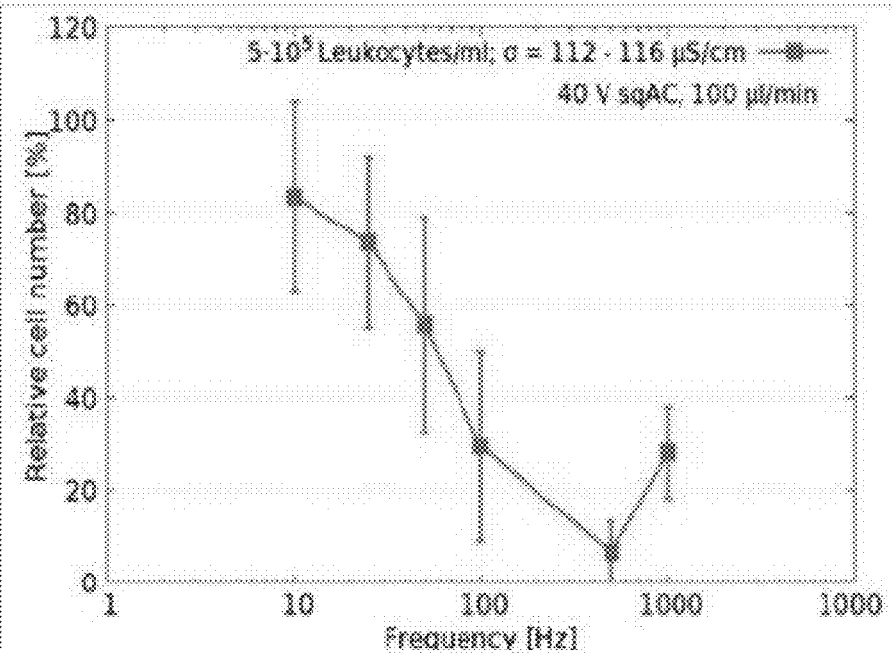

FIG. 17 shows: (a) Comparison of lysis curves of diluted whole blood and leukocyte suspensions shows different behavior in the electric field. Frequency-dependence of whole blood cells (mainly erythrocytes) at 18 V (b) and leukocyte lysis at 40 V (c). Data points represent the mean of three technical replicates, error bars indicate standard deviation. σ is the suspension conductivity.

Figure 18:
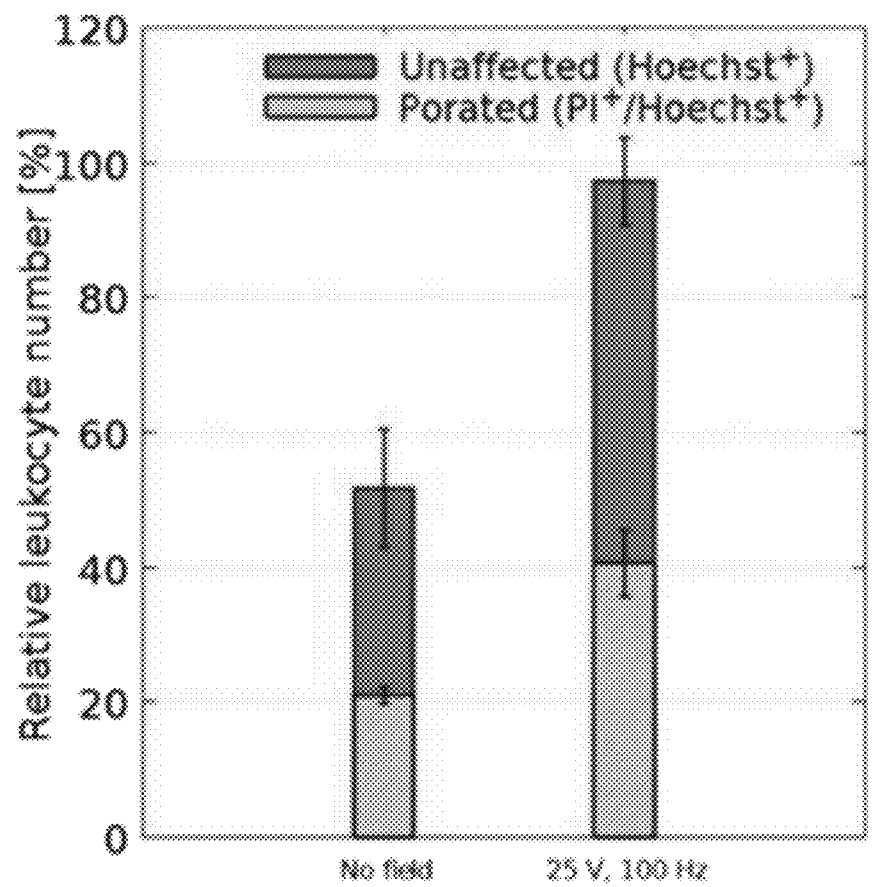

FIG. 18 shows the Enrichment of leukocytes (Hoechst+) in a leukocyte-spiked whole blood dilution. Porated cells (PI+/Hoechst+) represent cells which lost membrane integrity. Data points represent the mean of three technical replicates, error bars indicate standard deviation.

Figure 19:
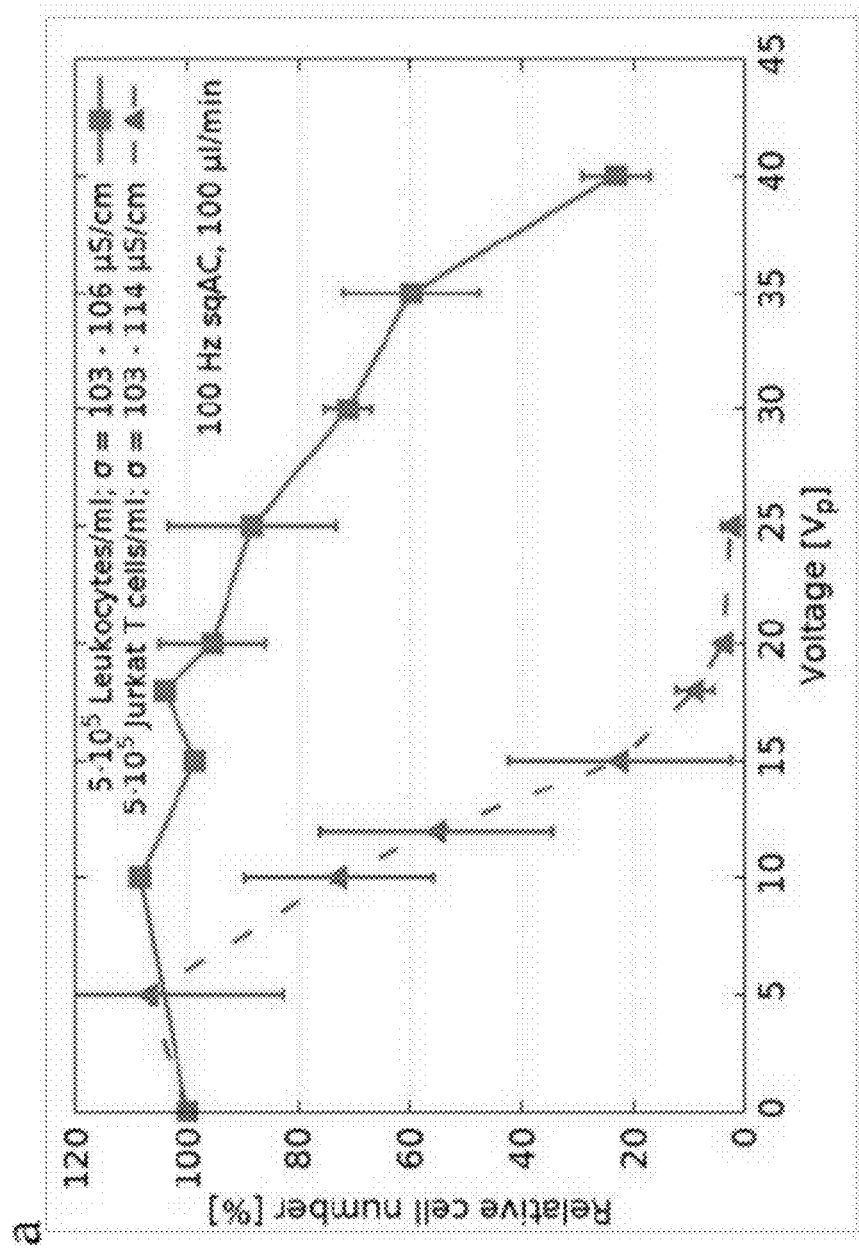
Figure 19:
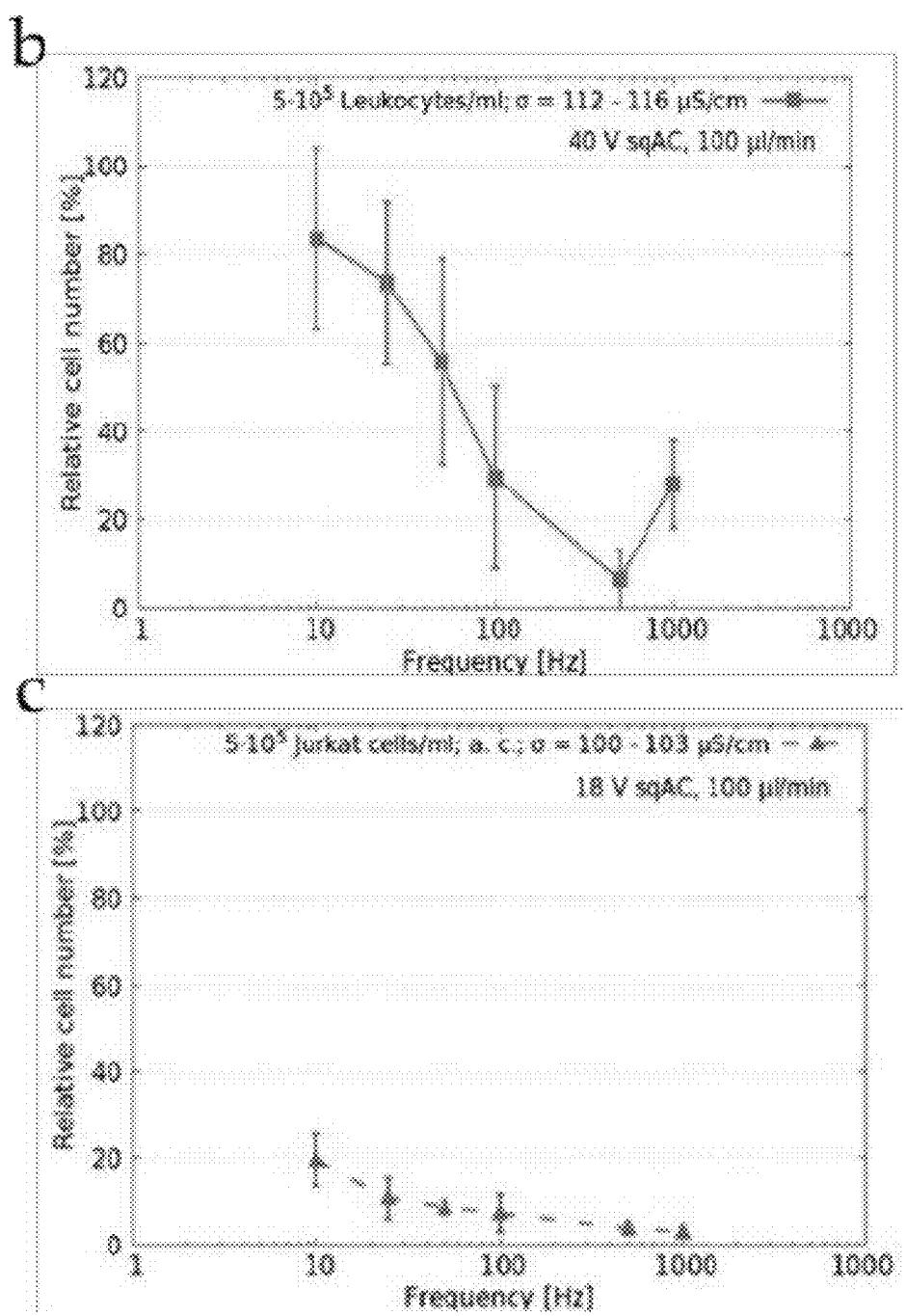

FIG. 19 shows: (a) Comparison of lysis curves of leukocyte cell suspensions and Jurkat T cell suspensions shows different behavior in the electric field. Frequency-dependent lysis of leukocytes at 40 V (b) and Jurkat cells at 18 V (c). Data points represent the mean of three technical replicates, error bars indicate standard deviation. σ is the suspension conductivity.

Figure 20:
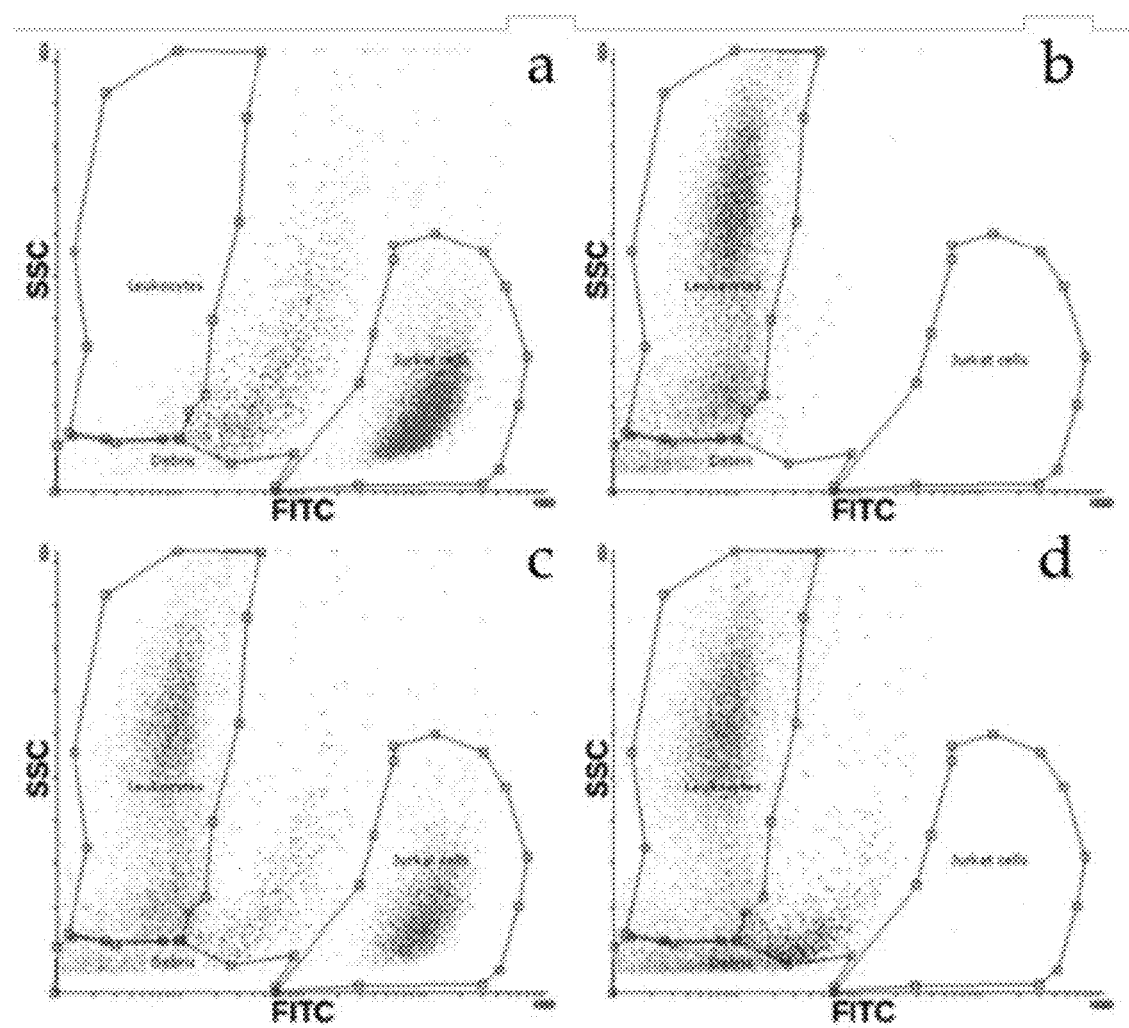
Figure 20:
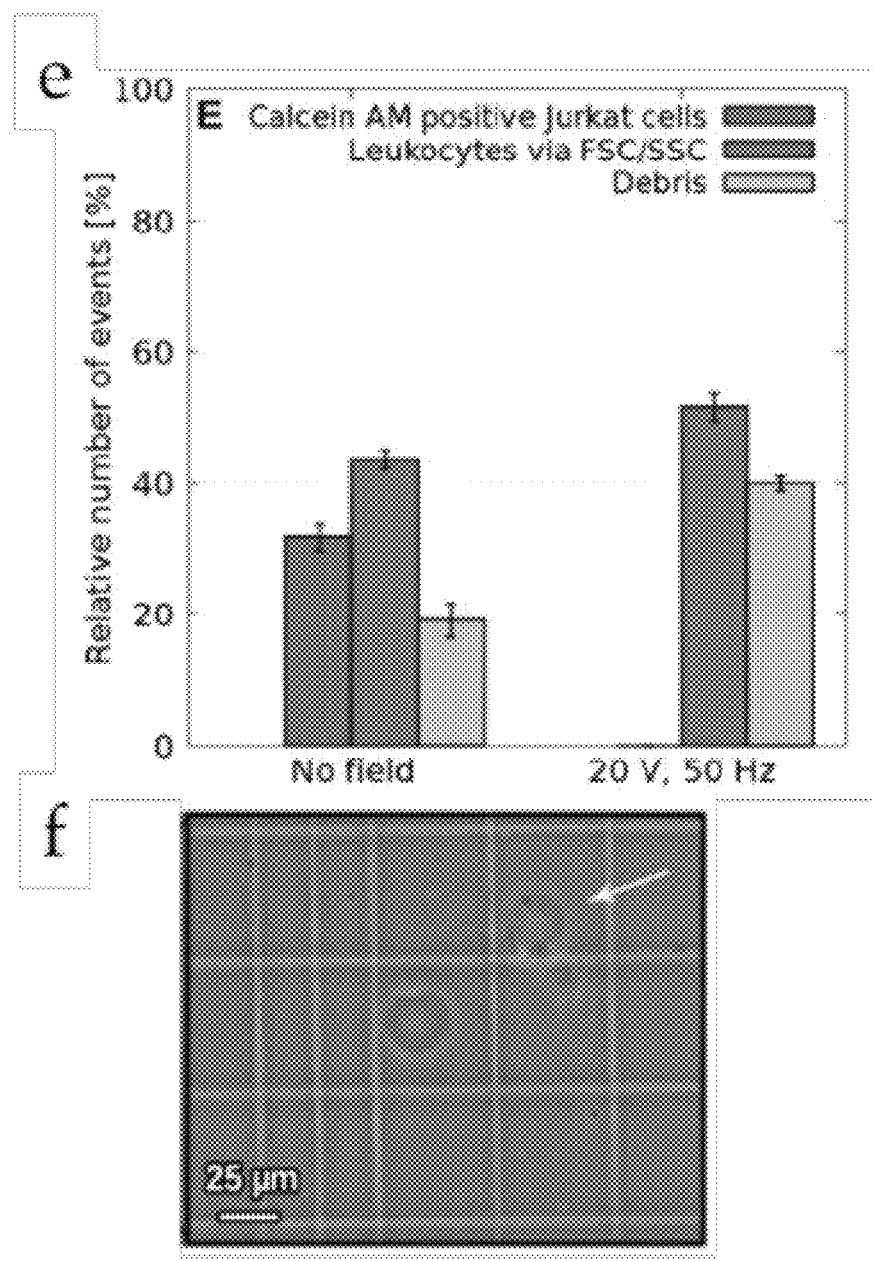

FIG. 20 shows:(a-d) Flow cytometry data from 10,000 events show removal of the distinct Jurkat T lymphocyte population after application of an electric field (20 V, 50 Hz, sqAC). (a) Jurkat T lymphocyte suspension with Calcein-AM-stained Jurkat T lymphocytes shown in blue. (b) Unstained leukocyte suspension with leukocytes shown in magenta. (c) Jurkat-spiked leukocyte suspension without application of an electric field. (d) Jurkat-spiked leukocyte suspension after application of the electric field. SSC: side scatter, FITC-A: Fluorescein isothiocyanate, fluorescent signal. (e) Specific lysis of Calcein-AM-stained Jurkat T lymphocytes in a Jurkat-spiked leukocyte suspension. Data points represent the mean of three technical replicates, error bars indicate standard deviation. σ is the suspension conductivity. (f) Section of a phase contrast microscopy image showing Jurkat T lymphocyte ghosts.

Figure 21:
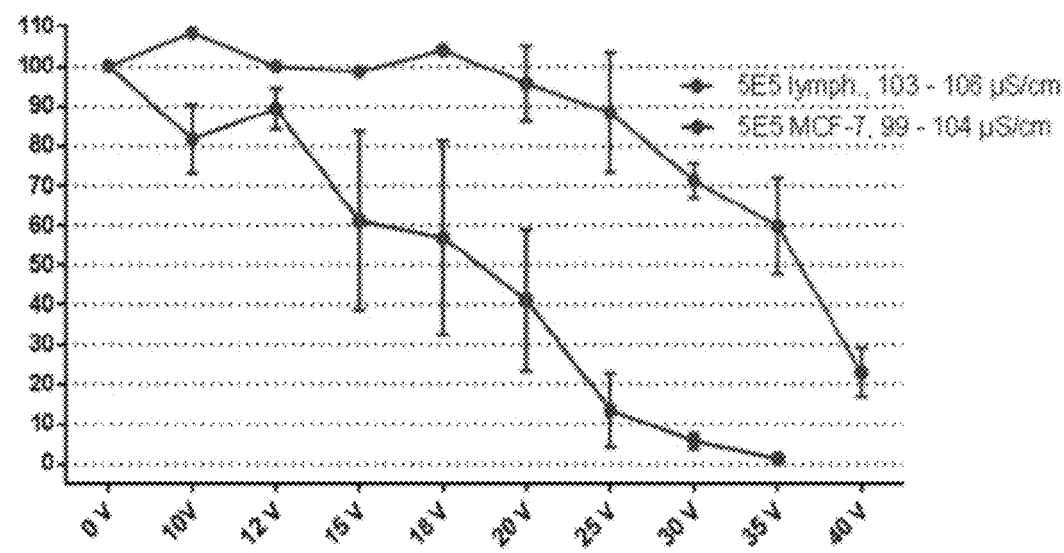
Figure 21:
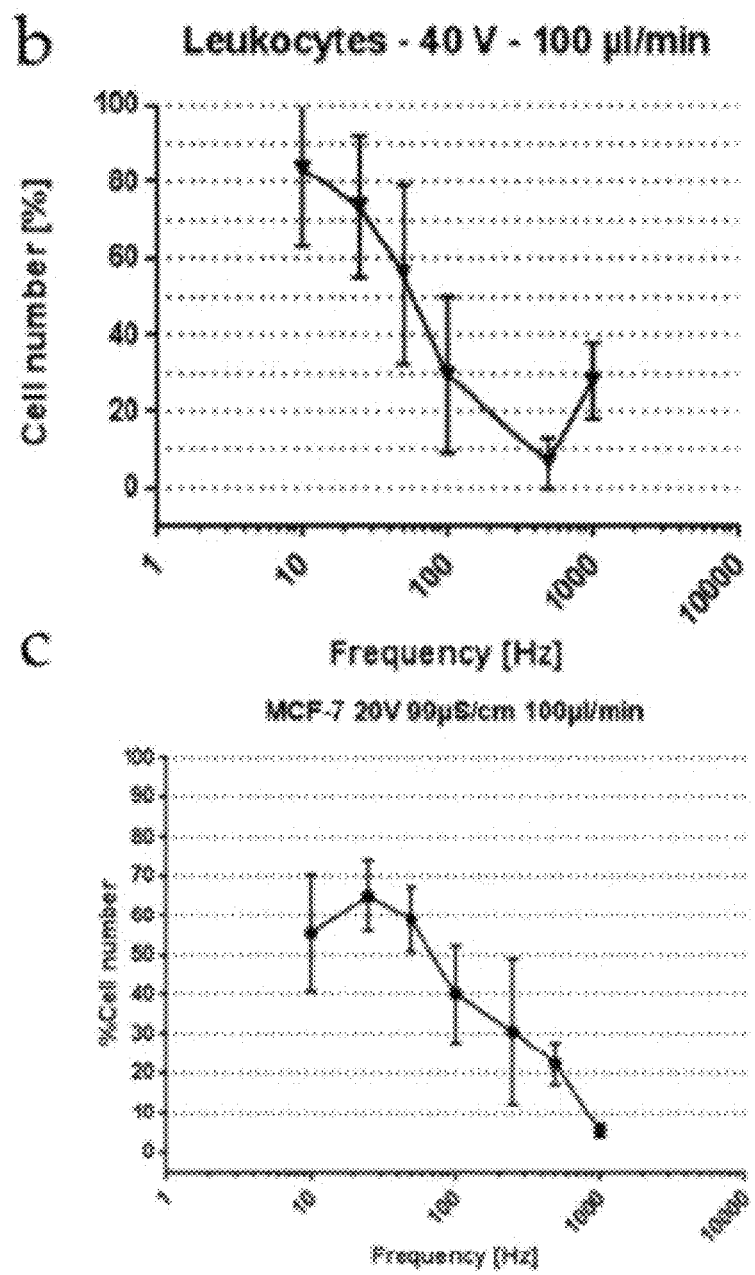

FIG. 21 shows: Comparison of lysis curves of leukocyte cell suspensions and MCF-7 cell suspensions dependent on electric field strength. Frequency-dependent lysis of leukocytes at 40 V (b) and MCF-7 cells at 20 V (c). Data points represent the mean of three technical replicates, error bars indicate standard deviation.

Figure 22:
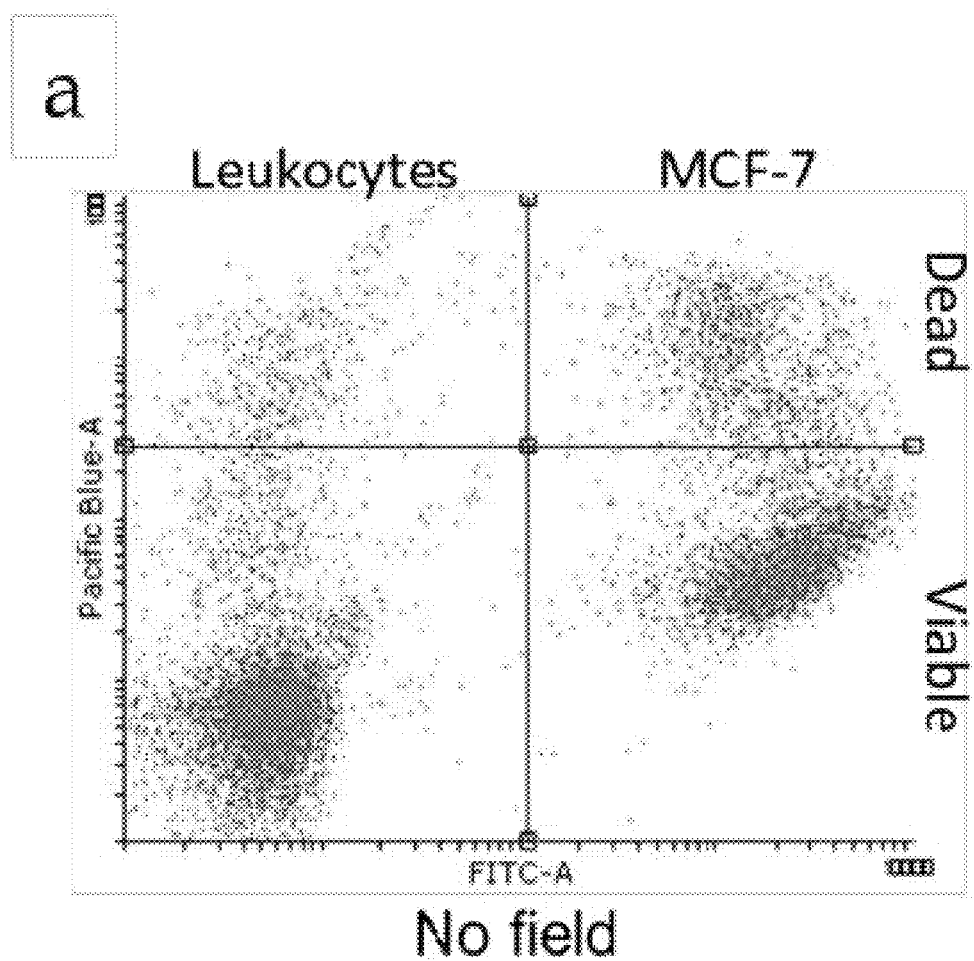
Figure 22:
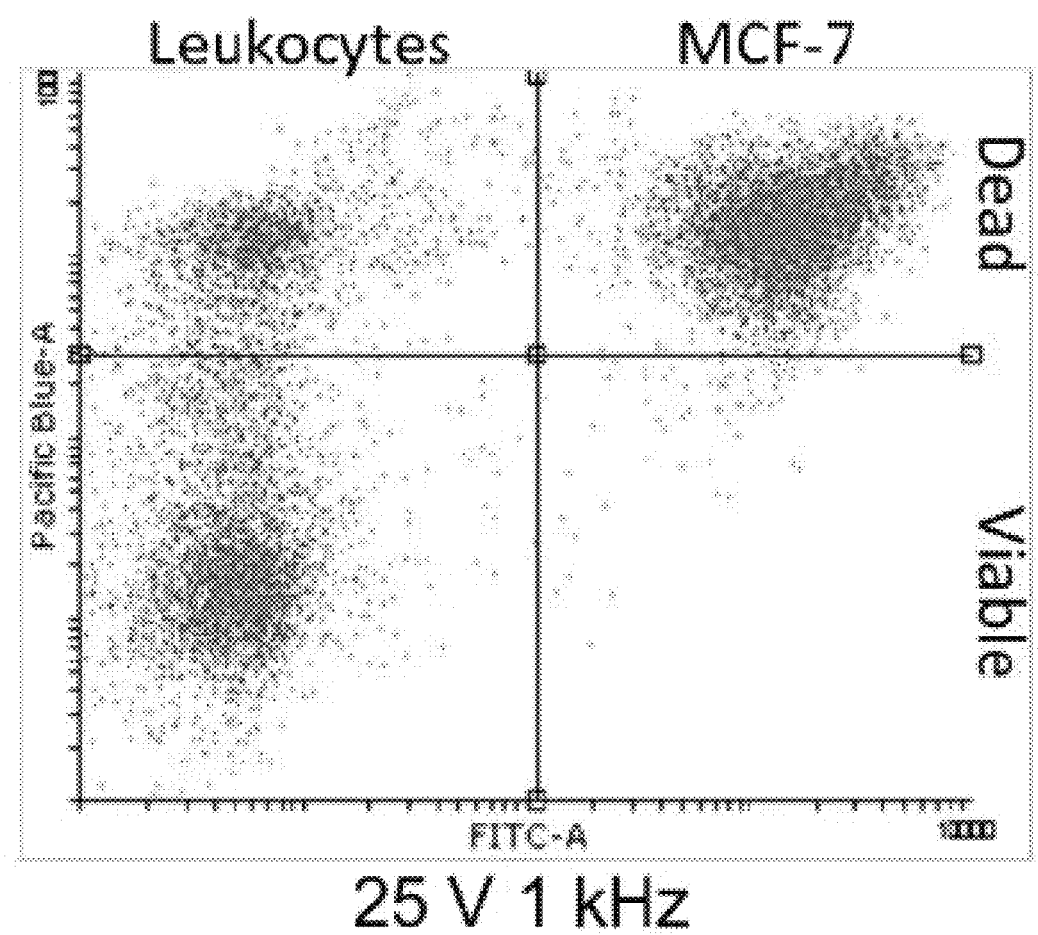
Figure 22:
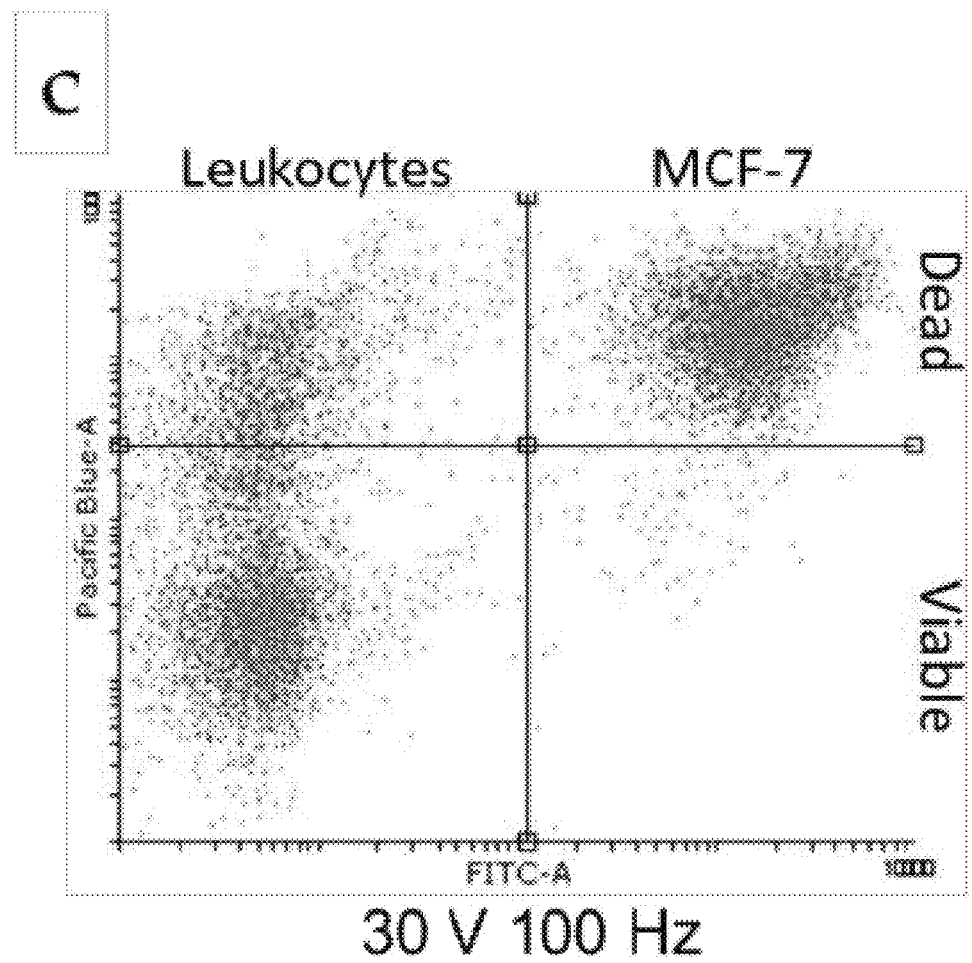
Figure 22:
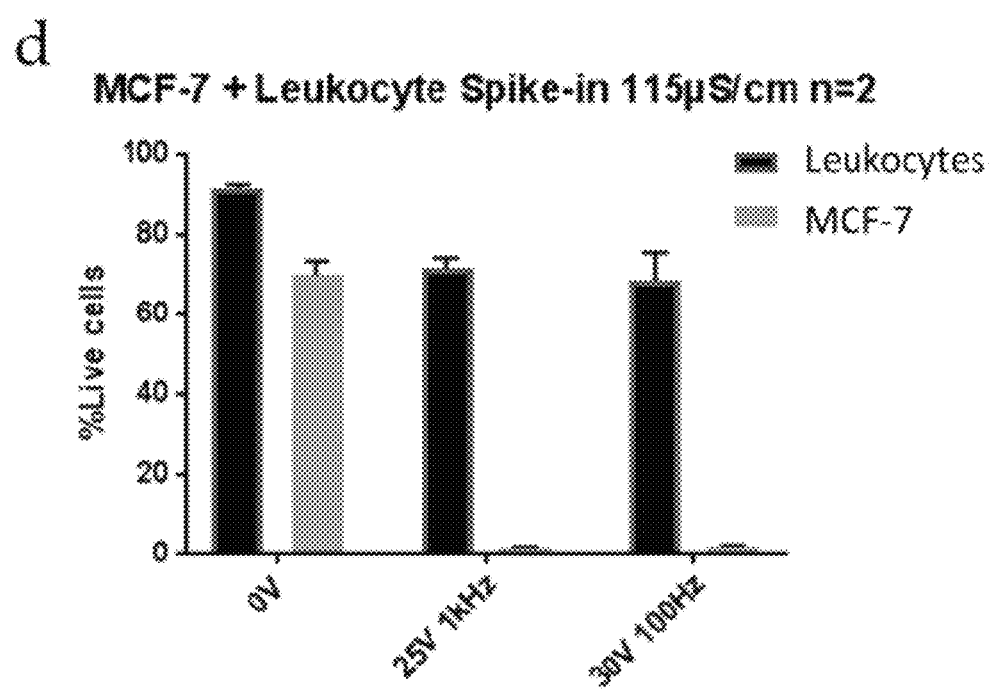

FIG. 22 shows: Selective elimination of FITC-Antibody stained MCF-7 cells spiked to a leukocyte suspension. Hoechst 33342 viability stain was added prior to flow cytometry data acquisition. (a) Mixed cell population without electric field. (b) Mixed cell suspension after application of 25 V at 1 kHz. (c) Mixed cell suspension after application of 30 V at 100 Hz. (d) Statistics on viability after field application. Conductivity: 100-103 μS/cm. Events: 10 000. N=2

Figure 23:
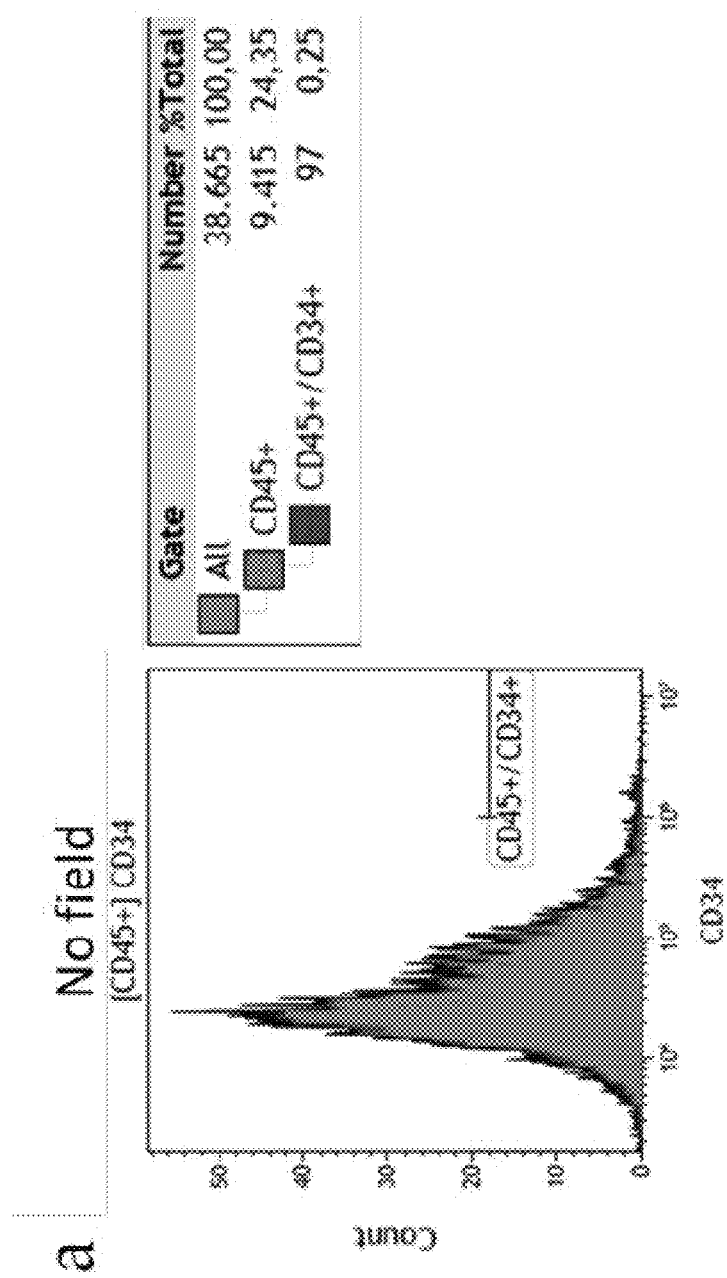
Figure 23:
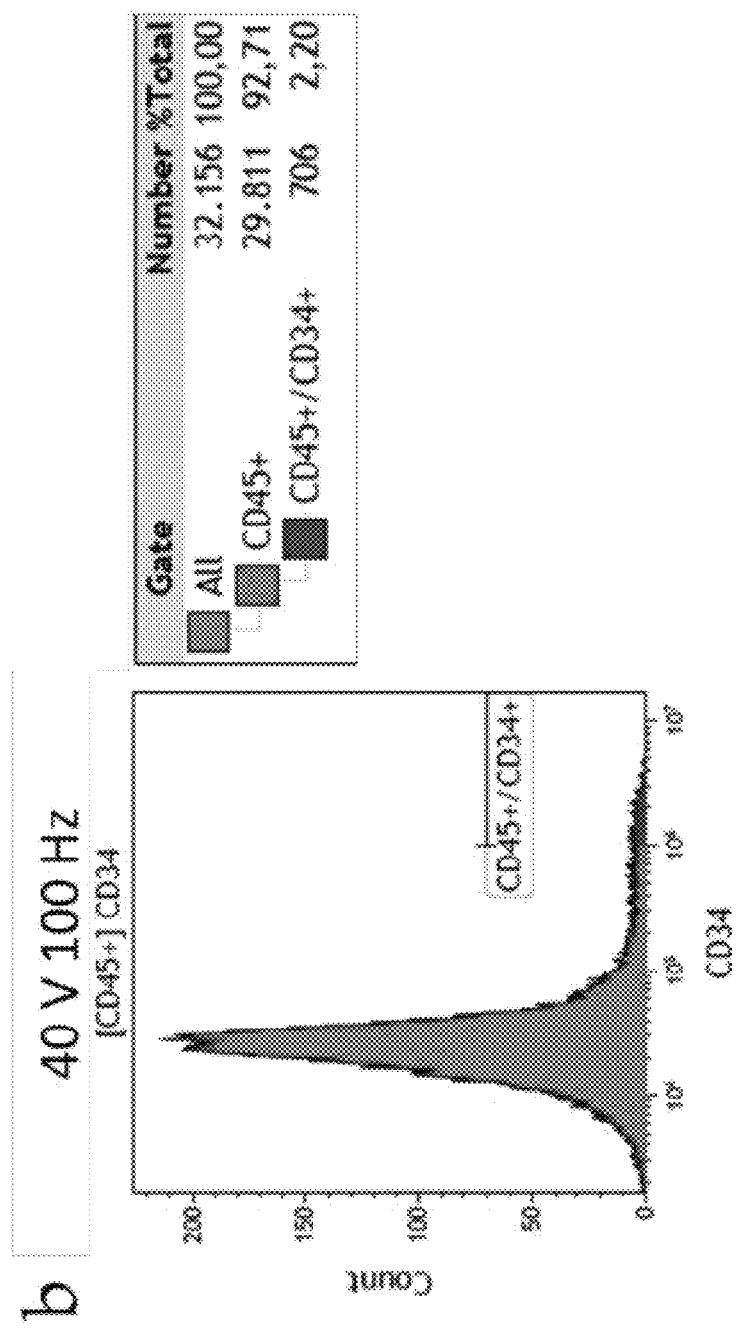

FIG. 23 shows: Flow cytometry histograms of a first investigation to use electric fields for the enrichment of hematopoietic stem (CD45+CD34+) cells from a leukocyte cell suspension. (a) Sample after passing the lab-scale flow-through prototype without electric field applied. (b) Sample after passing the lab-scale flow-through prototype with 40 V 100 Hz applied.

Figure 24:
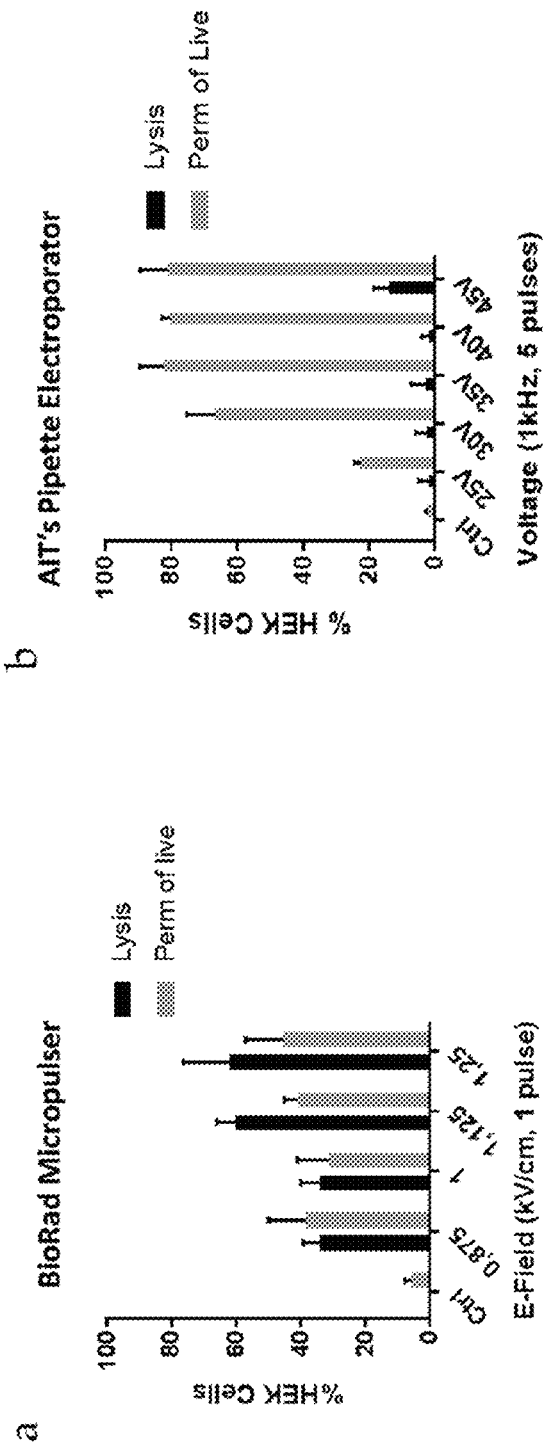

FIG. 24 shows: Comparison of permeabilization and electric field induced lysis of HEK (human embryonic kidney) cells using a classical cuvette-based commercial electroporation system (a) and the developed electroporation pipette tip (b).

Figure 25:
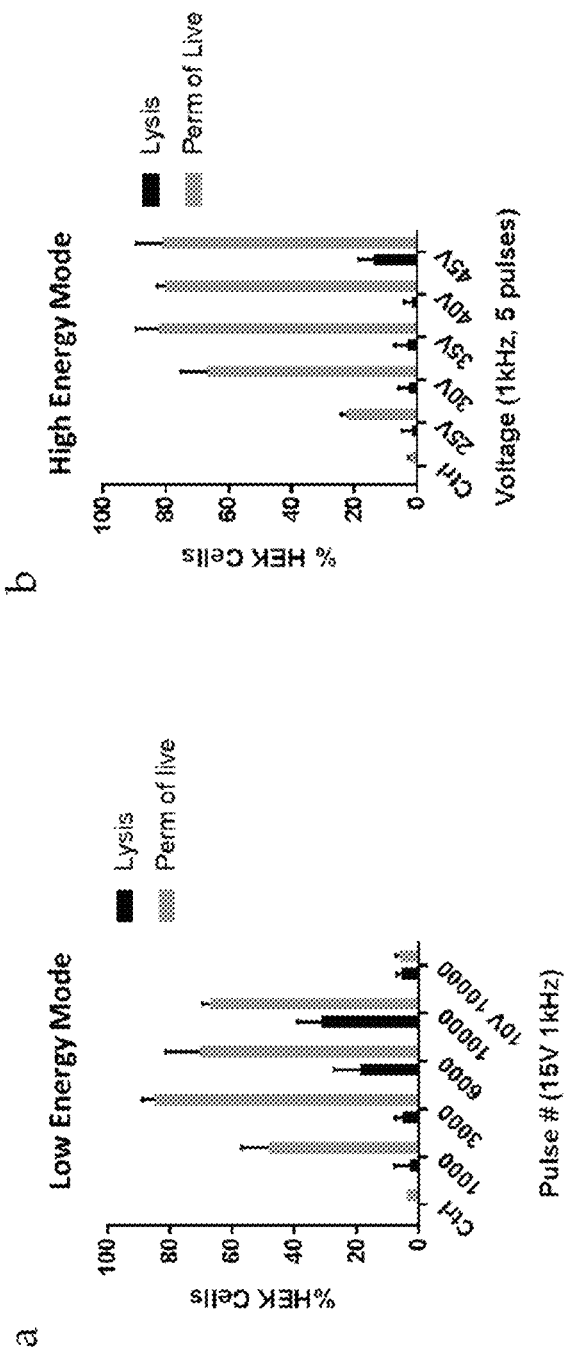

FIG. 25 shows: Occurrence of cell permeabilization by using a large number of pulses at low voltage, termed "Low Energy Mode" (a) and only 5 pulses at higher electric potentials, termed "High Energy Mode" (b).

Figure 26:
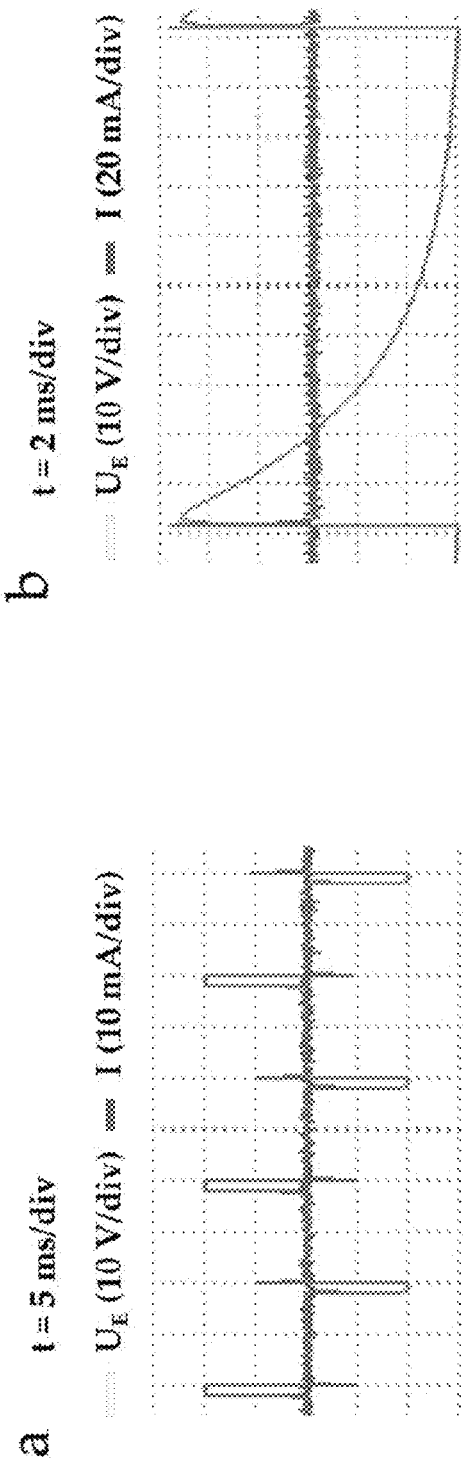

FIG. 26 shows: Change of the pulse setup used for dye transport showing electric discharge (a) to exponential decay pulses (b) to induce a net electrophoretic movement of DNA molecules (b).

Figure 27:
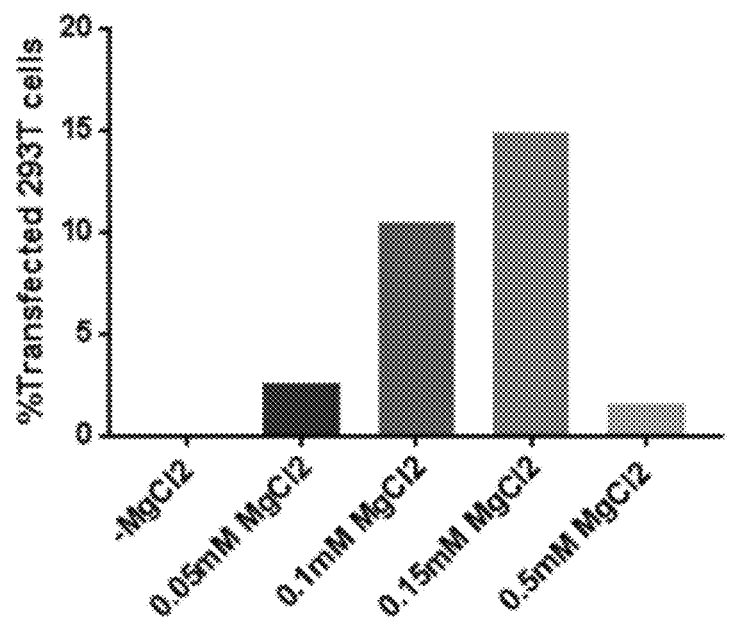

FIG. 27 shows: Plasmid transfection efficiency of 293T HEK cells in electroporation buffers of increasing $MgCl_2$ concentration.

Figure 28:
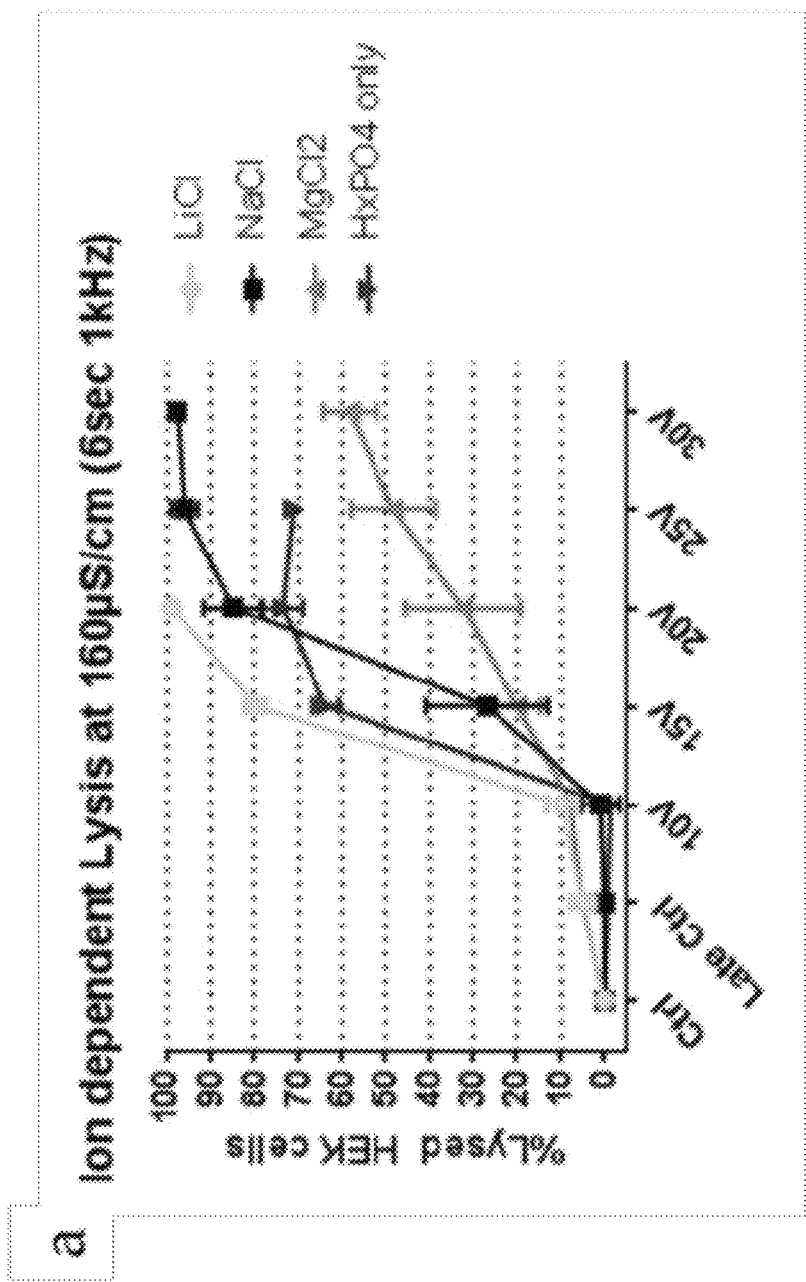
Figure 28:
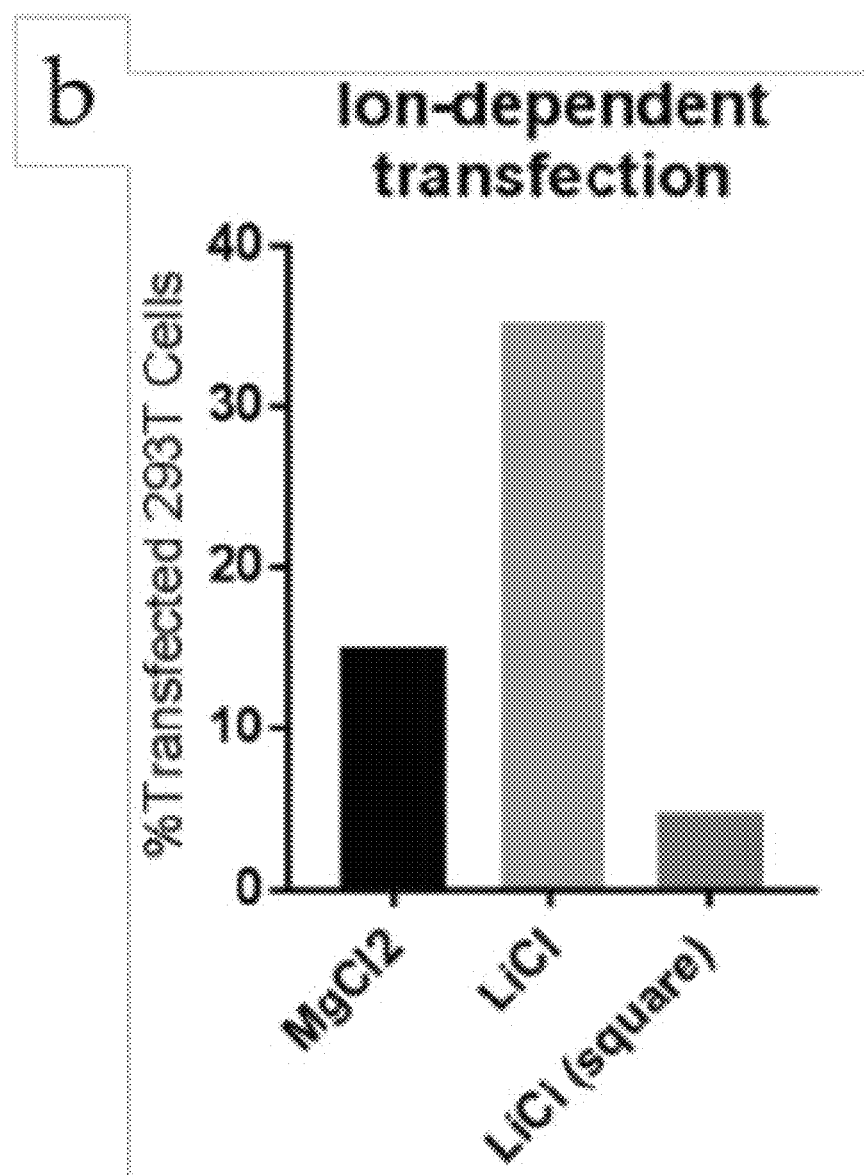

FIG. 28 shows: (a) Electric field induced lysis of HEK cells in dependence on buffers comprising different ionic composition at equal conductivities. (b) Transfection efficiency of HEK 293T cells in $MgCl_2$ and LiCl buffer using exponential decay pulses and in LiCl buffer using square wave pulses.

Figure 29:
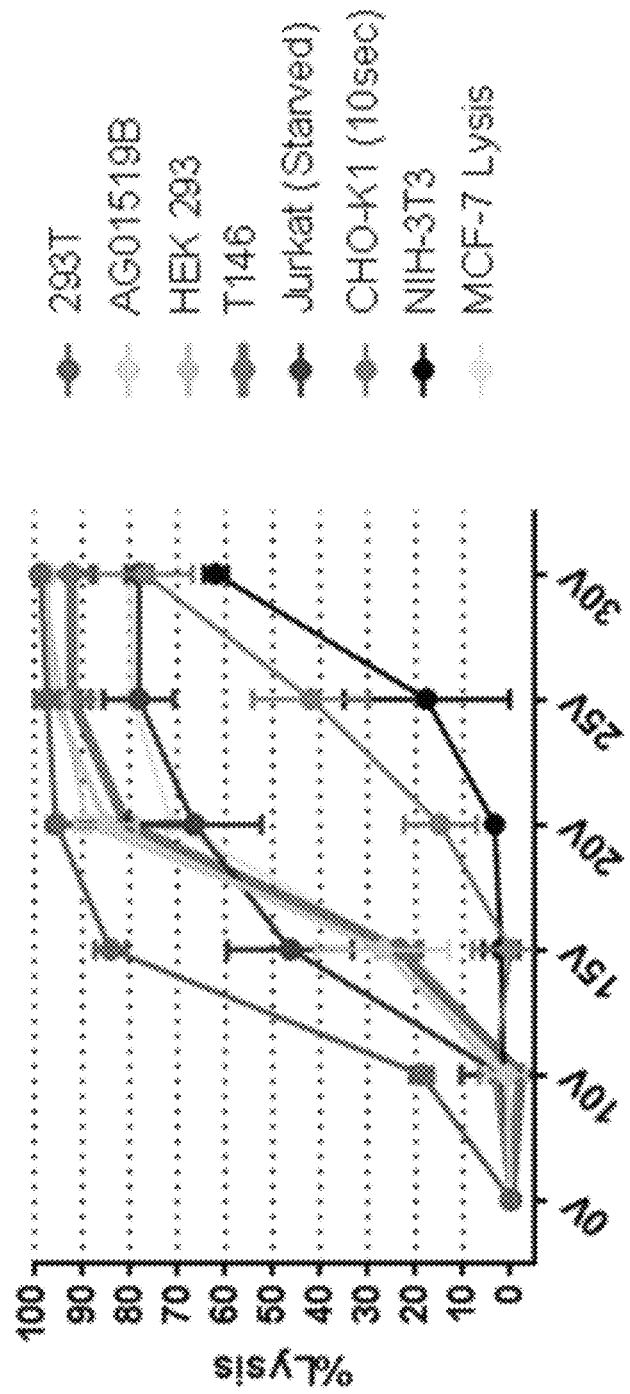

FIG. 29 shows: Electric field induced cell lysis of different cultured cell lines at standardized cell number and buffer conductivity.

Figure 30:
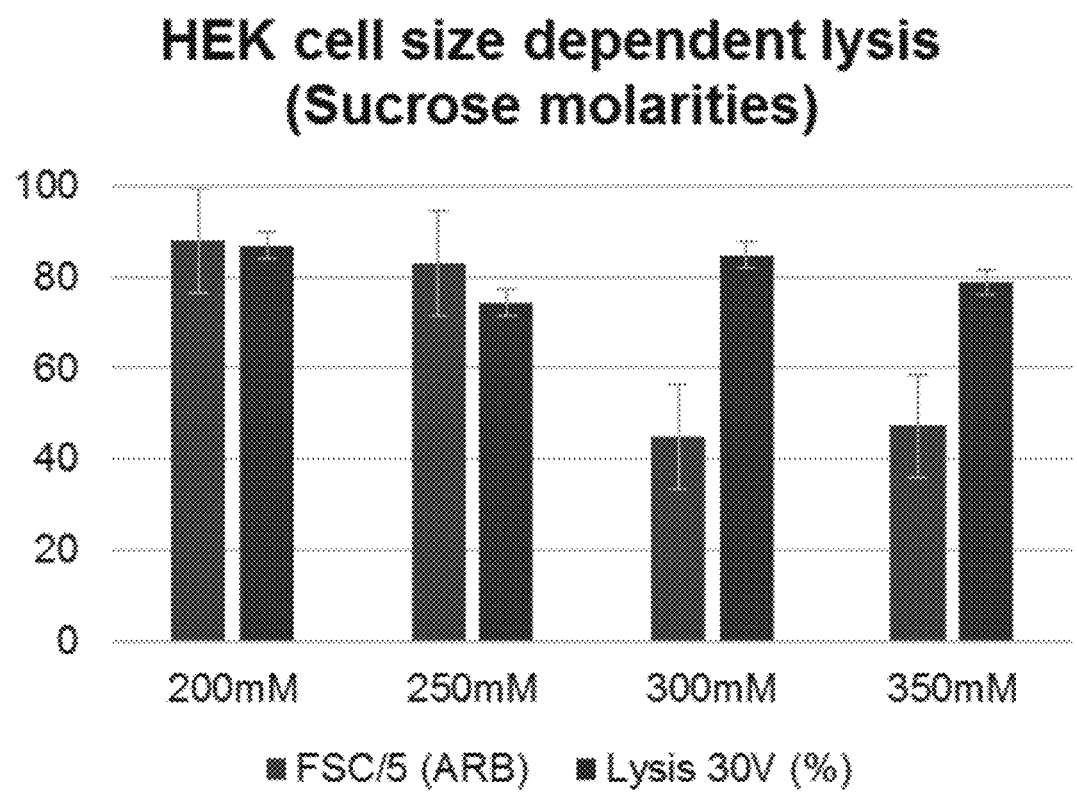

FIG. 30 shows: Investigation of cell-size dependent electric field induced lysis via the alteration of cell size through osmotic regulation. Cell size is presented as arbitrary forward scatter (FSC, blue) and percentage of cell lysis at 30 V 6000 pulses is shown in red.

Figure 31:
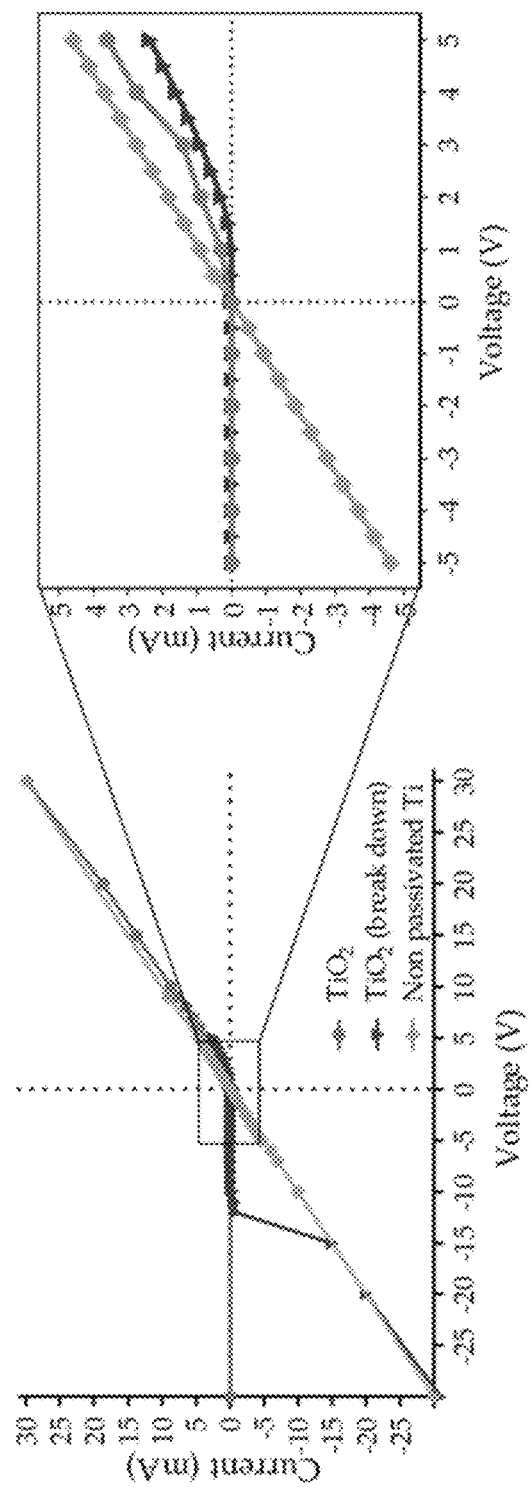

FIG. 31 shows: Electrical characterization. (a) Leakage current of lab-scale flow-through prototypes filled with different conductive solutions measured by applying a DC current at indicated voltage. (b) Diode characteristic measurements using 4 different high-k passivated electrodes (PEPP1-PEPP4).

Figure 32:
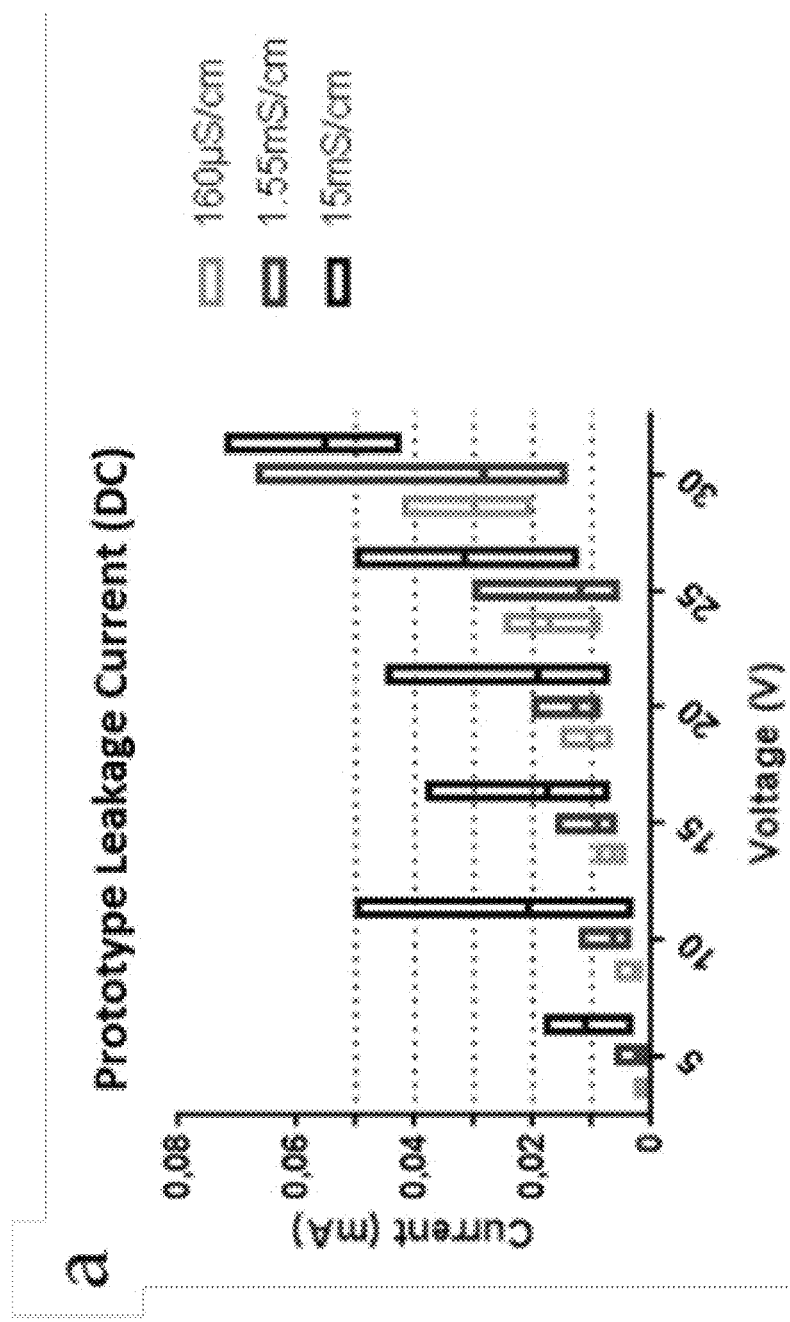
Figure 32:
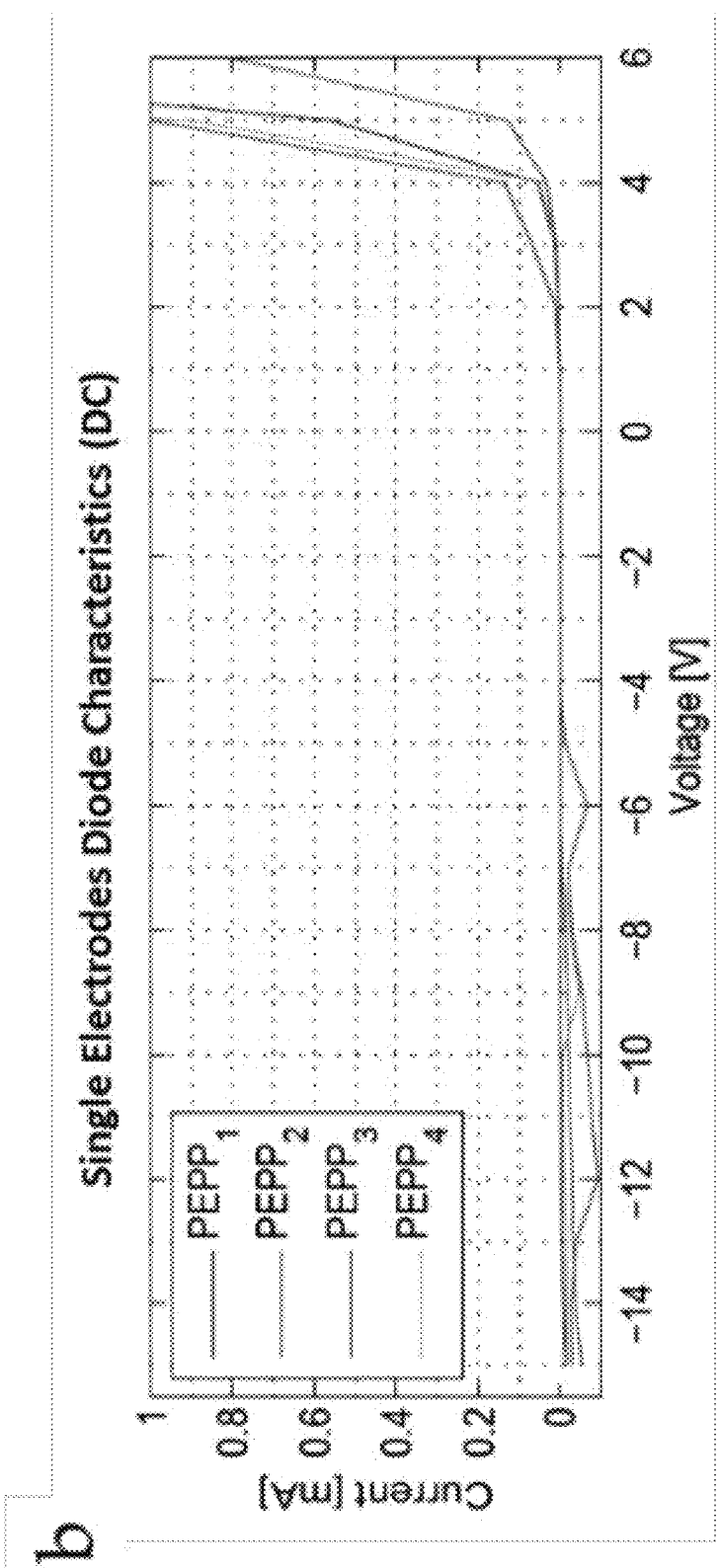

FIG. 32 shows an I/V diagram of non-passivated (grey hash) and thermally passivated titanium electrodes ($TiO_2$, red circles and blue triangles). $TiO_2$ (break down) in blue triangles shows an example of passivation deficiency and dielectric breakdown.

EXAMPLES

Example 1

Erythrocyte Specific Lysis for the Isolation of Leukocytes

FIG. 1 shows a comparison of lysis curves of diluted whole blood and leukocyte suspension. The abscissa is the potential difference between the electrodes, the ordinate is the viability in per cent.

FIG. 1 refers to determination of the lysis parameters of erythrocyte- and leukocyte populations separately prepared from whole blood. The electrical field has a frequency of 100 Hz and the wave form is a square wave ac signal. A specific field effect acting on erythrocytes can be observed in the 18 V elution with a reduction in cell viability of 77.9%. At 20V, only 2.8% of erythrocytes remain intact while the leukocyte population is unaffected with 95.6% viability. Complete erythrocyte lysis is achieved at 25 V (0.6% viable). Since this refers to a whole-blood dilution it also contains a remaining leukocyte population. This also may explain why a further field increase to 30 V does not significantly change the viability of remaining cells (0.5% viable). Leukocyte lysis rate at this setting averages 88.3% with SD 15.2%. With rising field strength, viability of the isolated leukocyte elution decreases to 22.9% at 40 V applied. Taken together, these viability data reveal a wide window of opportunity for selective isolation of leukocytes.

Referring to FIG. 2 and FIG. 3, we proceed to address the membrane integrity of remaining viable cells in order assess the feasibility of using this method for selective isolation of intact leukocytes. For this purpose, a spike-in suspension of whole-blood and isolated leukocytes was prepared for a final cell ration of 1:1. Conductivity was adjusted to 220 µS/cm and voltage set to 25 V with all other parameters unchanged. A double stain of Propidium Iodide (PI) and Hoechst 33342 was used to assess any change in the membrane integrity of the remaining leukocyte population. Both dyes bind DNA and as such will only visualize the nucleus of leukocytes. Since PI is impermeable to intact membranes at the used concentration, the positive population represents leukocytes with compromised membranes. Hoechst 33342 is added subsequently to allow for clear distinction of leukocytes from erythrocytes. In the control sample not subjected to an electric field, 20% of the total 50% leukocytes are PI positive, indicating some kind of membrane aberration due to the standard multistep protocol for the isolation of leukocytes. After field application and selective erythrocyte lysis, the fraction of intact leukocytes remains equal (40% of 100%). This indicates that the applied field has no impact on membrane integrity in the surviving population.

Microscopy images B to D show leukocyte-spiked diluted blood before (OV) and after the application of an electric field (25V, 100 Hz, square wave AC). B shows a merge of fluorescence and brightfield image. Hoechst-stained leukocytes in untreated suspension appear blue, erythrocytes and other cells from blood appear translucent orange. Image C shows the enrichment of leukocytes after field application. Image D shows Hoechst-positive leukocytes in blue fluorescence channel. In image E, PI-positive cells are visible in the green fluorescent channel. The conductivity σ was 220-230 µS/cm.

Example 2

Lysis of Leukocyte Sub-Populations Leads to Enrichment of CD34-Positive Cells

Hematopoetic stem cells (HSCs) are considered to be amongst the smallest blood cell population with diameters in the range of 6-8 µm. Given that electrical fields impose their membrane effects in a size specific manner according to the Schwan equation, it is feasible to assume that HSCs should be more resistant to pulses of increasing magnitude than larger, differentiated leukocytes. FIG. 4 shows the effects of applying high-energy square wave pulses of 40 V at 100 Hz to isolated leukocytes with respect to the fraction of CD34 HSCs. Calcein-AM is used to determine cell viability and CD45, also referred to as leukocyte common antigen, should be expressed on all leukocytes. In the 0 V control, 0.16% of viable leukocytes express CD34 (FIG. 4 C, D), which is in line with current literature where CD34+ HSCs are shown to make up 0.19% of peripheral blood cells (Bender et al. 1991). Upon application of 40 V square wave pulses, expected to remove 77.9% of leukocytes (FIG. 1), the amount of viable leukocytes with CD34 fluorescence increases to 2.34% (FIG. 3 G, H), which corresponds to an enrichment by a factor of 14.

Materials and Methods

Preparation of Working Solutions

Whole blood was donated from healthy volunteers using K3-EDTA collection tubes (Vacuette, Greiner Bio One, Austria), immediately stored a 4° C. and kept for a maximum of 3 days. Erythrocyte lysis buffer (ELB) contains 155 mM NH4Cl, 10 mM KHCO3 and 0.1 mM EDTA and is sterilized by filtration (0.22 µm PVDF filter). Any dilutions were prepared with 250 mM Sucrose solution. Conductivity is measured using a conductivity meter (B-771 LAQUAtwin, HORIBA Advanced Techno).

Leukocyte Isolation 10 ml ELB is added to 1 ml of whole blood, incubated 10 min RT and inverted repeatedly. The suspension is centrifuged at 500 g for 10 min (Eppendorf 5430; Rotor: F-35-6-30). These steps are repeated until cell pellet is white (void of erythrocytes). It is then washed twice with sucrose+PBS solution set to 100 µS/cm, counted and re-suspended to yield a concentration of 5×105 cells/ml. Viability is assessed by staining with Hoechst 33342. Preparations with less than 80% viability are discarded.

Electric Field Application 1 ml of respective cell suspensions were transferred to a 1 ml syringe (Omnifix-F, Braun, Germany) and injected to the ECLU by a syringe pump (Fusion 200 Touch, KR Analytical Ltd, United Kingdom) set to a flow-rate of 100

µl/min. To discriminate between parameters, at least 5× the ECLU chamber volume of 10 µl was allowed to pass through the device after any parameter change and before collecting an aliquot for further analysis. Electric fields were induced by applying the according voltage waveforms by a function generator (DG4102, Rigol) connected to a voltage amplifier (Falco WMA-300, Falco Systems, Netherlands). Voltages and current (via a 2 Ω resistor) were monitored by an oscilloscope (DS1104B, Rigol).

Data Acquisition and Analysis

Leukocyte precursor enrichment was assessed by co-staining of samples with Ca-AM, Alexa Fluor 700 conjugated CD45R (B220) Monoclonal AB (RA3-6B2, Thermo Fischer, 56-0452-82) and PE conjugated CD34 Monoclonal Antibody (4H11, Thermo Fischer, 12-0349-42) for 30 min RT in the dark after ECLU field application. When possible, 50.000 events were recorded with CytoFLEX Flow Cytometer (Beckmann Coulter) using FSC, SSC, FITC, APC-A750 and PE channels. Antibody compensation was performed with VersaComp Antibody Capture Beads (Beckmann Coulter, B22804) and Ca-AM was compensated with stained 293T cells (supplied by the Department of Nanobiotechnology of the University of Natural Resources and Life Sciences, Vienna). Gating and analysis was performed with Kaluza Analysis Software (Beckmann Coulter).

Example 3

Leukemia Specific Cell Ablation in a Mixture of Healthy Blood Cells

FIG. 5 shows viability of Jurkat T lymphocytes, a leukemia cell model, and Leukocytes from a healthy volunteer when subjected to square wave pulses of increasing magnitude. Jurkat T lymphocytes show the highest susceptibility to voltage dependent lysis. Square wave pulses of 15 V reduce cell viability of Jurkat cells to 22.6%.

FIG. 6 A and B shows frequency dependency of the same cell types at respective field magnitude.

All viability data above was collected separately on individual cell populations. To test whether these trends would be applicable in a mixed-population suspension, spike-in experiments were performed on mixtures of Jurkat T lymphocytes with leukocyte isolates. FIG. 7 A, B shows the flow cytometry data with and without field application to a 1:1 mixture of Jurkat T lymphocyte- and leukocyte suspensions in equally equilibrated buffer. In the mixed population without field application, 31.6% of counted events are Calcein-AM positive Jurkat T lymphocytes and 41.7% are identified as leukocytes by their SSC profile (FIG. 7 A). Upon application of 20 V square wave pulses at 50 Hz, <0.1% of the events remain Calcein-AM positive Jurkat T lymphocytes while leukocytes make up 50.7% of events (FIG. 7 B). Cellular debris increases from 11.4% to 26.5% with field application (FIG. 7 B, C). The claim that Jurkat T lymphocytes undergo lysis instead of losing Calcein-AM fluorescence is supported by SSC gating and previous lysis experiments. FIG. 7 C shows the average event counts for three technical replicates with standard deviation.

Selective lysis of tumor cell populations has been shown before with unpassivated electrodes (Eppich et al., 2000, Nat. Biotechnol. 18.8:882-87. doi: 10.1038/78504). CMK tumor culture cells were spiked with PBMCs and showed higher susceptibility to electric fields. However, these experiments lead to results with 67% confidence intervals in 7 repetitions. In our case of triplets with very low event counts for Jurkat T lymphocytes, the confidence interval does not represent the reliability of the lysis process. Standard deviation for the live Jurkat T lymphocyte event count of 0.063% is 0.038%. This means that the number of events attributed to live Jurkat cells was below 0.1% in all three repetitions.

Further, field settings of the existing paper that decreased viability of CMK cells below 2% on average were shown to kill over 80% of monocytes and at least 20% of lymphocytes (Eppich et al., 2000, Nat. Biotechnol. 18.8:882-87. doi: 10.1038/78504). High-k dielectric passivation is able to reliably reduce tumor cell count while keeping leukocyte populations intact. In the case of selective Jurkat T lymphocyte spike-in experiments, leukocyte count is virtually unchanged by the applied electric field. The reduction of unspecific side effects as a result of high-k passivation allow for this increase in cell specificity.

Example 4

Breast Cancer Specific Cell Ablation in a Mixture of Healthy Blood Cells

FIG. 8 shows viability of MCF-7 and Leukocytes when subjected to square wave pulses of increasing magnitude. MCF-7 is a breast cancer cell line broadly used as circulating tumor cell model in research. Square wave pulses of 15 V reduce cell viability of MCF-7 to 30.7% on average. Notably, this means that both cancer models (Example 1 and 2) display a higher field susceptibility than erythrocytes at the same field strength and conductivity (FIG. 1, 74.3% viable).

FIG. 9 A and B show frequency dependency of the same cell types at respective field magnitude.

FIG. 10 A-B shows the flow cytometry data with and without field application to a 1:1 mixture of MCF-7 and leukocyte populations in buffer. MCF-7 cells are stained with FITC-conjugated antibody for identification. Viability is assessed via Hoechst 33342 staining prior to data acquisition. In the mixed population without field application, 69.8% of labelled MCF-7 cells are viable with 91.7% of leukocytes remaining intact (FIG. 10 A, C). Application of 30 V square wave pulses at 100 Hz reduces the viability of the MCF-7 population to 2.1% while 68.5% of leukocytes remain viable (FIG. 10 B, C). FIG. 10 C shows the average population counts for two technical replicates with standard deviation.

Materials & Methods

Preparation of Working Solutions

Preparation of the electroporation buffer (EPB) is performed by incremental addition of PBS to autoclaved 250 mM sucrose solution until conductivity reaches 100 µS/cm. Whole blood is directly diluted in 250 mM sucrose without conductivity manipulation. Conductivity is measured using a conductivity meter (B-771 LAQUAtwin, HORIBA Advanced Techno). Whole blood was donated from healthy volunteers using K3-EDTA collection tubes (Vacuette, Greiner Bio One, Austria), immediately stored a 4° C. and kept for a maximum of 3 days. Any dilutions were prepared with 250 mM Sucrose solution. Erythrocyte lysis buffer (ELB) contains 155 mM $NH_4Cl$, 10 mM $KHCO_3$ and 0.1 mM EDTA and is sterilized by filtration (0.22 µm PVDF filter).

Cell Culture

Jurkat T lymphocytes (supplied by the Department of Nanobiotechnology of the University of Natural Resources and Life Sciences, Vienna) were cultivated at 37° C. and 5% $CO_2$ in RPMI (Thermo Fisher, 21875091) supplemented with 10% FBS (Thermo Fisher, 10500) and 1% Pen/Strep Antibiotic-Antimycotic (Thermo Fisher, 15240). Jurkat are passaged by centrifugation for 5 min at 400 g (RT, Eppendorf 5430; Rotor: F-35-6-30). MCF-7 were cultivated at 37° C. and 5% $CO_2$ in MEM (Thermo Fisher, 21875091) supplemented with 10% FBS (Thermo Fisher, 10500), 2% L-Glutamin (Thermo Fisher, 25030081), 1% Non-essential amino acids (Thermo Fisher, 11140050) and 1% Pen/Strep Antimycotic-Antimycotic (Thermo Fisher, 15240). MCF-7 are passaged by washing with PBS (1× from stock: Thermo Fisher, 70011044) followed by trypsinization (0.25%, Thermo Fisher, 25200) for 5 min at 37° C. Any sterile protocols were processed in biological safety cabinets. (Herasafe Kans., Class II, Thermo Fisher, 51022488)

Leukocyte Isolation 10 ml ELB is added to 1 ml of whole blood, incubated 10 min RT and inverted repeatedly. The suspension is centrifuged at 500 g for 10 min (Eppendorf 5430; Rotor: F-35-6-30). These steps are repeated until cell pellet is white (void of erythrocytes). It is then washed twice with sucrose+PBS solution set to 100 µS/cm, counted and re-suspended to yield a concentration of 1×106 cells/ml. Viability is assessed by staining with Hoechst 33342. Preparations with less than 80% viability are discarded. 2.4 Preparation of Jurkat T lymphocytes and MCF-7 culture cells Jurkat T lymphocyte suspension is centrifuged at 350 g for 5 min and excess medium aspirated. Cells are re-suspended in 5 ml EPB (100 µS/cm). This step is repeated three times. During the last centrifugation step, an aliquot of cells is counted and resuspended in the amount of EPB needed for a final cell concentration of 1×106 cells/ml. The precise suspension conductivity is recorded. Adherent MCF-7 cells are washed with PBS, trypsinized for 5 min at 37° C. and re-suspended in culture medium. Further preparation steps are performed analogous to Jurkat preparation

Preparation of Spike-In Suspensions

For the Jurkat T lymphocyte-spiked leukocyte suspension, both populations were prepared as described in sections 2.3 and 2.4. Jurkat-T lymphocytes in EPB were stained with 10 nM Calcein-AM solution (Thermo Fischer, C3100MP) for 60 min at 37° C. to allow for population tracking in flow cytometry. An aliquot of unstained cells was set aside for flow cytometry negative controls. Stained Jurkat T lymphocytes are mixed 1:1 for final concentrations of 5×105 each prior to pulse application. For the MCF-7-spiked leukocyte suspension, both populations were prepared as described as above. MCF-7 cells in EPB were stained with CD326-FITC-Antibody (1:20) for 30 min at 4° C. to allow for population tracking in flow cytometry. An aliquot of unstained cells was set aside for flow cytometry negative controls. Stained MCF-7 are mixed 1:1 for final concentrations of 5×105 each prior to pulse application. Live-dead discrimination of the MCF-7 population was not possible based on FITC-fluorescence alone. All spike-in samples were stained with 1pg/ml Hoechst 33342 solution and incubated 5 min RT prior to data acquisition.

Electric Field Application 1 ml of respective cell suspensions were transferred to a 1 ml syringe (Omnifix-F, Braun, Germany) and injected to the ECLU by a syringe pump (Fusion 200 Touch, KR Analytical Ltd, United Kingdom) set to a flow-rate of 100 µl/min. To discriminate between parameters, at least 5× the ECLU chamber volume of 10 µl was allowed to pass through the device after any parameter change and before collecting an aliquot for further analysis. Electric fields were induced by applying the according voltage waveforms by a function generator (DG4102, Rigol) connected to a voltage amplifier (Falco WMA-300, Falco Systems, Netherlands). Voltages and current (via a 2 Ω resistor) were monitored by an oscilloscope (DS1104B, Rigol).

Data Acquisition and Analysis

Flow cytometry data acquisition was performed with BD FACSCanto II. Forward scatter (FSC) and side scatter (SSC) thresholds were set to eliminate cell debris from the final readout. 10.000 events were recorded for each parameter. Ca-AM and CD326-FITC parameters were recorded in the FITC channel, Hoechst 33342 staining is recorded in the Pacific Blue channel. No compensation control is included due to lack of fluorescence overlap. Data was gated in Kaluza Analysis Software (Beckmann Coulter) and results plotted in Graphpad Prism 7.

Example 5

Device for Targeted Electroporation and/or Lysis of Eukaryotic Cellular Bodies in a Biological Sample With at Least Two Subgroups of Eukaryotic Cellular Bodies FIG. 11 shows the inventive device for targeted electroporation and/or lysis of eukaryotic cellular bodies in a biological sample with at least two subgroups of eukaryotic cellular bodies as a pipette. The chamber is located within the tip of the pipette, as can be seen in FIG. 11 B. FIG. 11 D and FIG. 11 E show two different embodiments of the chamber in a cross sectional view. 1 refers to the electrodes, while 2 refers to the housing, which is not conductive.

In FIG. 11 D, two essentially planar electrodes 1 form a part of an inner surface of the chamber. The electrodes are essentially opposite and thereby face each other. Between the electrodes, the electrical field is generated. The form of the chamber in FIG. 11 D is rectangular.

In FIG. 11 E, the form of the chamber is circular, wherein in the circumferential inner housing, several electrodes 1 are located.

Example 6

Low Voltage Cell Lysis for DNA, RNA or Protein Isolation

The experiments described hereinafter are intended to demonstrate controllable low voltage cell lysis in a pipette tip. FIG. 12 A shows lysis curves of 293T cells for different conductivities when applying capacitive coupled electric fields with a square wave 1 kHz AC signal for 6 seconds. For a conductivity of 60 µS/cm, lysis begins at 10 V and reaches a plateau at 25 V. Increasing conductivity to 160 µS/cm, we observe lysis starting below 15 V and peaking at 25 V. With 260 µS/cm, onset of lysis occurs at 20 V and reaches its maximum around 30 V. The dynamic range for all three conductivities spans 10 V, corresponding to 1.2 kV/cm. It was shown that lysis efficiency of 293T cells is inversely proportional to buffer conductivity. This trend is highly reproducible and lysis curves are clearly distinguished by minor changes in buffer composition.

FIG. 12 B shows experiments with pulse number as the only variable. Field strength was set to 3.6 kV/cm and frequency at 1 kHz. As a result, lysis efficiency increases steadily with period number up to 2000 periods, reaching a plateau of maximum efficiency with around 90% lysis and minimal standard deviation for a given conductivity.

FIG. 12 C shows 293T cell lysis upon exposure to 2000 pulses at different frequencies. While the total exposure time if significantly different, adjustment to the previously determined threshold of 2000 pulses results in equal lysis efficiency independent of frequency.

FIG. 12 D shows the concentration of cell-free DNA after lysis of 293T cells with increasing applied voltages.

FIG. 12 E shows the concentration of cell-free RNA after lysis of 293T cells with increasing applied voltages.

FIG. 12 F shows the extraction of cytosolic proteins in their native form from cells after lysis through capacitive coupled electric fields using the pipette tip. (in Arbeit)

Example 7

Cargo Delivery a Cell Transfection

The experiment described hereinafter are intended to demonstrate controllable cargo delivery into cells by application of low voltages to the pipette tip. FIG. 13 A shows lysis and propidium iodide (PI) delivery into 293T cells when exposed to a decreasing number of high-voltage square wave pulses. 50 pulses of 40 V lead to lysis of 48.5% of cells while PI was taken up by 78.8% of the remaining viable cells. Decreasing the number of pulses further results in higher viability while the fraction of live cells permeable to PI remains similar. Upon exposure to 5 square wave pulses of 40 V, 5.6% of 293T cells are lysed by the electric field while 82.8% are viable and PI-positive.

FIG. 13 B shows further optimization of PI-delivery by changing the applied voltage. Cells were subjected to 5 square wave pulses at 1 kHz repetition rate. Viability is virtually unaltered by the field magnitude in this pulse range. 293T cell viability is decreased by 2.5% by application of five 25 V pulses while five 40 V pulses decrease viability by 1.8%.

FIG. 13 B further shows a correlation between field strength and the fraction of PI-permeable cells, yielding 22.4%, 66.7%, 82.3%, 80.5% and 81.1% for 25 V, 30 V, 35 V, 40 V and 45 V respectively.

FIG. 13 C shows that PI-permeabilization strongly correlates with pulse number at the same voltage. 1000 square wave pulses yield 48.4% PI-positive viable 293T cells, increasing up to 85.0% at 3000 pulses with minimal loss of viability. FIG. 13 D shows 293T cells expressing RFP 48 hours after electrotransfection with pTurboRFP-N plasmid by application of exponential decay pulses of 40 V to the pipette tip.

Materials and Methods

Production of Titanium-Oxide Coated Prototypes

Grade 2 titanium foil (commercially pure titanium, cpTi, 99.2% pure) was cut in dimensions of 60×10 mm. An average oxide layer thickness of 500-600 nm was used. Electroporation reservoirs were assembled using double-sided 81.3 µm thick adhesive tape (Adhesive Research, Arcare 90445) spaced 2.5 mm apart forming a 12.15 µl channel. The top 5 mm of a standard 200 µl pipette tip was cut and a short, 90° incision was made in the resulting narrow end. Electroporation tip assembly proceeded by inserting the electrode-flanked channel into the incision and sealing any edges air-tight with two-component epoxy adhesive (UHU plus Endfest 300, 45640). The resulting tips can be used with any 20 µl pipette set to a volume of 10 µl.

Cell Culture

Human embryonic kidney cells 293T (supplied by the Department of Nanobiotechnology of the University of Natural Resources and Life Sciences, Vienna) were cultivated at 37° C. and 5% CO2 in DMEM (Thermo Fisher, 41965) supplemented with 10% FBS (Thermo Fisher, 10500) and 1% Pen/Strep Antibiotic-Antimycotic (Thermo Fisher, 15240). Cells were passaged by washing with PBS (1× from stock: Thermo Fisher, 70011044) followed by trypsinization (0.25%, Thermo Fisher, 25200) for 5 min at 37° C. Any sterile protocols were processed in biological safety cabinets. (Herasafe Kans., Class II, Thermo Fisher, 51022488)

Sample Preparation

Cells were washed with PBS, detached by trypsinization and re-suspended in supplemented DMEM Medium. Electroporation buffer (EPB) was prepared from autoclaved 250 mM sucrose solution. PBS was added to adjust the desired sample conductivities. Conductivity was measured using a conductivity meter (B-771 LAQUAtwin, HORIBA Advanced Techno). Cells were centrifuged for 5 min at 400 g (RT), supernatant discarded and re-suspended with EPB. After two washing steps, cells were counted and adjusted to 1×10^6/ml with the next reconstitution. Final conductivity was recorded. If the suspension deviated more than 10 µS/cm from the calibrated EPB, the washing step is repeated until conductivity is within this range. Cell death from sample preparation was also assessed. Only samples containing more than 90% live cells, as determined by Hoechst 33342 stain were used for experiments.

Electrical Cell Lysis and Imaging 293T cell lysis is used as an indirect readout to analyze the biological impact of capacitively coupled electric fields across a range of parameters. Cells in EP buffer were transferred to hydrophobic parafilm in 10 µl droplets and aspirated with the electroporation tip prototype. Electric fields were induced by applying the according voltage waveforms by a function generator (DG4102, Rigol) connected to a voltage amplifier (Falco WMA-300, Falco Systems, Netherlands). Voltages and current (via a 2 Ω resistor) were monitored by an oscilloscope (DS1104B, Rigol). Cells were ejected onto parafilm and mixed with a 10 µg/ml (10×) stock solution of in PBS for a final concentration of 1 µg/ml. The sample was transferred to a hemocytometer (Thoma, Optik Labor) and imaged by a digital camera (Prosilica GT, Allied Vision) mounted on an inverted microscope (CKX41 Fluo V2, Olympus). Bright-field images were recorded for total cell count. To identify lysed cells, Hoechst 33342 viability dye was excited at 360 nm using a UV lightsource (X-Cite 120Q, Excelitas Technologies) and emission above 420 nm imaged for further analysis.

Electrical Cell Permeabilization and Imaging

The permeabilization dye Propidium Iodide (PI) was prepared from dilution of a 1 mg/ml stock with electroporation buffer to limit any conductivity change. Cells in EP buffer were transferred to hydrophobic parafilm in 9 pl droplets and mixed 1:10 with a 30 µg/pl solution of PI. The mixture is aspirated with the electroporation tip prototype. Electric fields were induced by applying the according voltage waveforms by a function generator (DG4102, Rigol) connected to a voltage amplifier (Falco WMA-300, Falco Systems, Netherlands). Voltages and current (via a 2 Ω resistor) were monitored by an oscilloscope (DS1104B, Rigol). The sample is ejected to a hemocytometer (Thoma, Optik Labor) and imaged by a digital camera (Prosilica GT, Allied Vision) mounted on an inverted microscope (CKX41 Fluo V2, Olympus). To identify permeabilized cells, the membrane impermeable PI was excited from 480-550 nm using a UV lightsource (X-Cite 120Q, Excelitas Technologies) and emission above 590 nm imaged for further analysis.

Data Analysis

Lysis images were analyzed in Fiji (Schindelin et al. 2012) by adjusting the threshold to include positive cells only, isolating high-contrast live cells in bright-field and stained dead cells in fluorescence images. After converting images to binary, cell count was performed by particle analysis function. Results are displayed as percentage lysed, excluding the fraction of dead cells from sample preparation, which means that the control is always displayed as zero percent lysis. PI-positive cells were counted manually from a bright-field and red fluorescence overlay. Controls were overexposed to the point where PI-negative cells remain invisible. This setting is then applied to samples subjected to electric fields. Dead cells show high-PI fluorescence, look visibly dead in bright-field and are calculated equally as in lysis experiments. Permeabilized cells are displayed as the fraction of visibly live cells with any PI fluorescence.

Transfection

Cells prepared as in section Sample Preparation were kept in a sterile working environment. 9 µl were placed on hydrophobic parafilm and mixed with 1 µl vector stock solution for a final working concentration of 25 ng/ml pTurboRFP-N (Evrogen, FP232) and 0.5 mM MgCl2. The suspension was aspirated into the electroporation tip and exposed to 10 exponential decay pulses of 40V at 1 kHz followed by 1000 exponential decay transfer pulses of 15 V at 50 Hz. They were ejected into an 8-well µ-slide (Ibidi, 80826) and left to rest for 5 minutes. 250 µl OptiMEM (Thermo Fischer, 31985062) was added with gentle resuspension. Transfected cells were cultivated at 37° C. and 5% CO2 for 48 hours and imaged by a digital camera (Prosilica GT, Allied Vision) mounted on an inverted microscope (CKX41 Fluo V2, Olympus). The fraction of cells expressing RFP was assessed from manual count of bright-field and red fluorescence overlays of at least 5 images from random positions in each respective well.

DNA Isolation

For each lysis setting, 10 µl 293T cells (1×106 cells/ml) prepared as in section 3.3 were placed on hydrophobic parafilm and aspirated to the electroporation tip. 6000 square wave pulses of respective voltage are applied, ejected unto parafilm and transferred to individual 1.5 ml test tubes. Once all parameters were collected, these are centrifuged (1000 rfc, 5 min, RT) to remove surviving cells and large debris. 5 µl of supernatant are carefully removed and transferred to PCR test tubes for storage. Picogreen measurements by Nanodrop were preceded by obtaining a standard curve in the range of 0.8-0.01 ng/µl. Results show the DNA yield from 10 000 293T cells upon electric field exposure.

Example 8

Device Targeted Electroporation and/or Lysis of Eukaryotic Cellular Bodies in a Biological Sample With at Least two subgroups of eukaryotic cellular bodies for flow cytometry FIG. 14 shows two chambers 1 and 3 with electrodes in combination with a flow cytometry unit. The flow cytometry unit is in fluid connection with the chambers 1 and 3, so that the biological sample can flow from the chambers 1, 3 to the flow cytometry unit and/or vice versa. For controlling of the flow cytometry unit and analysing the sample, a control unit 5 can be used. For adjusting the electrical parameters of the electrodes of the chambers 1 and 3, adjustment units 2 and 4 are connected to the electrodes of the chambers. Of course, only one adjustment unit that regulates the electrical field in both chambers 1 and 3 independently from each other can be used. For data transfer, the control unit 5 can be connected to adjustment units 2 and 4. In the chamber 1, the biological sample, in FIG. 14 referred to as Cell Suspension, can be mixed with a staining solution.

FIG. 15 depicts the conductivity dependent lysis of blood cells. As shown, efficient cell lysis with capacitive coupled electric fields is efficient using a 1:10 dilution of blood in sucrose. As complete electric field induced lysis of cells happens in less than 6 seconds, a prototype with 1 ml volume capacity could thus process and isolate pathogens from the required 7 ml whole blood in less than 10 minutes.

Several designs were developed and prototypes constructed with cost efficient industrial manufacturing in focus. In FIG. 37, a prototype design that resembles a roller-type capacitor with 1 ml sample capacity is shown. As the complete and homogeneous coating of the electrodes by a thin film high-k material is the fundamental basis for pure physical, specific electric field effects on cells, defects in the coating result in charge transfer between the electrode and the biological sample when a voltage is applied to the electrodes, and thus, give rise to superimposing electrochemical effects. The occurrence of defects in the passivation film were observed during test runs via an electrical measurement setup.

In order to solve the problem of defective passivation layer generation, alternative methods to the established thermal oxidation were explored. Anodic oxidation of metal was identified to be the most promising due to its low cost, precise controllability and wide spread industrial use.

With anodically oxidized titanium sheets, both a lab-scale prototype was constructed with which promising electric field whole blood cell lysis experiments were done (FIG. 16 a, b, c).

Example 9

Application of Leukocyte Enrichment From Human Blood Samples

In order to investigate further application possibilities, cell specificity within human cell types was investigated.

First, leukocytes were isolated from blood and exposed to different voltages and square wave frequencies in the lab-scale flow through prototype (FIG. 17).

As can be seen in FIG. 17, a surprisingly discrete cell lysis behavior can be observed between leukocytes (magenta) and whole blood cells (red, >99% erythrocytes) dependent on the voltage amplitude (FIG. 17 a) as well as in a frequency dependent manner (FIG. 17 b, c).

To confirm if the developed technology could be used as an attractive substitute for the cumbersome and lengthy state-of-the-art methods for leukocyte isolation from whole blood (i.e. gradient centrifugation or a series of erythrocyte lysis buffer incubation and centrifugation steps), several spike-in experiments were performed with whole blood and leukocytes in a 1:2 ratio. After application of selective lysis parameters (25 V, 100 Hz sqAC), the relative leukocyte cell number and viability was compared to a non-treated control. Leukocytes were discriminated from erythrocytes by using a cell permeable fluorescent dye (Hoechst), which intercalates DNA and stains the nucleus of cells.

As can be seen in FIG. 18, starting from 50% of the cells being of leukocyte origin (Hoechst+) in the no field control, after the sample was treated in the lab-scale flow-through prototype, the leukocyte population was efficiently enriched. The double staining with a non-permeable dye (propidium iodide, PI) was used to assess any change in the membrane integrity of the leukocyte population. After electric field application and selective erythrocyte lysis, the fraction of intact leukocytes remains equal compared to the control, indicating that the applied field parameters have no impact on membrane integrity.

Example 10

Specific Cancer Cell Ablation in Mixed Cell Populations

Liquid biopsy comprises the isolation of circulating tumor cells (CTC) from blood samples for basic cancer research and targeted treatment of cancer patients. As the concentration of circulating cancer cells in blood is relatively low (1-10 CTCs in 10 ml blood), enrichment of CTCs is currently considered one of the biggest bottlenecks. Prior methods focus predominantly on the isolation of CTCs using anti-EPCAM antibodies. The strategy of using an epithelial marker on the CTCs cell surface comes with the restriction of missing cancer cells that have undergone epithelial to mesenchymal transition. Thus, the next application opportunity we were interested in was to transfer the strategy of using electric fields for pathogen isolation to CTC isolation from blood. In order to perform first proof-of-principle experiments, two prominent cancer model cell lines were used. Jurkat cells as a model for human T cell leukemia (EPCAM negative) and MCF-7 breast cancer cells, a widely used model for EPCAM positive CTCs.

As can be seen in FIG. 19, again a discrete cell lysis behavior can be observed between healthy leukocytes (magenta) and leukemic T-cells (blue, Jurkat) dependent on the voltage amplitude (FIG. 19 a) as well as different frequency responses (FIG. 19 b, c).

To confirm cell-specific lysis of leukemic cells in a mixture with healthy leukocytes, another spike-in experiment was designed. For this, the leukemic population was stained with a fluorescent marker (Calcein AM) and mixed with unstained healthy leukocytes in a 1:2 ratio, the cell suspension was passed through a lab-scale flow-through prototype without a field applied (no field control) and with 20 V at a square AC frequency of 50 Hz. Analysis was done using a flow cytometer.

In FIG. 20, the results of the spike-in experiment for leukemic-specific cell ablation in a mixture with healthy leukocytes are depicted. FIGS. 20 a and b show the control flow cytometry read out of fluorescently labeled Jurkat cells (blue) and healthy leukocytes only (magenta), respectively. FIG. 20 c depicts the mixed cell suspension after passing through a labscale flow-through prototype without an applied electric field. Clearly, both cell population can be discriminated. After application of 20 V at 50 Hz sqAC, the Jurkat cell population is specifically depleted and an increase in cell debris (black) can be observed. FIG. 20 e represents the relative number of flow cytometry events from three individual experiments. Without an electric field, 30% of events can be assigned to fluorescently labeled leukemic leukocytes (Jurkat cells). After electric field application, the number of events assigned to cell debris (low side scatter) more than doubled compared to the no field control. FIG. 20 f is a representative micrograph of Jurkat cells lysed by application of 20 V 50 Hz sqAC, showing lysed cells which appear as empty cellular shells, termed "ghosts", that are grouped as debris in the flow cytometry read out.

The fact that leukemic leukocytes are more susceptible to electric fields was a surprising finding. First, Jurkat cells were observed to be smaller than the majority of the cells in the healthy leukocyte sample, which would contradict the current paradigm in the research area of pulsed electric field applications in biology that electric field susceptibility scales with cell size. Second, cancer cells are reported to have a higher concentration of transmembrane proteins, which was estimated to reduce the electric field induced transmembrane potential. To further investigate the behavior of cancerous cells in electric fields, the Jurkat experimental design was repeated using MCF-7 breast cancer cells, a state-of-the-art CTC model cell line.

As with the Jurkat cells, also MCF-7 cells were observed to be more susceptible to electric fields than blood cells from a healthy donor (FIG. 21). Interestingly, the lysis rate in dependence of voltage and frequency is also different to Jurkat cells, resulting in a smaller window of opportunity to discriminate between healthy leukocytes and MCF-7 breast cancer cells using electric fields in the investigated parameter spectrum. In addition, MCF-7 cells showed an explicitly different lysis behavior. Instead of complete cell rupture or the appearance of empty cellular ghosts, as is observed with the cell types investigated during the project (erythrocytes, leukocytes, Jurkat, CHO, HEK, 293T, NIH-3T3, and others), lysed MCF-7 cells retained their intracellular granularity.

To demonstrate tumor cell specific ablation through electric fields in a mixed cell suspension, again a spike-in experiment was performed. Shown in FIG. 22 a-c are the dot plots of the flow cytometry readout for no field applied, 25 V applied at 1 kHz sqAC and 30 V applied at 100 Hz sqAC, respectively. FIG. 22 e summarizes the results of two individual experiments. The results of the spike-in experiment show the feasibility of highly efficient tumor cell ablation in a mixed cell suspension using electric fields. What can also be observed, however, is a certain degree of electric field induced perforation of healthy leukocytes with the used electric field parameters in these experiments, as is show by the upward migration of the leukocyte population in the dot plots (FIG. 22 a-c), as well as the increase in the number of nonviable leukocytes compared to the no field control. To circumvent this, future experiments can further optimize the cell specificity of the electric field by changing the frequency and/or the applied electric potential.

Example 11

Application of Stem Cell Enrichment From Human Blood Samples

To search for further high-potential application possibilities of the developed capacitive coupled electric field cell lysis system, experiments were done to investigate the possibility to isolate hematopoietic stem cells (HSC) from blood cells. HSCs have huge potential for treatment of various diseases like cancers, leukemia, lymphoma, cardiac failure, neural disorders, auto-immune diseases, immunodeficiency, metabolic or genetic disorders. Besides challenges in explaining and controlling the mechanisms of differentiation and development toward a specific cell type needed to treat the disease, obtaining a sufficient number of the desired cell type from a donors sample is important. As with most cell isolation methods, the current state-of-the art is dominated by antibody mediated isolations. Currently, HSCs are majorly isolated from bone marrow, as the HSC concentration is higher in bone marrow compared to blood. Enabling efficient isolation of HSCs from blood would thus be a very attractive alternative from the clinical perspective. For first proof-of-principle experiments, leukocyte where isolated from blood of a healthy volunteer and exposed to electric fields through application of 40 V at 100 Hz sqAC in the labscale flow through prototype. Control samples were passed through the prototype without an electric field applied. Samples were then stained with fluorescently labeled antiCD45 and antiCD34 antibodies and analyzed in a flow cytometer.

FIG. 23 shows the result of a preliminary study on the possibility to use electric fields for the isolation of HSCs. As can be seen in FIG. 23 a, 0.25% of the total cell suspension in the control sample are events that are CD45 and CD34 positive and thus represent HSCs. This value is in the expected range for the frequency of HSCs in blood. After application of 40 V at 100 Hz sqAC, the number of CD45 and CD34 positive events is increased approximately 10 fold to 2.2% of the total events. Thus, the results suggest that an enrichment of HSC from blood could be feasible via the exploitation of different susceptibilities of hematopoietic stem cells and leukocytes. It has to be indicated, however, that these results will include different sets of antiCD45 antibodies. As the starting samples of the experiments were isolated leukocytes (per definition CD45 positive), the occurrence of a CD45 negative population (75.4% in the control and 5.1% in the treated sample, see panels in FIG. 23 a,b) suggests bad antibody quality.

Example 12

Electrode Design for Gene Transfer

Besides cell lysis through electric fields, termed irreversible electroporation, another highly interesting effect of electric fields is the generation of temporary pores in the cell membrane induced via an electric field, termed reversible electroporation. Such temporary pores are widely used to introduce foreign molecules into cells, majorly DNA plasmids for genetic manipulation of cells, i.e. transfection of eukaryotic cells. Although viral, chemical and physical transfection technologies are available, electroporation potentially offers unique advantages, such as low cost, high throughput, specificity and controllability. But still, the major challenges facing current electroporation products are technological and operational complexity, system scalability, cell viability and reproducibility. In order to tackle these challenges another goal of the ECLS project was to investigate whether the reduction of electrochemical effects through capacitive coupled electric fields would result in superior reversible electroporation. In addition to the developed flow-through prototype, which would be of interest for industrial-scale application in biotechnology, the combination with the microfluidic design and the low voltage requirement would also allow the realization of handheld battery-powered devices. To generate a device a flow-through device is included in a pipette tip for electric field applications in a laboratory setting (FIG. 11).

Using a commercial electroporation device, the current limitations can be shown. First, due to the electrode distance in the electroporation cuvette of 4 mm, inhomogeneous electric field exposure leads to low efficiency of electric field induced cell permeabilization as well as to a trade-off between electroporation and cell lysis, which is hypothesized to be due to the occurrence of electrochemical effects close to the non-passivated electrode surface. Additionally, the applied electric fields of 0.875 to 1.25 kV/cm translate to applied electrical potentials in the range of 350 to 500 V. In contrast, the concept of using capacitive coupled electric fields with a microfluidic device resulted in highly efficient PI uptake at low lysis rates with just 30 to 45 V applied. In addition, it was shown that two modes of electric field induced temporary cell permeabilization occur, which are termed low and a high energy mode (FIG. 25).

As temporary permeabilization and thus reversible electroporation, was successfully shown using the uptake of fluorescent dyes, the next goal was to transfer DNA into cells. Thus, experiments were done using a plasmid carrying a gene for a fluorescent reporter (red fluorescent protein, RFP). These experiments were very educative in respect of the prerequisites of DNA transfer. In our approach, DNA transfer into cells could only be shown with application of exponential decay pulses (FIG. 26). This reduces the sudden capacitive discharge of the electrodes and thus is hypothesized to allow a net electrophoretic movement of the charged DNA molecule.

Although successful plasmid transfer was observed via fluorescence microscopy 24 to 48 hours after electroporation experiments via the production of RFP by transfected cells, the transfection efficiency was low, yielding 5-10% RFP positive cells. Thus, the common theory that the negative charge of DNA needs to be neutralized by adding positive charged ions in order for the DNA to come in contact with the negative charged cell membrane was investigated.

Surprisingly, the addition of $MgCl_2$, which is the major ionic component in state-of-the-art electroporation buffers, positively correlated with transfection efficiency only until a certain threshold concentration. Increasing the concentration to the recommended range (>0.5 mM), lead to a sudden drop in transfection efficiency (FIG. 29).

As can be seen in FIG. 28 a, $MgCl_2$ resulted in a pronounced reduction in the lysis rate, the addition of phosphate resulted in a plateau of the lysis rate and the use of a LiCl buffer with the same conductivity significantly enhanced the electric field effect compared to $MgCl_2$. To test if the addition of LiCl to the electroporation buffer also increases transfection efficiency, pRFP transfection was done in comparison to buffers comprising $MgCl_2$. As seen in FIG. 28 b, transfection efficiency more than doubled using LiCl as buffer component compared to $MgCl_2$. As LiCl did not increase transfection efficiency when using standard square wave pulses, still a combinatorial effect between electric field permeabilization and electrophoretic actuation of the plasmid is probable. Still, in order to exploit the use of capacitive coupled electric fields as novel and improved transfection technology, efficiency needs to be further enhanced. This can be achieved by expanding the understanding of the detailed processes of DNA transport through a porated cell membrane and the role of ionic supplements. Of note, neither the significant contribution of certain ionic species to electric field induced cell lysis nor the enhancement of transfection efficiency by changing the ionic composition to LiCl is reported in in the correlated literature. In addition, the use of such a pipette tip to retrieve cellular contents in a non-denaturing fashion was investigated. DNA, RNA as well as protein isolation was verified. The isolation of compartment specific proteins (total proteins, cytosolic proteins and membrane fraction proteins) at different electric field parameters is possible.

Example 13

Investigation of Electric Field Mode of Action on Different Cells

During the process of investigating reversible electroporation, also the electric field effect on other culture cell types was investigated. As with human cell samples, also different electric field susceptibilities of cultured cell lines were observed by performing cell lysis readouts (FIG. 29). The onset of reversible electroporation was investigated and follow the trends of electric field induced cell lysis. Additional, factors such as cell passage number, cell cycle and starvation were investigated.

As indicated by the lysis experiments using blood cells, also cultured cells exhibit different lysis behaviours. Of note, lysis rates did not correlate with either the literature values of the respective cell size or cell membrane capacitance— two of the most dominant factors in today's theory of electric field action on cells.

To further survey cell size dependency, the size of cells from the same cell types were altered using the induction of osmotic regulation via different osmolar sugar buffers. Cell size was verified by forward scatter values from flow cytometry and electric field induced cell lysis experiments performed (FIG. 30).

As depicted in FIG. 30, higher osmolar sugar buffers resulted in a change of the cells forward scatter, which correlates with cell size. Although the cell size did change due to different osmolarities, as expected, electric field induced lysis efficiency did not decrease significantly. This finding is of crucial importance, as the current theory strongly suggests the cells size as the most dominant influential factor for the effect of external applied electric fields.

Example 14

Physical Characterization

The concept of using a microfluidic approach together with high-k passivated electrodes for capacitive coupling of electric fields is, to the best of our knowledge, a unique approach. In combination with the significant specific electric field effects observed and the results that in some respect contradict current theorems in the research field, a better physical characterization and understanding of the overall system is of utmost importance.

To this, prototypes and single electrodes where examined in terms of their electrical behaviour, some representative results shall be shown here.

Seen in FIG. 31 $a$, leakage current through the solution when applying a DC current is in the low pA range. When compared to identical prototypes comprising non-passivated electrodes, values are a factor 104 lower. These results were informative in terms of the electric field propagation. Additionally, the n-type semiconducting properties of the high-k $TiO_2$ passivation layer were confirmed by measurements (FIG. 31 $b$). As the constructed prototype would thus compose two opposing schottky diodes, further investigations were done.

Next, the equivalent circuit was transferred to an electrical circuit design and simulation program. Several electric parameters were feed into the equivalent circuit to observe temporal potential drops over individual circuit elements such as the electrolyte. Using the circuit model, electric settings from performed cell lysis experiments were compared to add detailed electrical parameters to a profound data set of over 700 individual HEK cell lysis data points.

With the completion of such a big data set concerning one single cell type, it was clear that the most determining physical/electrical factors responsible for cell lysis as well as their interdependencies are derived by a machine learning approach. If successful, changing the cell type would in addition allow to retrieve cell-type specific biological factors.

In order to distil the most significant set-screws determining electric field effects on cells, a statistical model for lysis rates was thus derived using a multinomial logistic regression model.

From the experimental data, the model could plausibly predict lysis rates if different conductive solutions are given. In addition, four independently performed lysis experiments at different voltages, frequencies and exposure times were performed and compared with the prediction of the model.

Example 15

Chamber With Electrodes With Semiconductor Characteristics

Thermally generated titan oxide was investigated for is insulating or n-type semiconductor behaviour. A I/V scan was performed for non-passivated and passivated electrodes. Therefore, electrodes were contacted via the base metal and via a silver contact paste covering a surface area of 90 $mm^2$. Current was measured at corresponding DC voltages applied.

As can be seen in FIG. 32, titanium electrodes without thermal oxidation show a linear increase in current with the applied DC voltage independent of polarity, thus representing a resistive element. In contrast, passivated titanium electrodes show a current blocking behavior when applying negative potentials, thus acting with n-type semiconducting characteristics. A titanium electrode with deficient passivation layer shows dielectric breakdown when voltages above 12 V are applied. As such, the $TiO_2$ layer on top of the electrode represent a diode, blocking the current in one direction.

Concerning the assembled setup, this suggests that both electrodes represent two diodes in opposing directions, blocking overall ohmic current independent of the voltage polarity. The low leakage current measurements, the experiment done with a pH indicator dye at direct current clearly showing no electrochemical reactions, as well as the lysis experiments showing no effect in highly conductive solutions encourage such a model. Thus, as one passivation layer acts as high resistive element and the other as low resistive element, which is reversed when the electric potential is reversed, only the high resistive element experiences a significant potential drop. This allows for a larger proportion of the potential to drop in the fluid, thus a higher electric field, but still providing capacitive decoupling of the electrode material with the liquid sample.

The invention claimed is:

1. A method of targeted electroporation and/or lysis of eukaryotic cellular bodies in a biological sample with at least two subgroups of eukaryotic cellular bodies, wherein the at least two subgroups are from a mammal and each subgroup has a different susceptibility to electroporation and/or lysis in electric fields, comprising the following steps:
transferring the biological sample in a chamber;
exposing the biological sample to an electric field in the chamber, wherein the electric field is generated by at least two electrodes which are coated with a dielectric material with a relative permittivity greater than 3.9 at least covering the surfaces of the electrodes that face the interior of the chamber; and
lysing and/or electroporating one of the subgroups in the electric field, wherein the electric field has a field strength, frequency or wave form for electroporation and/or lysis of the subgroup and each subgroup of the at least two subgroups is differently affected by said electric field than another of the at least two subgroups.

2. The method according to claim 1, wherein the dielectric material has a thickness below 1 μm.

3. The method according to claim 1, wherein the distance between the electrodes is below 1 mm, but greater than 5 μm, and/or the electric field strength is in the range of 500 V/cm to 50 kV/cm.

4. The method according to claim 1, wherein the potential difference between the electrodes is in the range of 1 V to 100 V.

5. The method according to claim 1, wherein the electric field is a periodic field with a frequency in the range of 0.1 Hz to 10 kHz.

6. The method according to claim 1, wherein the sample is filtered for concentrating cellular bodies of a subgroup after lysis and/or electroporation.

7. The method according to claim 1, wherein after lysis of a subgroup, organelles, proteins and/or biomolecules from said lysed subgroup are collected.

8. The method according to claim 1, wherein prior to exposing the biological sample to the electric field, an electrical conductivity reduction of the sample below 1 mS/cm, by means of dilution, buffer or ionic exchange, transversal diffusion, filtering or electrophoretic separation is conducted.

9. The method according to claim 1, wherein for specific lysis of erythrocytes and for the isolation of leukocytes, the electric field has a field strength of at least 2.2 kV/cm, but not more than 6 kV/cm.

10. The method according to claim 1, wherein for specific lysis of leukocytes and for the isolation of hematopoetic stem cells, the electric field has a field strength of at least 3.0 kV/cm.

11. The method according to claim 1, wherein for specific lysis of cancer cells and isolation of non-cancerous cells the electric field has a field strength of at least 1.8 kV/cm.

12. A method of targeted electroporation and/or lysis of cellular bodies in a biological sample with at least two subgroups of eukaryotic cellular bodies, wherein the at least two subgroups are from a mammal and each subgroup has a different susceptibility to electroporation and/or lysis in electric fields, comprising the following steps:
actuating a piston of an air displacement pipette such that the biological sample is transferred into a chamber within a tip of the pipette
exposing the biological sample to an electric field in the chamber, wherein the electric field is generated by at least two electrodes which are coated with a dielectric material with a relative permittivity greater than 3.9 at least covering the surfaces of the electrodes that face the interior of the chamber; wherein the distance between the electrodes is below 1 mm, but greater than 5 μm; and
lysing and/or electroporating one of the subgroups in the electric field, wherein the electric field has a field strength, frequency or wave form for electroporation and/or lysis of the subgroup and each subgroup of the at least two subgroups is differently affected by said electric field than another of the at least two subgroups.

13. The method of claim 5, wherein the wave form of the electric field is a square wave, a sinusoidal wave or at least one pulse per period.

14. The method of claim 7, wherein after lysis of the subgroup genetic material, DNA or RNA, from said lysed subgroup is collected.

15. The method according to claim 11, wherein for specific lysis of cancerous leukocytes or circulating tumour cells and isolation of healthy leukocytes, the electric field has a field strength of at least 1.8 kV/cm.

16. The method of claim 15, wherein the circulating tumour cells are breast cancer cells.

17. The method of claim 11, wherein the electric field has a field strength of at least 2.4 kV/cm.

* * * * *